US011652337B2

(12) United States Patent
Kuriloff et al.

(10) Patent No.: US 11,652,337 B2
(45) Date of Patent: May 16, 2023

(54) SYSTEMS AND METHODS FOR INSTALLING FIBER OPTIC CABLE ONTO A POWERLINE CONDUCTOR

(71) Applicant: Meta Platforms, Inc., Menlo Park, CA (US)

(72) Inventors: Jonathan M. Kuriloff, Saint James, NY (US); Benjamin Lagosz-Sinclair, Tuxedo Park, NY (US); Alex Edwin Symington, Middle Island, NY (US); John J. Webster, Menlo Park, CA (US); Wayne Michael Kachmar, North Bennington, VT (US)

(73) Assignee: Meta Platforms, Inc., Menlo Park, CA (US)

( * ) Notice: Subject to any disclaimer, the term of this patent is extended or adjusted under 35 U.S.C. 154(b) by 210 days.

(21) Appl. No.: 16/867,312

(22) Filed: May 5, 2020

(65) Prior Publication Data
US 2020/0358268 A1     Nov. 12, 2020

Related U.S. Application Data

(60) Provisional application No. 62/916,187, filed on Oct. 16, 2019, provisional application No. 62/846,121, filed on May 10, 2019.

(51) Int. Cl.
*H02G 1/04* (2006.01)
*G02B 6/48* (2006.01)

(52) U.S. Cl.
CPC .............. *H02G 1/04* (2013.01); *G02B 6/486* (2013.01)

(58) Field of Classification Search
CPC ........ G02B 6/4457; G02B 6/486; H02G 1/02; H02G 1/04
See application file for complete search history.

(56) References Cited

U.S. PATENT DOCUMENTS

| 4,833,871 A | | 5/1989 | Ogawa et al. |
| 5,109,658 A | * | 5/1992 | Garner .................. H01B 15/00 |
| | | | 57/2.5 |

(Continued)

FOREIGN PATENT DOCUMENTS

| DE | 19820037 A1 | 11/1999 |
| FR | 2 890 756 A1 | 3/2007 |
| JP | 2000-292666 A | 10/2000 |

OTHER PUBLICATIONS

AFL, "Lightweight Retro-fit Fibre Optic Cable", AccessWrap™, May 9, 2012, 1 page.

(Continued)

*Primary Examiner* — Minh N Trinh
(74) *Attorney, Agent, or Firm* — Greenberg Traurig, LLP

(57) ABSTRACT

The disclosed robotic system may include (1) a drive subsystem that translates the robotic system along a powerline conductor and (2) a rotation subsystem coupled to the drive subsystem, where (a) the rotation subsystem is coupled to a container that defines an arcuate volume about an axis such that the container partially surrounds the powerline conductor when the axis aligns with the powerline conductor, (b) the container carries a segment of fiber optic cable coupled to the powerline conductor, and (c) the rotation subsystem, while the drive subsystem translates the robotic system along the powerline conductor, rotates the container about the powerline conductor while the axis is aligned with the powerline conductor such that the segment of fiber optic cable is wrapped helically about the powerline conductor. Various other systems and methods are also disclosed.

15 Claims, 58 Drawing Sheets

(56) References Cited

U.S. PATENT DOCUMENTS

| | | | |
|---|---|---|---|
| 5,727,373 | A | 3/1998 | Appleford et al. |
| 6,000,209 | A | 12/1999 | Ito et al. |
| 6,813,421 | B2 | 11/2004 | Lail et al. |
| 6,813,422 | B1 | 11/2004 | Krishnamurthy et al. |
| 3,005,333 | A1 | 8/2011 | Mullaney et al. |
| 8,831,394 | B2 | 9/2014 | Kimbrell et al. |
| 8,919,092 | B2 | 12/2014 | Figenschou et al. |
| 9,051,153 | B2 | 6/2015 | Lichoulas et al. |
| 11,169,351 | B2* | 11/2021 | Kuriloff .................. H02G 1/04 |
| 11,353,672 | B1 | 6/2022 | Mass et al. |
| 2003/0006332 | A1 | 1/2003 | Appleby et al. |
| 2004/0071416 | A1 | 4/2004 | Militaru |
| 2004/0247271 | A1 | 12/2004 | Skovgaard et al. |
| 2008/0101753 | A1 | 5/2008 | Suzuki et al. |
| 2008/0130010 | A1 | 6/2008 | Williams |
| 2012/0211447 | A1 | 8/2012 | Anderson et al. |
| 2012/0308189 | A1 | 12/2012 | Kimbrell et al. |
| 2016/0011366 | A1 | 1/2016 | Tsukamoto et al. |
| 2016/0215130 | A1 | 7/2016 | Esseghir et al. |
| 2016/0236857 | A1 | 8/2016 | Adams et al. |
| 2017/0176703 | A1 | 6/2017 | Baker et al. |
| 2018/0074214 | A1 | 3/2018 | Magne et al. |
| 2020/0358268 | A1* | 11/2020 | Kuriloff ................. G02B 6/486 |

OTHER PUBLICATIONS

AFL, "Frequently Asked Questions", SkyWrap® Information, Jul. 23, 2013, pp. 1-2.

AFL, "Fiber Optic Cable", SkyWrap®, Jun. 25, 2014, pp. 59-60.

International Search Report and Written Opinion received for PCT Application Serial No. PCT/US2020/032046 dated Jul. 22, 2020, 11 pages.

"Carbon Black," Wikipedia, Oct. 23, 2020, 6 pages, Retrieved from the Internet: URL: https://en.wikipedia.org/w/index.php?title=Carbon_black&oldid =985037981.

"Cross-linked Polyethylene," Wikipedia, Sep. 19, 2020, 15 pages, Retrieved from the Internet: URL: https://en.wikipedia.org/w/index.php?title=Cross- inked_polyethylene&oldid=979194209.

International Search Report and Written Opinion for International Application No. PCT/US2020/032103, dated Aug. 25, 2020, 10 Pages.

"Kevlar," Wikipedia, Sep. 19, 2020, 11 pages, Retrieved from the Internet: URL: https://en.wikipedia.org/w/index.php?title=Kevlar&oldid=979269720.

"Polyethylene," Wikipedia, Oct. 16, 2020, 17 pages, Retrieved from the Internet: URL: https://en.wikipedia.org/w/index.php?title=Polyethylene&oldid=983809595.

"Swellcoat Blocker," Fiberline, Oil & Gas, Fiber-Line Waterblocking Yarns, Oct. 27, 2020, 1 Page.

* cited by examiner

Upside-Down Transition Method 5700

SYSTEMS AND METHODS FOR INSTALLING FIBER OPTIC CABLE ONTO A POWERLINE CONDUCTOR

CROSS REFERENCE TO RELATED APPLICATIONS

This application claims the benefit of U.S. Provisional Application No. 62/846,121, filed 10 May 2019, and U.S. Provisional Application No. 62/916,187, filed 16 Oct. 2019, the disclosures of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
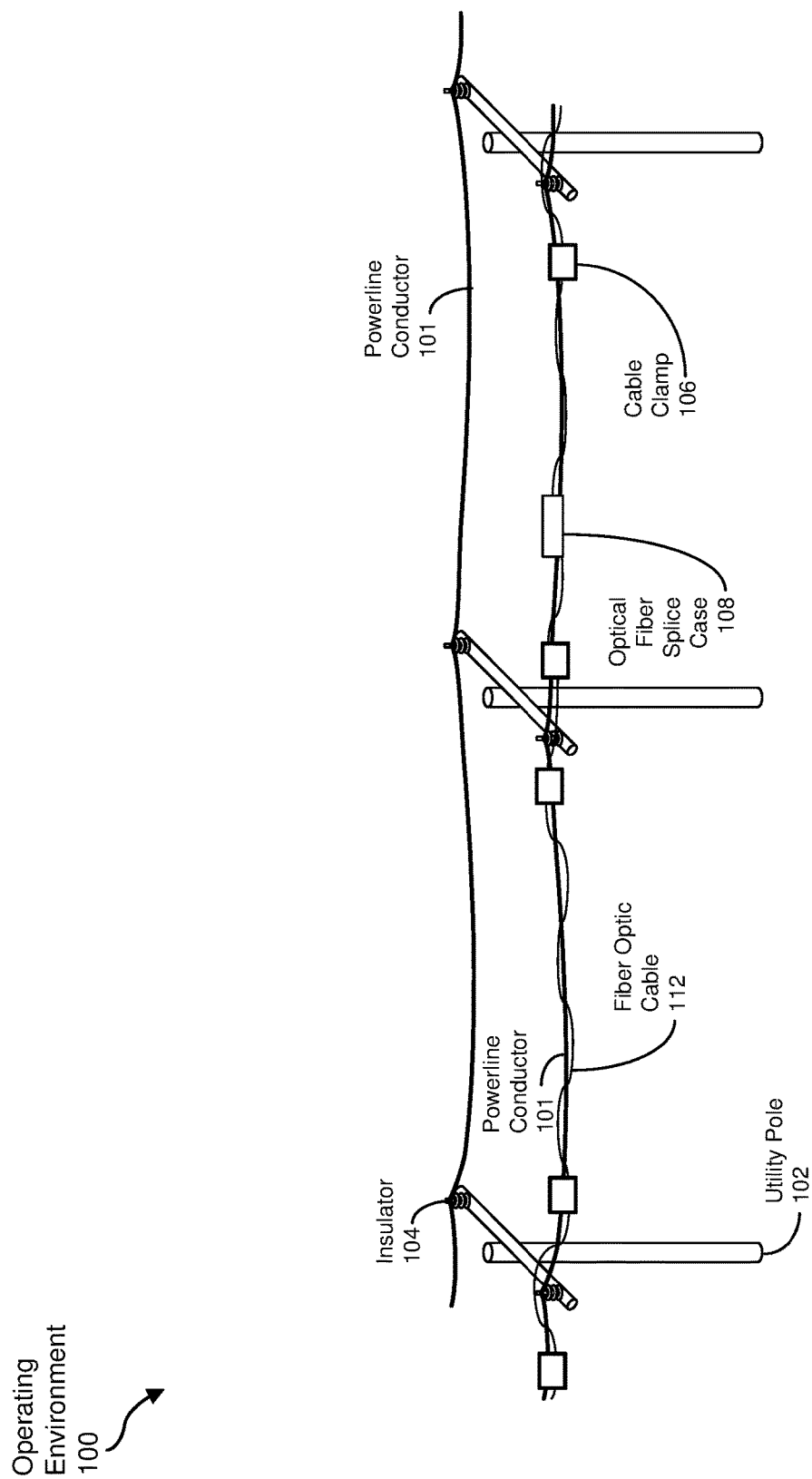
FIG. 1 is a graphical representation of an exemplary operating environment, including a powerline conductor, in which various exemplary embodiments may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the disclosure.

DETAILED DESCRIPTION OF EXEMPLARY EMBODIMENTS

Robotic devices may be employed to install fiber optic cable onto preexisting power infrastructure, such as powerline conductors for electrical power transmission and distribution lines, by way of helically wrapping the fiber optic cable about the powerline conductor. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline conductor (e.g., between towers or poles) while a rotation subsystem of the device helically wraps the fiber optic cable about the conductor.

While translating along a powerline conductor during fiber optic cable installation, conventional robotic devices may encounter one or more obstacles (e.g., insulators, taps, and the like), especially along powerline conductors of electrical distribution systems. In such cases, human operators may intervene to temporarily remove and then reattach the robotic device to allow the robotic device to continue to install the fiber optic cable on the powerline conductor beyond the encountered obstacle.

The present disclosure is generally directed to robotic systems and associated methods for installing fiber optic cable on a powerline conductor. As will be explained in greater detail below, embodiments of the present disclosure may facilitate obstacle avoidance during the fiber optic cable installation process, thus potentially reducing the amount of human intervention required to allow the robotic device to install the fiber optic cable. Consequently, for this reason and others described below, fiber "make ready" costs (e.g., costs incurred in preparing a utility powerline conductor for installation of fiber optic cable and subsequently installing the fiber optic cable) may be significantly reduced.

Features from any of the embodiments described herein may be used in combination with one another in accordance with the general principles described herein. These and other embodiments, features, and advantages will be more fully understood upon reading the following detailed description in conjunction with the accompanying drawings.

Figure 57:
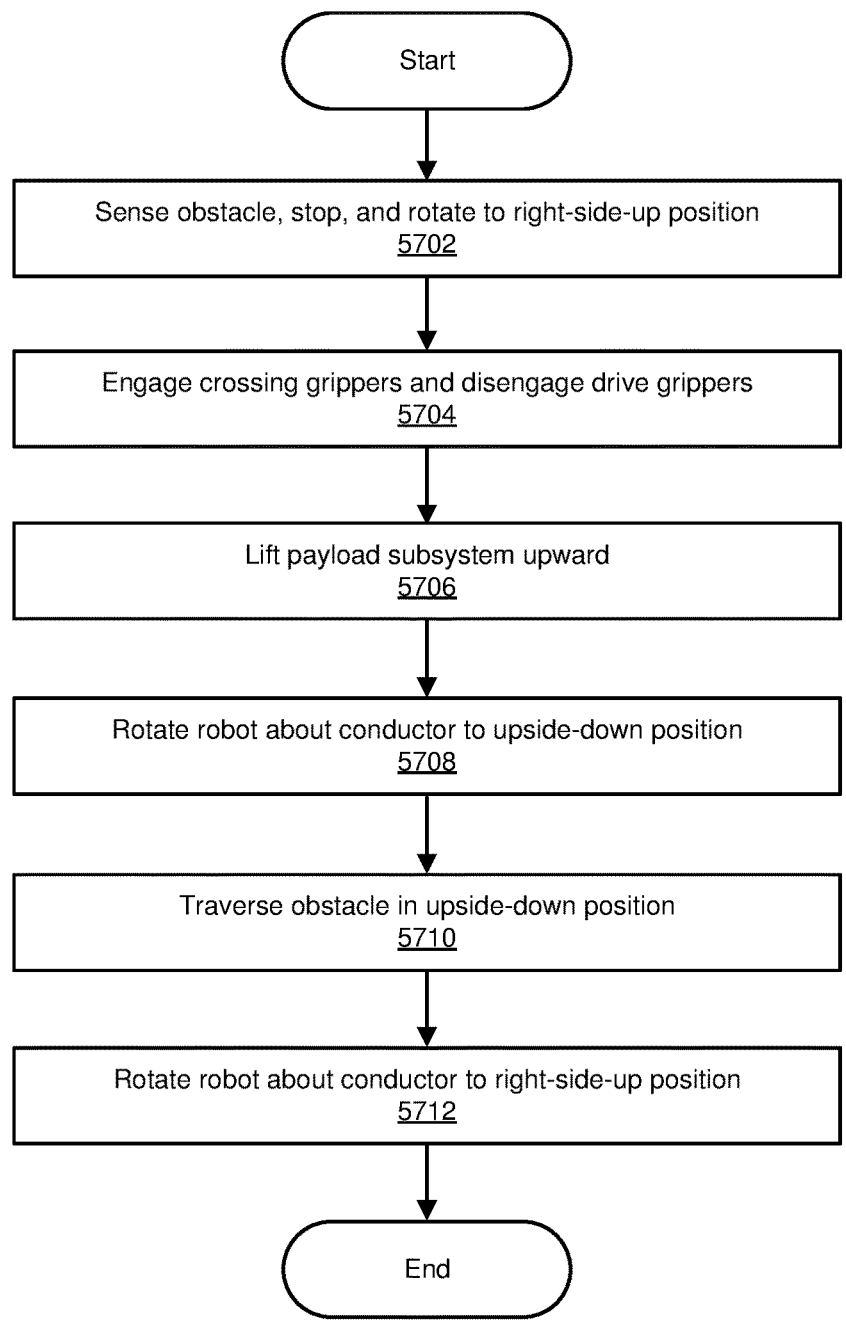
FIG. 57 is a flow diagram of an exemplary method of a robotic system transitioning between upside-down and right-side-up positions on a powerline conductor.
Figure 58:
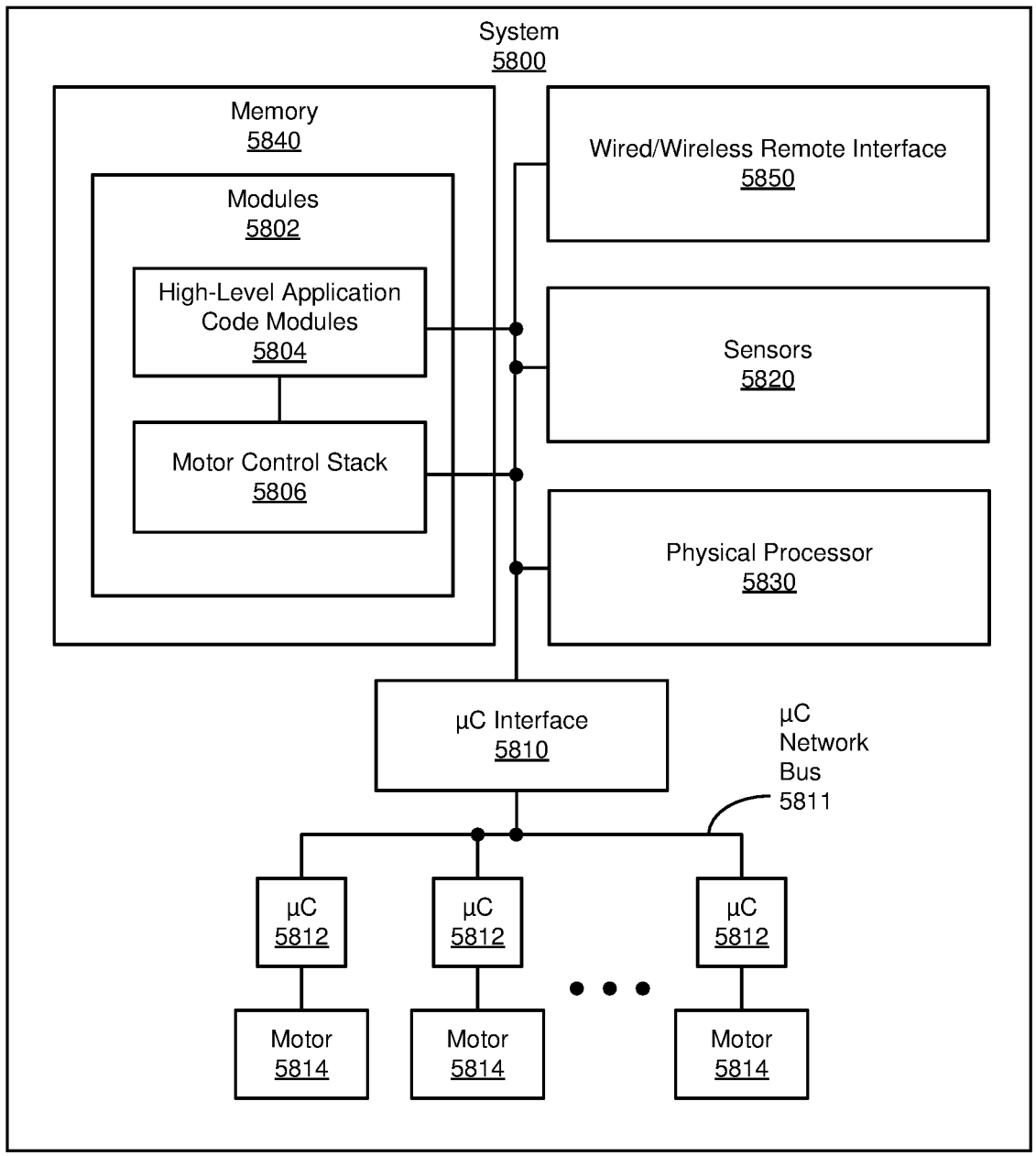
FIG. 58 is a block diagram of an exemplary system for installing a fiber optic cable on a powerline conductor.

The following will provide, with reference to FIGS. 1-58, detailed descriptions of systems and methods for installing fiber optic cable on a powerline conductor. A brief description of an exemplary operating environment in which various embodiments of systems and methods for installing fiber optic cable may operate is provided in connection with FIG. 1. Exemplary robotic systems for installing fiber optic cable are discussed in conjunctions with FIGS. 2-4. In association with FIGS. 5-54, various subsystems of the exemplary robotic system of FIG. 3 are described in detail. An exemplary method of installing a robotic system onto a powerline conductor and installing a fiber optic cable onto the powerline conductor is discussed in connection with FIG. 55. Further, an exemplary method of a robotic system avoiding obstacles along a powerline conductor is described in conjunction with FIG. 56. In association with FIG. 57, an exemplary method of a robotic system transitioning between upside-down and right-side-up positions on a powerline conductor is explained. Another exemplary system including software modules for performing various operations is discussed in conjunction with FIG. 58.

FIG. 1 is a graphical representation of an exemplary operating environment 100 in which various embodiments disclosed herein may be utilized. As depicted in the example of FIG. 1, operating environment 100 may include an electrical power transmission or distribution system having a plurality of utility poles 102 carrying multiple powerline conductors 101. Examples of powerline conductors 101 may include stranded cables, but powerline conductors 101 are not restricted to such embodiments. While any number of powerline conductors 101 may be carried via utility poles 102, two powerline conductors 101 are illustrated in FIG. 1 for visual simplicity. In some examples, powerline conductors 101 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 101 may be included and covered in various embodiments of operating environment 100 discussed below. Additionally, powerline conductors 101 may include one or more phase conductors, ground wires, static wires, or other conductors supported by utility poles 102, towers, or the like.

Also shown in FIG. 1 is a fiber optic cable 112 aligned with, and mechanically coupled to, powerline conductor 101. In some embodiments, fiber optic cable 112 may be helically wrapped about powerline conductor 101, such as by way of a human-powered or electrically powered robotic device. However, other physical relationships between powerline conductor 101 and fiber optic cable 112 are also possible. While only one fiber optic cable 112 is depicted in FIG. 1, multiple powerline conductors 101 employing the same utility poles 102 may each have a corresponding fiber optic cable 112 attached or otherwise coupled thereto. As depicted in FIG. 1, fiber optic cable 112 may be secured to powerline conductor 101 via one or more cable clamps 106. In some examples, fiber optic cable 112 may follow a powerline conductor 101 associated with a particular phase of the power being transmitted, or fiber optic cable 112 may alternate between two or three different phases. Moreover, each fiber optic cable 112 may carry one or more optical fibers for facilitating communication within operating environment 100.

Additionally, FIG. 1 illustrates an optical fiber splice case 108 that, in some embodiments, splices together corresponding ends of optical fibers of fiber optic cable 112. For example, relatively long stretches (e.g., multiple-kilometer spans) of fiber optic cable 112 that may be coupled to powerline conductor 101 may be mechanically coupled together, thermally fused together, or otherwise coupled in optical fiber splice case 108, which may include optical couplers, amplifiers, and/or other components to facilitate transmission of optical data signals from one span of fiber optic cable 112 to the next. Additionally, in some embodiments, optical fiber splice case 108 may include wireless access points and other networking components (e.g., for communication with Internet of Things (IoT) devices, smart grid sensors (e.g., voltage sensors, current sensors, and the like), and user access networks). Moreover, optical fiber splice case 108 may include optical, electromagnetic, and other types of sensors to measure powerline conditions; environmental sensors for measuring temperature, humidity, and so on; video cameras for surveillance; and the like. To power such components, optical fiber splice case 108 may also include solar cells and/or batteries. In some examples, such as that shown in FIG. 1, optical fiber splice case 108 may be attached to, or positioned on or near, powerline conductor 101, as opposed to being mounted on a lower portion of utility pole 102, thus potentially eliminating the use of a phase-to-ground transition that otherwise may be coupled with each length of fiber optic cable 112 to provide electrical isolation from powerline conductor 101.

Figure 2:
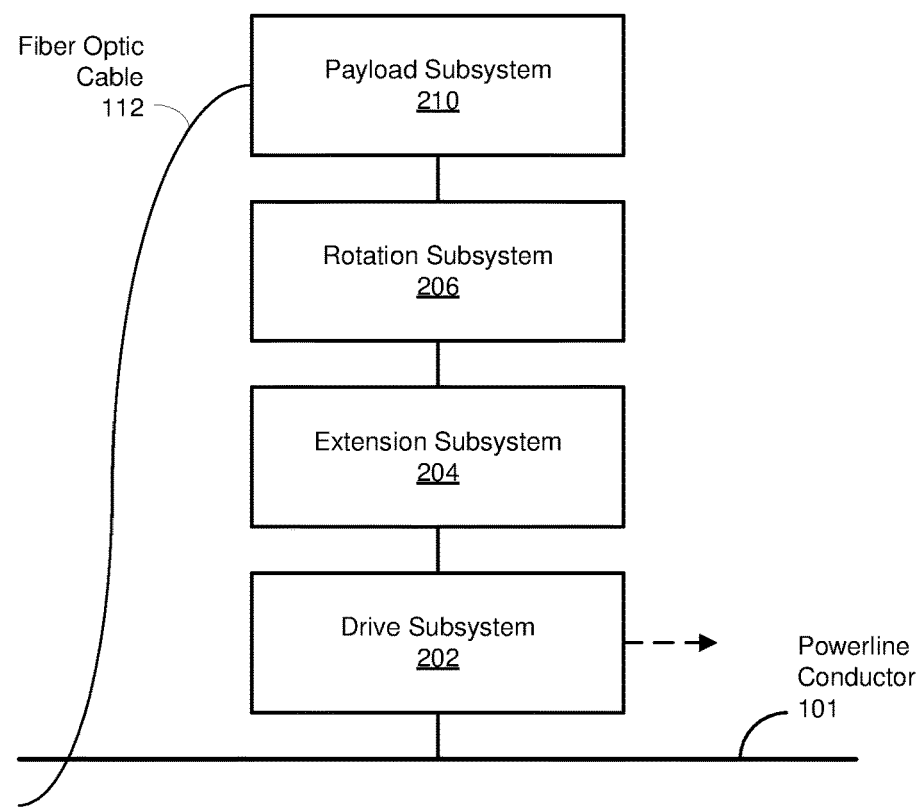
FIG. 2 is a block diagram of an exemplary robotic system that may install a segment of fiber optic cable about a powerline conductor.
Figure 3:
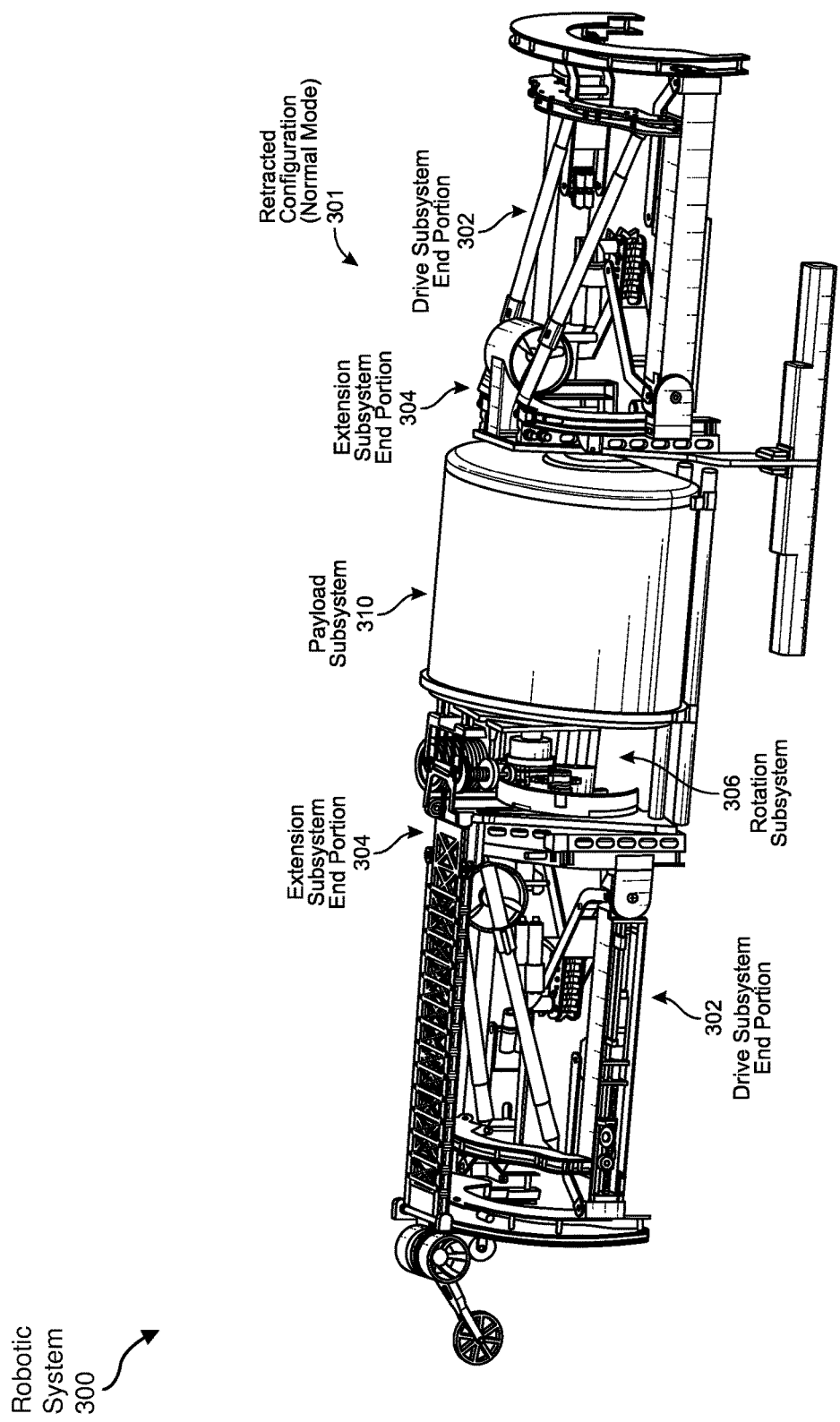
FIG. 3 is a perspective view of a retracted configuration of an exemplary robotic system that may install a segment of fiber optic cable about a powerline conductor.

FIG. 2 is a block diagram of an exemplary robotic system 200 for installing fiber optic cable (e.g., fiber optic cable 112) onto a powerline conductor (e.g., powerline conductor 101). As depicted in FIG. 2, robotic system 200 may include a drive subsystem 202, an extension subsystem 204, a rotation subsystem 206, and/or a payload subsystem 210. In some embodiments, FIG. 2 provides a general representation of how subsystems 202-210 are mechanically coupled to each other, although other examples may possess alternative connection arrangements. In some embodiments, drive subsystem 202 may translate along powerline conductor 101. Also, in some examples, extension subsystem 204 may mechanically couple rotation subsystem 206 to drive subsystem 202 and selectively extend rotation subsystem 206, along with payload subsystem 210, away from drive subsystem 202 and/or powerline conductor 101 to avoid obstacles (e.g., insulators 104) along powerline conductor 101. Rotation subsystem 206, in some examples, may rotate payload subsystem 210, which may in turn carry a segment of fiber optic cable 112, about powerline conductor 101 while drive subsystem 202 translates along powerline conductor 101 such that the segment of fiber optic cable 112 is wrapped helically about powerline conductor 101.

Moreover, in some embodiments, rotation subsystem 206 may include one or more stabilization components (e.g., one or more thrusters) that may help attain or maintain a desired position of rotation subsystem 206 and/or other portions of robotic system 200 relative to powerline conductor 101. As described in greater detail below, that position may be directly above powerline conductor 101. Further, in some examples, the stabilization components may be employed at least during times when extension subsystem 204 is extending rotation subsystem 206 (and, consequently, payload subsystem 210) away from powerline conductor 101.

Figure 4:
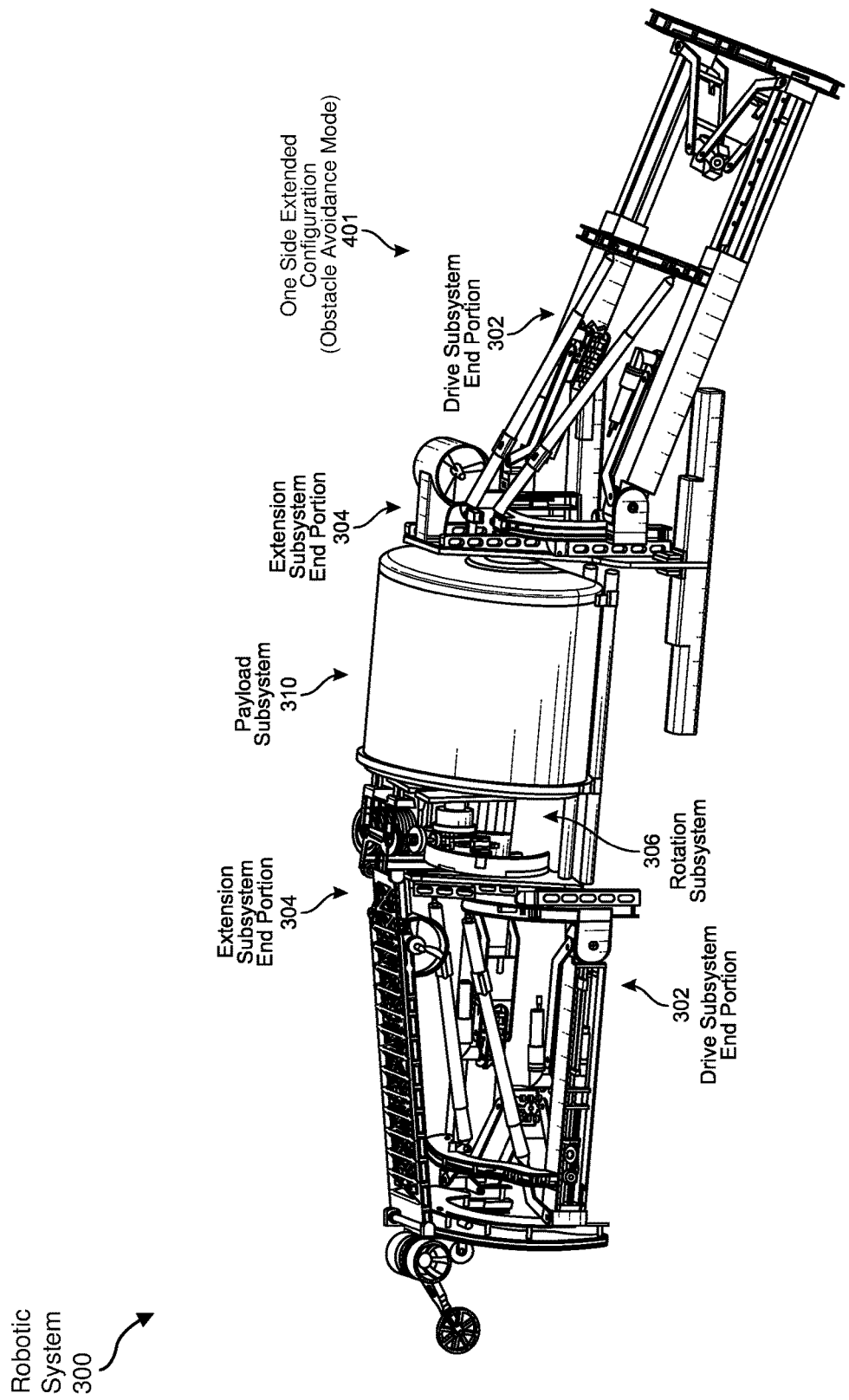
FIG. 4 is a perspective view of a one-side-extended configuration of the exemplary robotic system of FIG. 3.

FIGS. 3 and 4 are perspective views of associated configurations of an exemplary robotic system 300, which may serve as an embodiment of robotic system 200 of FIG. 2, as described above. As illustrated in FIGS. 3 and 4, drive subsystem 202 may include separate drive subsystem end portions 302, and extension subsystem 204 may include separate extension subsystem end portions 304 mechanically coupled to corresponding drive subsystem end portions 302. In some embodiments, robotic system 300 may include a first (e.g., leading or fore) end and a second (e.g., trailing or aft) end that may be determined by a direction in which robotic system 300 translates along powerline conductor 101, with each end corresponding to a drive subsystem end portion 302 and an extension subsystem end portion 304. Additionally, a rotation subsystem 306 (e.g., serving as rotation subsystem 206), or some portion thereof, may be coupled at opposing ends to extension subsystem end portions 304. Further, a payload subsystem 310 (e.g., serving as payload subsystem 210 of FIG. 2) carrying a segment of fiber optic cable 112 may be connected to, and held within, rotation subsystem 306.

During normal operation (e.g., while not in an obstacle-avoidance scenario), robotic system 300 may be in a retracted configuration 301, as depicted in FIG. 3, in which both drive subsystem end portions 302 are in a retracted, or non-extended, state, and in which at least one drive subsystem end portion 302 may propel robotic system 300 along powerline conductor 101 (not shown in FIG. 3) while rotation subsystem 306 may rotate about its longitudinal axis that substantially aligns with powerline conductor 101 and while payload subsystem 310 pays out a segment of fiber optic cable 112 (also not shown in FIG. 3), resulting in the segment of fiber optic cable 112 being helically wrapped about powerline conductor 101. In addition, in some examples, extension subsystem end portions 304 may retain rotation subsystem 306 in a retracted state so that rotation subsystem 306 and payload subsystem 310 remain close to powerline conductor 101, thus increasing the physical stability of the system while installing fiber optic cable 112.

In some embodiments, each drive subsystem end portion 302 may be independently operated in a retracted or extended state (e.g., longitudinally along powerline conductor 101 to facilitate obstacle avoidance), as is described in greater detail below. Other examples, described below in conjunction with FIGS. 52-54, may not include extendable or retractable versions of drive subsystem end portion 302. FIG. 4 is a perspective view of robotic system 300 in a one side extended configuration 401, in which one drive subsystem end portion 302 is in an extended state (e.g., to extend a distance between pairs of "clamps" or "grippers" for engaging with powerline conductor 101). In some examples, each drive subsystem end portion 302 may engage (e.g., clamp or grip) powerline conductor 101 at two or more points using such pairs of clamps or grippers while translating along powerline conductor 101. Additionally, in some embodiments, upon encountering an obstacle (e.g., insulator 104), each drive subsystem end portion 302 may selectively release powerline conductor 101 at least at one point while selectively continuing to clamp powerline conductor 101 at least at one other point, thus facilitating avoidance of the obstacle while continuing to engage powerline conductor 101 at each drive subsystem end portion 302. Additionally, the same drive subsystem end portion 302 of FIG. 4 is in a pitch-down configuration (e.g., to accommodate vertical changes in the direction of powerline conductor 101), as discussed more fully below.

Moreover, to further facilitate obstacle avoidance, extension subsystem end portions 304 may extend rotation subsystem 306 away from drive subsystem end portions 302 and/or powerline conductor 101 (e.g., upward) as drive subsystem end portions 302 translate along powerline conductor 101, thus allowing rotation subsystem 306 to pass over the obstacle. In addition, in some examples, rotation subsystem 306 may include one or more stabilizing components (e.g., thrusters) to stabilize the position of rotation subsystem 306, and thus robotic system 300, such as by maintaining the current rotational position of robotic system 300 relative to powerline conductor 101 (e.g., in the orientation illustrated in FIGS. 3 and 4). In some embodiments, rotation subsystem 306 may provide stabilization only while extension subsystem end portions 304 extends rotation subsystem 306 upward or may provide such stabilization at other times as well.

Figure 5:
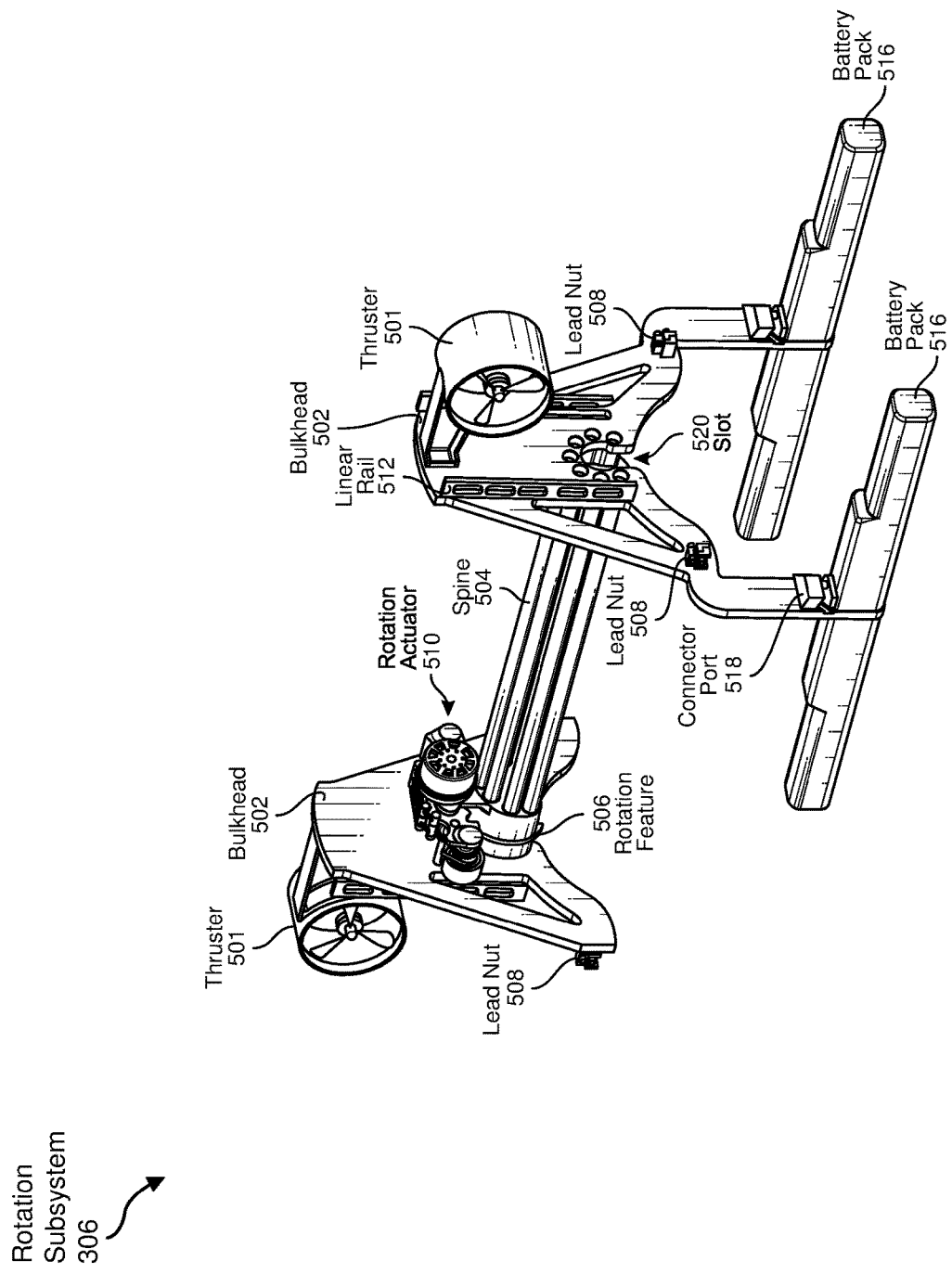
FIG. 5 is a perspective view of an exemplary rotation subsystem employable in the robotic system of FIG. 3.

FIG. 5 is a perspective view of an exemplary rotation subsystem 306 employable in the robotic system 300 of FIG. 3. As illustrated in FIG. 5, rotation subsystem 306 may include a spine 504 rigidly coupled at opposing ends to separate bulkheads 502. In some examples, each bulkhead 502 may define a slot 520 extending from a center location of bulkhead 502 to a periphery of bulkhead 502. Also, in some embodiments, spine 504 may be hollow and generally cylindrically-shaped while defining a gap that aligns with slot 520 of bulkheads 502, thus allowing rotation subsystem 306, along with the remainder of robotic system 300, to be mounted onto powerline conductor 101.

In some embodiments, each bulkhead 502 may be employed to slidably couple rotation subsystem 306 to a corresponding extension subsystem end portion 304. For example, attached to each bulkhead 502 may be one or more linear rails 512 that may slidably engage corresponding structures (e.g., roller bearing assemblies) of extension subsystem end portion 304, discussed in greater depth below. Further, in some embodiments, attached to each bulkhead 502 may be one or more lead nuts 508 that rotatably engage one or more lead screws or similar components of a corresponding extension subsystem end portion 304 such that rotation of a lead screw may cause lead nut 508 and associated bulkhead 502 to rise or descend relative to extension subsystem end portion 304, as discussed above.

Also, in some embodiments, rotation subsystem 306 may include a rotation feature 506 (e.g., a groove, a ridge, some combination thereof, etc.) near each end of spine 504, where a portion of payload subsystem 310, described below, engages with corresponding features (e.g., bearings) to facilitate rotation of payload subsystem 310 about spine 504 and powerline conductor 101. Also, in some examples, rotation subsystem 306 may include a rotation actuator 510 (e.g., one or more electric motors and associated hardware) to engage with payload subsystem 310 to rotate payload subsystem 310 and a segment of fiber optic cable 112 about powerline conductor 101. In some embodiments, only one bulkhead 502 may include a rotation actuator 510. In other examples, such as those in which spine 504 is not present in rotation subsystem 306 (e.g., when bulkheads 502 are coupled to each other only through payload subsystem 310), both bulkheads 502 may include a rotation actuator 710 to rotate payload subsystem 310.

Also coupled to rotation subsystem 306, at each bulkhead 502, may be one or more position stabilizers, such as thrusters 501 (e.g., motor-driven propellers). In some examples, the position stabilizer may be activated to maintain rotation subsystem 306 in an upright orientation (e.g., as shown in FIG. 5). Further, the position stabilizers may facilitate rotation or "flipping" of robotic system 300 between right-side-up and inverted positions relative to powerline conductor 101 (e.g., for obstacle avoidance or loading/unloading of robotic system 300 onto or from powerline conductor 101). In some examples, the position stabilizers may also be employed to counteract or stabilize unwanted motion (e.g., oscillations) of powerline conductor 101, such as those that may be imparted by rotation subsystem 306 during fiber optic cable 112 installation. Also, in some embodiments, rotation subsystem 306 may include one or more sensors (e.g., inertial measurement unit (IMU) sensors) upon which operation of the position stabilizers are based. In some examples, other types of position stabilizers other than thrusters 501 (e.g., control moment gyroscopes (CMGs), weight-shifting systems, and so on) may be employed in other embodiments.

In the particular example of FIG. 5, a single bidirectional thruster 501 is employed for each bulkhead 502 such that the force applied by each thruster 501 may be reversed by reversing the direction of rotation. In one example, thrusters 501 may be controlled to generate thrust in the same direction at the same time. In such an example, thrusters 501 may exhibit opposite blade pitches, but may be driven in opposing directions at the same time so that they generate thrust in the same direction, thus possibly causing their opposing lateral forces to cancel. Moreover, the direction in which both thrusters 501 are rotating may be reversed simultaneously to reverse the direction of thrust. In another embodiment, thrusters 501 may be configured to generate thrust in opposing directions simultaneously, with the overall force applied to robotic system 300 being determined by the relative rotational speed, and thus the relative thrust, of each thruster 501. Other thruster 501 arrangements and control strategies using one or more thrusters 501 may be employed in other embodiments.

In some examples, such as that of FIG. 5, rotation subsystem 306 may include, on each of one or both bulkheads 502, one or more connector ports 518 for electrically connecting one or more battery packs 516 to one or more electrical components (e.g., motors, processors, sensors, and so on) of robotic system 300. In some embodiments, battery packs 516 may be positioned to balance the overall weight of robotic system 300 laterally relative to powerline conductor 101 while facilitating a more desirable location for the center of mass of robotic system 300. For example, when rotation subsystem 306 is in an upright orientation, as indicated in FIG. 5, battery packs 516 may be positioned below and on either side of powerline conductor 101 to facilitate positioning of the center of mass of robotic system 300 close to powerline conductor 101. Other positions for one or more battery packs 516 may be employed in other examples.

Figure 6:
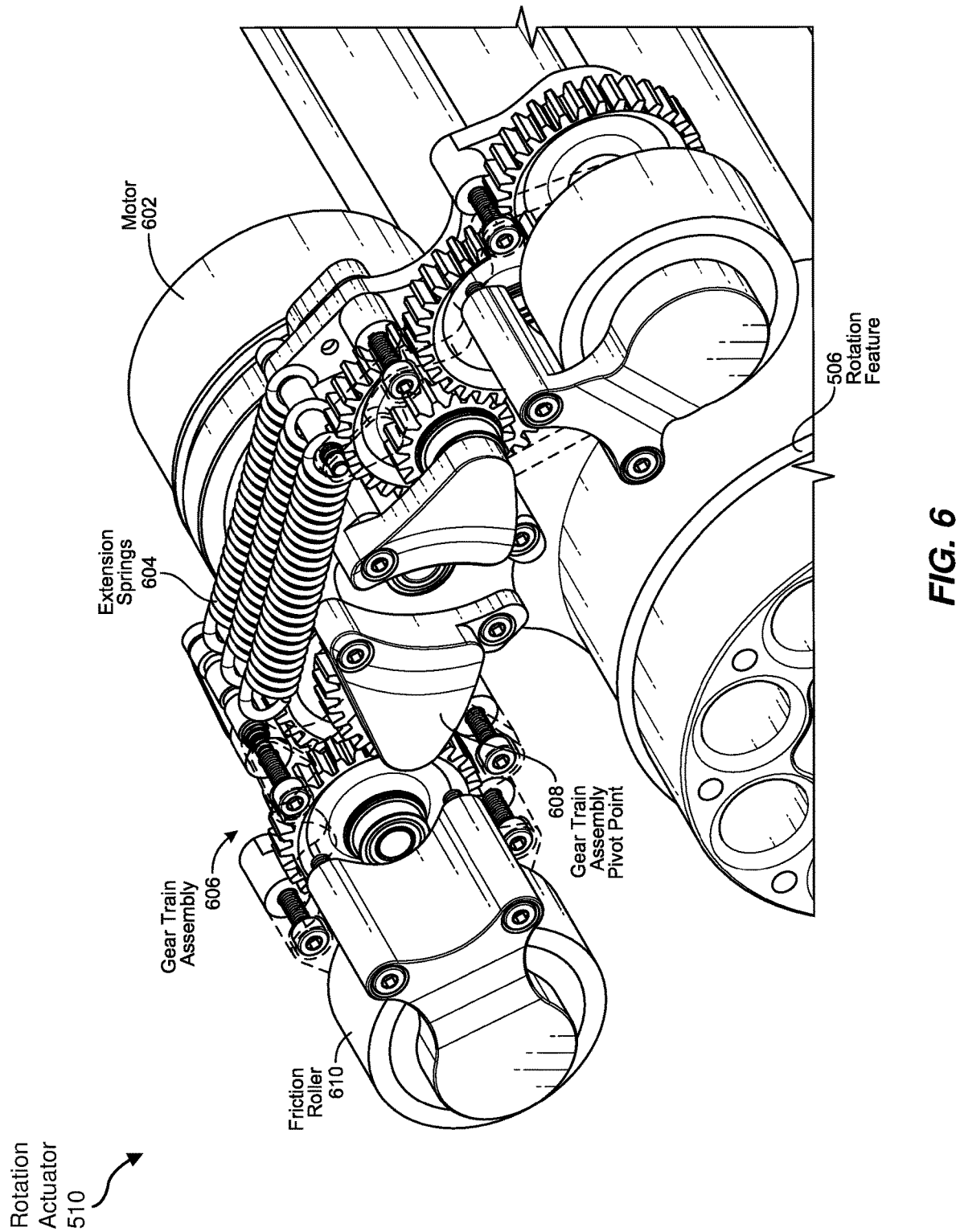
FIG. 6 is a perspective view of an exemplary rotation actuator employable in the rotation subsystem of FIG. 5.

FIG. 6 is a perspective view of an exemplary rotation actuator 510 employable in rotation subsystem 306 of FIG. 5. As depicted, rotation actuator 510 may include a motor 602 coupled to two friction rollers 610 by way of corresponding gear train assemblies 606. Further, one or more extension springs 604 may operate to rotate each gear train assembly 606 and associated friction roller 610 about a corresponding gear train assembly pivot point 608 to urge each friction roller 610 against an inner contact surface (e.g., a rotation drive ring 704 shown in FIG. 7) of payload subsystem 310. Accordingly, under such circumstances, actuation of motor 602 may cause rotation of each friction roller 610 via gear train assemblies 606 to rotate payload subsystem 310 about spine 504 of rotation subsystem 306 by way of rotation features 506.

Figure 7:
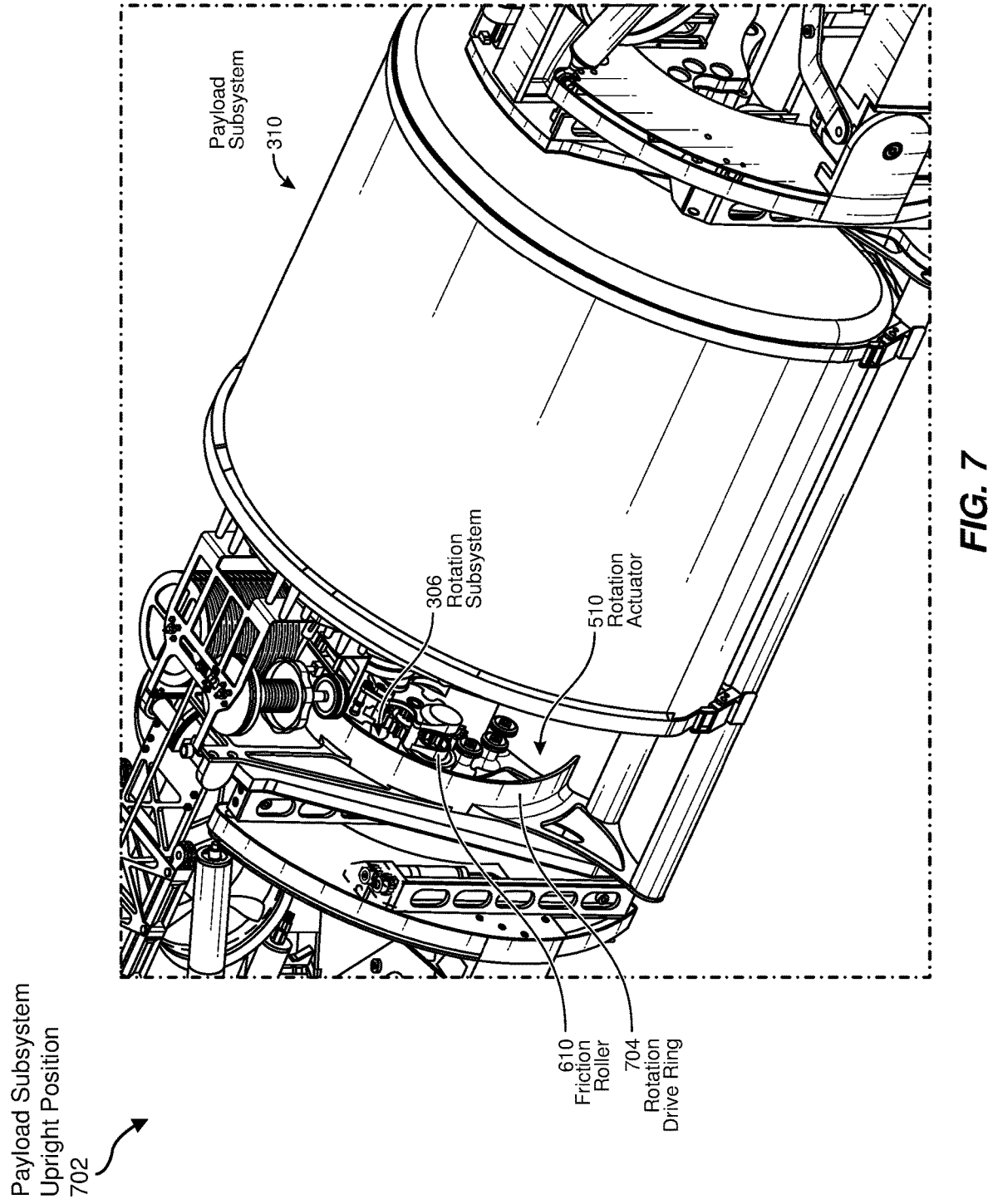
FIG. 7 is a perspective view of an exemplary payload subsystem, as being rotated by the rotation actuator of FIG. 6, when in an upright position.
Figure 8:
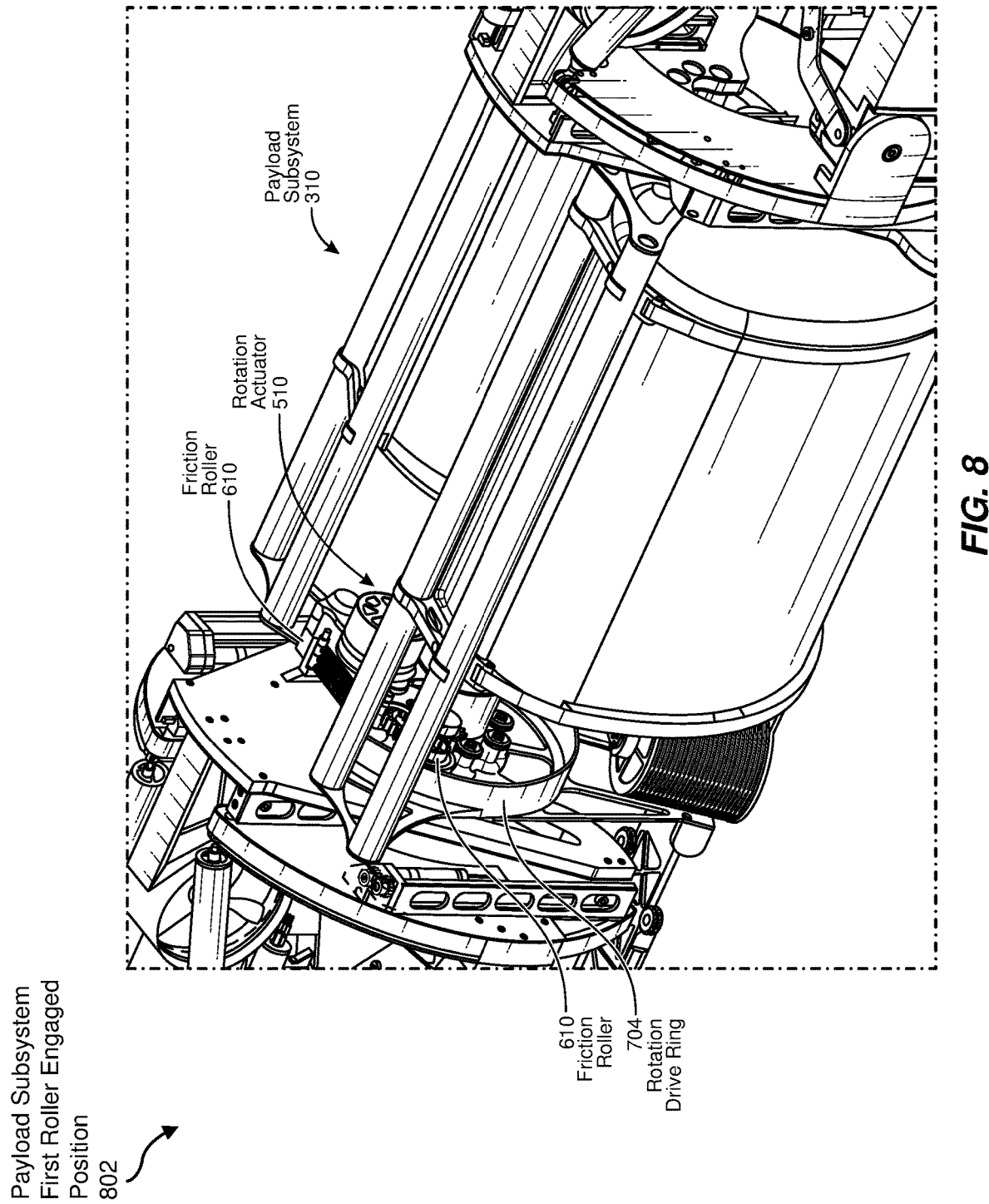
FIG. 8 is a perspective view of the payload subsystem of FIG. 7, as being rotated by the rotation actuator of FIG. 6, when only a first friction roller of the rotation actuator is engaged.
Figure 9:
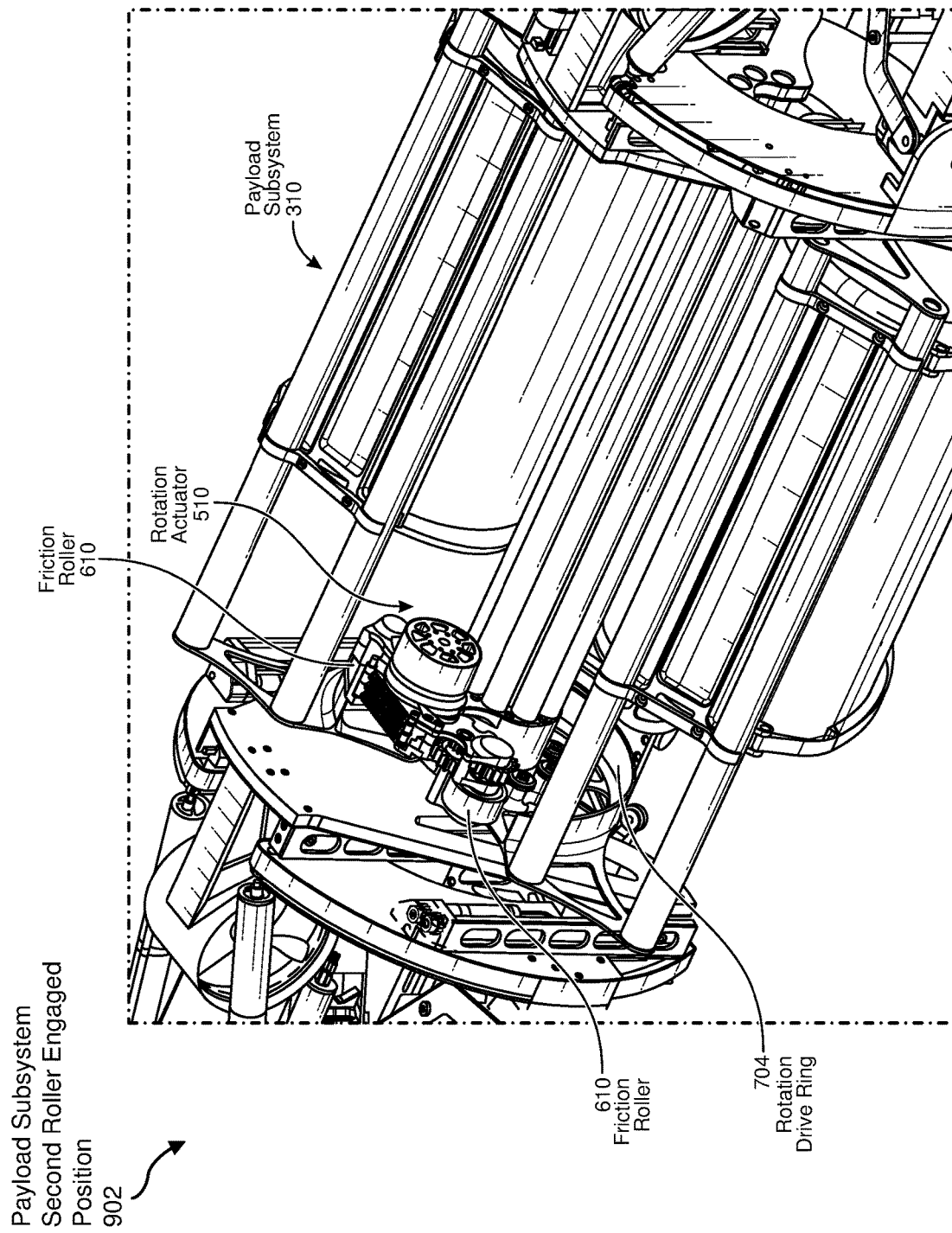
FIG. 9 is a perspective view of the payload subsystem of FIG. 7, as being rotated by the rotation actuator of FIG. 6, when only a second friction roller of the rotation actuator is engaged.

As is described in greater detail below, rotation drive ring 704 of payload subsystem 310 may incorporate a gap similar to slot 520 of rotation subsystem 306 to enable loading of robotic system 300 onto powerline conductor 101. Consequently, during rotation of payload subsystem 310 about powerline conductor 101, at least one friction roller 610 may remain in contact with rotation drive ring 704 of payload subsystem 310 during each rotation. FIGS. 7-9 are perspective views of payload subsystem 310 at various positions during rotation about powerline conductor 101. For example, FIG. 7 is a view of payload subsystem 310 when in an upright position 702, during which both friction rollers 610 are engaged with rotation drive ring 704. As rotation actuator 510 of rotation subsystem 306 continues to rotate payload subsystem 310, only one of friction rollers 610 is making contact with rotation drive ring 704, as illustrated in FIG. 8. Thereafter, as rotation continues, the previously unengaged friction roller 610 reengages rotation drive ring 704, after which the other friction roller 610 loses contact with rotation drive ring 704, as depicted in FIG. 9. In some embodiments, based on a single motor 602 driving both friction rollers 610 simultaneously through dual gear train assemblies 606, the same total torque may be applied via rotation drive ring 704 regardless of whether one or more both friction rollers 610 are engaged with rotation drive ring 704.

Figure 10:
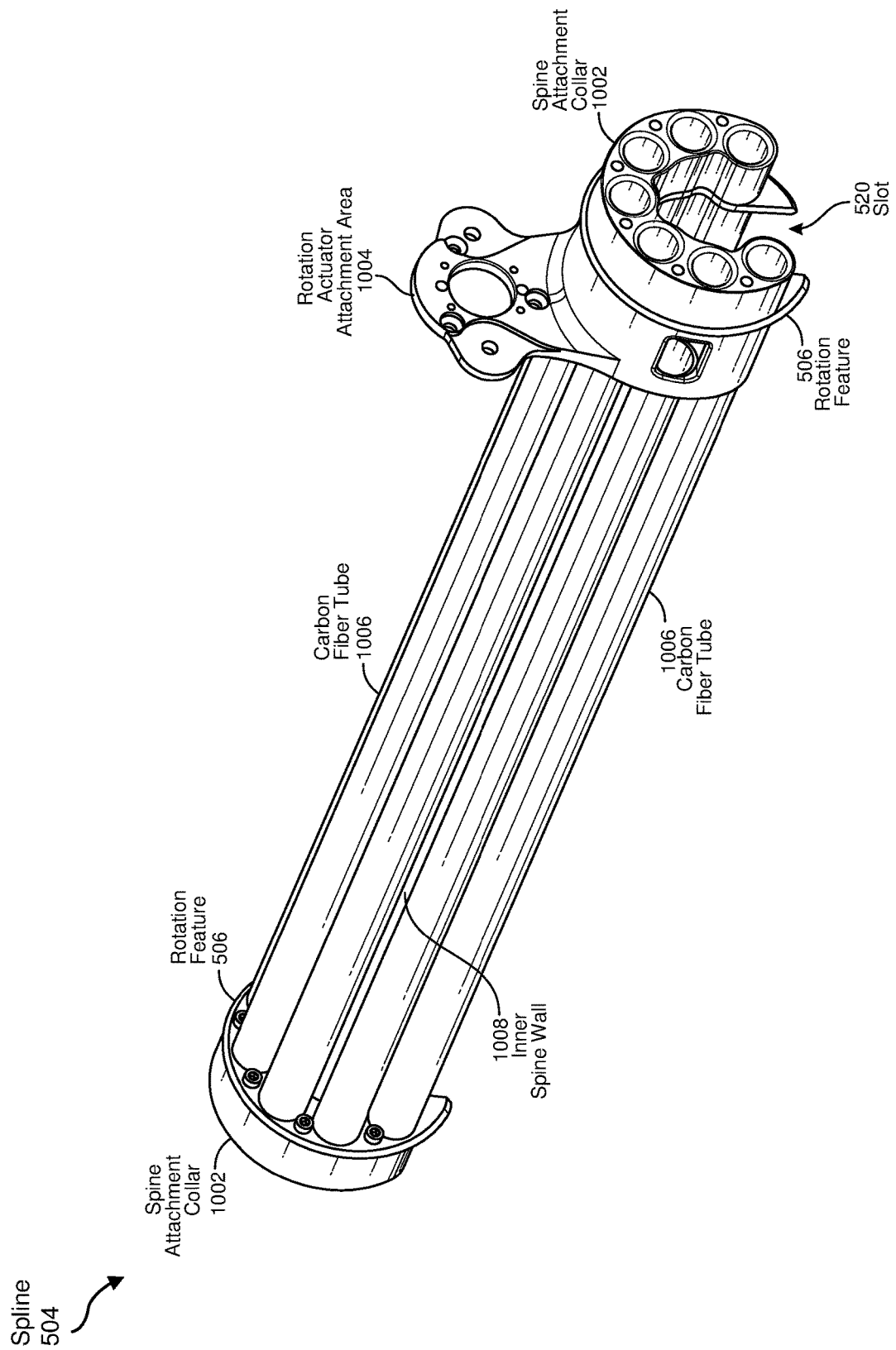
FIG. 10 is a perspective view of an exemplary spine of the rotation subsystem of FIG. 5.

FIG. 10 is a perspective view of spine 504 of rotation subsystem 306 of FIG. 5. As shown, spine 504 may include multiple parallel carbon fiber tubes 1006 arranged radially about a longitudinal axis of spine 504 and defining slot 520. In some embodiments, carbon fiber tubes 1006 may be joined together by way of an inner spine wall 1008 (e.g., also made of a carbon fiber material) to further reinforce spine 504, which joins bulkhead 502 and generally joins the two ends of robotic system 300. In other examples, carbon fiber tubes 1006 may be joined by way of both inner spine wall 1008 and an outer spine wall covering the outer circumferences of carbon fiber tubes 1006, an outer spine wall alone, or without a wall at all. Also, in some examples, carbon fiber tubes 1006 may be joined together at corresponding ends by spine attachment collar 1002. Further, each spine attachment collar 1002 may include rotation feature 506, as mentioned above in conjunction with FIG. 5 to facilitate rotation of payload subsystem 310 about powerline conductor 101. Additionally, at least one of spine attachment collars 1002 may include a rotation actuator attachment area 1004 to which rotation actuator 510 may be bolted or otherwise attached.

Figure 11:
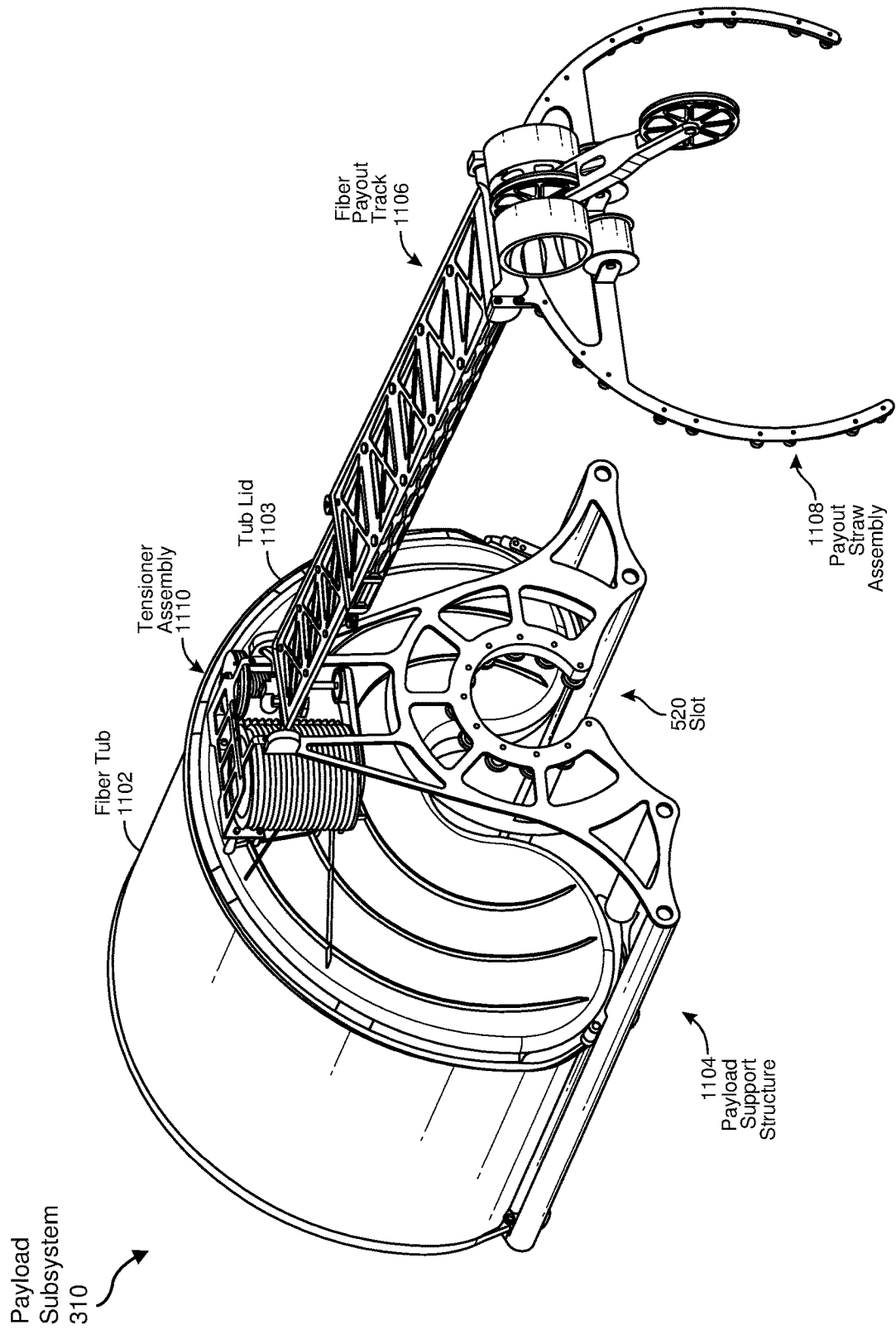
FIG. 11 is a perspective view of an exemplary payload subsystem of the robotic system of FIG. 3.

FIG. 11 is a perspective view of payload subsystem 310 of robotic system 300 of FIG. 3. As shown, payload subsystem 310 may include a payload support structure 1104 to which a fiber tub 1102, which is an example of a container, configured to carry fiber optic cable 112 prior to installation on powerline conductor 101 may be removably secured. Attached to payload support structure 1104 may be a tensioner assembly 1110 for maintaining a desirable amount of tension on fiber optic cable 112 while being helically wrapped about powerline conductor 101. Extending from payload support structure 1104 may be a fiber payout track 1106 that may guide fiber optic cable 112 from tensioner assembly 1110 to a payout straw assembly 1108. In turn, payout straw assembly 1108 may direct fiber optic cable 112 to powerline conductor 101 as rotation subsystem 306 rotates payload subsystem 310 about powerline conductor 101.

In some examples, the segment of fiber optic cable 112 carried in fiber tub 1102 prior to installation may reside on a spool or other component that facilitates the paying out of fiber optic cable 112 as rotation subsystem 306 causes payload subsystem 310 to rotate about powerline conductor 101. In yet other embodiments, the segment of fiber optic cable 112 may not reside on a spool or similar device within fiber tub 1102. As depicted in FIG. 11, fiber tub 1102 may by shaped to at least partially form slot 520 (e.g., at least partially surrounding powerline conductor 101 when payload subsystem 310 is in the retracted state), thus resulting in a center of mass for fiber tub 1102 that may be positioned closely to powerline conductor 101 while installing fiber optic cable 112 relative to a strictly cylindrical tub. In some examples, fiber tub 1102 includes a tub lid 1103 which may cover an end of fiber tub 802 and serve as an access port by which the segment of fiber optic cable 112 may be placed inside fiber tub 802 prior to installation. In addition, tub lid 1103 may define a fiber aperture 1214 through which fiber optic cable 112 passes to tensioner assembly 1110.

Figure 12:
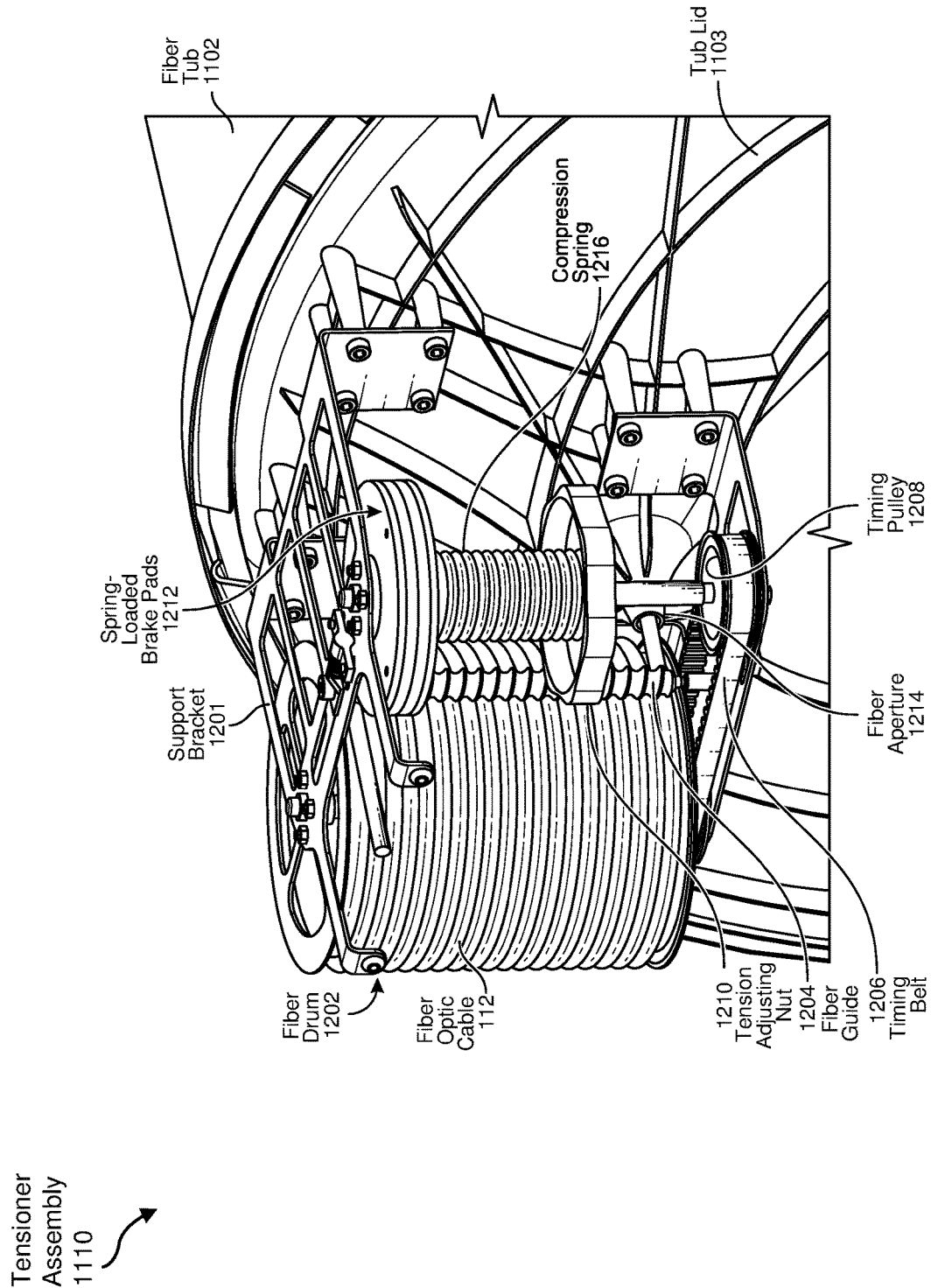
FIG. 12 is a perspective view of an exemplary tensioner assembly employable in the payload subsystem of FIG. 11.

FIG. 12 is a perspective view of an example of tensioner assembly 1110 employable in payload subsystem 310. Tensioner assembly 1110, in some embodiments, may include a support bracket 1201 that attaches to tub lid 1103 of fiber tub 1102 and that provides a platform for the remainder of tensioner assembly 1110. Rotatably coupled to support bracket 1201 is fiber drum 1202 and timing pulley 1208, which may be coupled to each other by way of a timing belt 1206. Fiber drum 1202 carries a length of fiber optic cable 112 from fiber tub 1102 in the form of a helix as fiber optic cable 112 is being installed onto powerline conductor 101. More specifically, as fiber optic cable 112 is withdrawn from a top end of fiber drum 1202, fiber drum 1202 rotates to withdraw fiber optic cable 112 from fiber tub 1102 via fiber aperture 1214. In some embodiments, a fiber guide 1204 may guide fiber optic cable 112 being received from fiber aperture 1214 onto fiber drum 1202, as well as maintain a desired position of fiber optic cable 112 on fiber drum 1202 until fiber optic cable 112 exits the top of fiber drum 1202.

To maintain a desired tension of fiber optic cable 112 when exiting fiber drum 1202, a compression spring 1216 may be coupled with a pair of brake pads 1212. In some examples, a topmost of brake pads 1212 may be fixably attached to support bracket 1201 while a bottommost of brake pads 1212 may be fixably attached to compression spring 1216, which may be fixably attached to timing pulley 1208. In operation, compression spring 1216 may provide an axial force to brake pads 1212, thus causing a rotational resistance to timing pulley 1208, and thus to fiber drum 1202 via timing belt 1206. In some embodiments, a tension adjusting nut 1210 may be threadably coupled to an axle of timing pulley 1208 such that manual rotation of the tension adjusting nut 1210 (e.g., by a human operator or installer of robotic system 300) may allow a desired amount of braking force between brake pads 1212 via compression spring 1216, and thus a corresponding amount of tension applied to fiber optic cable 112.

Figure 13:
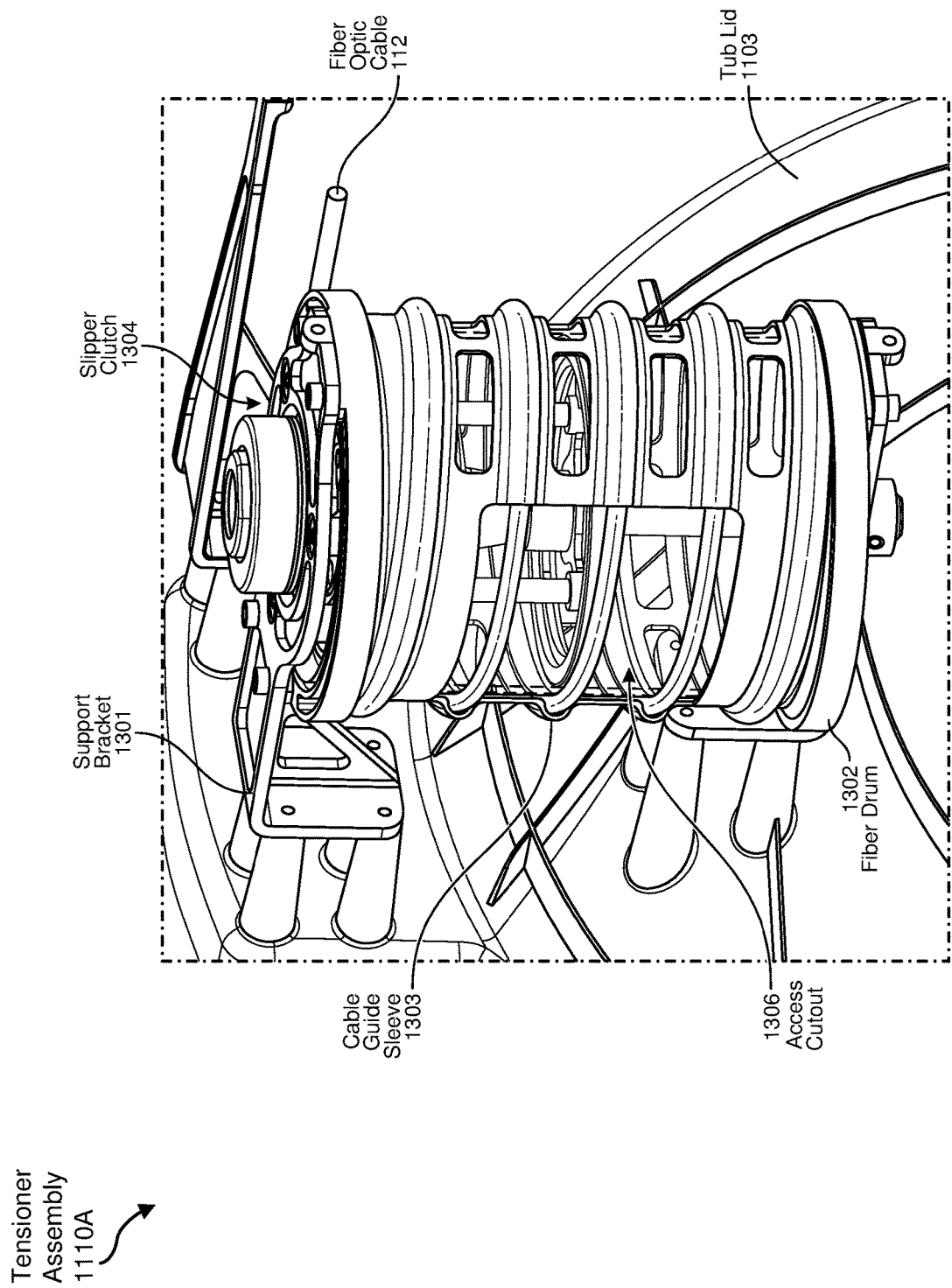
FIG. 13 is a perspective view of another exemplary tensioner assembly employable in the payload subsystem of FIG. 11.
Figure 14:
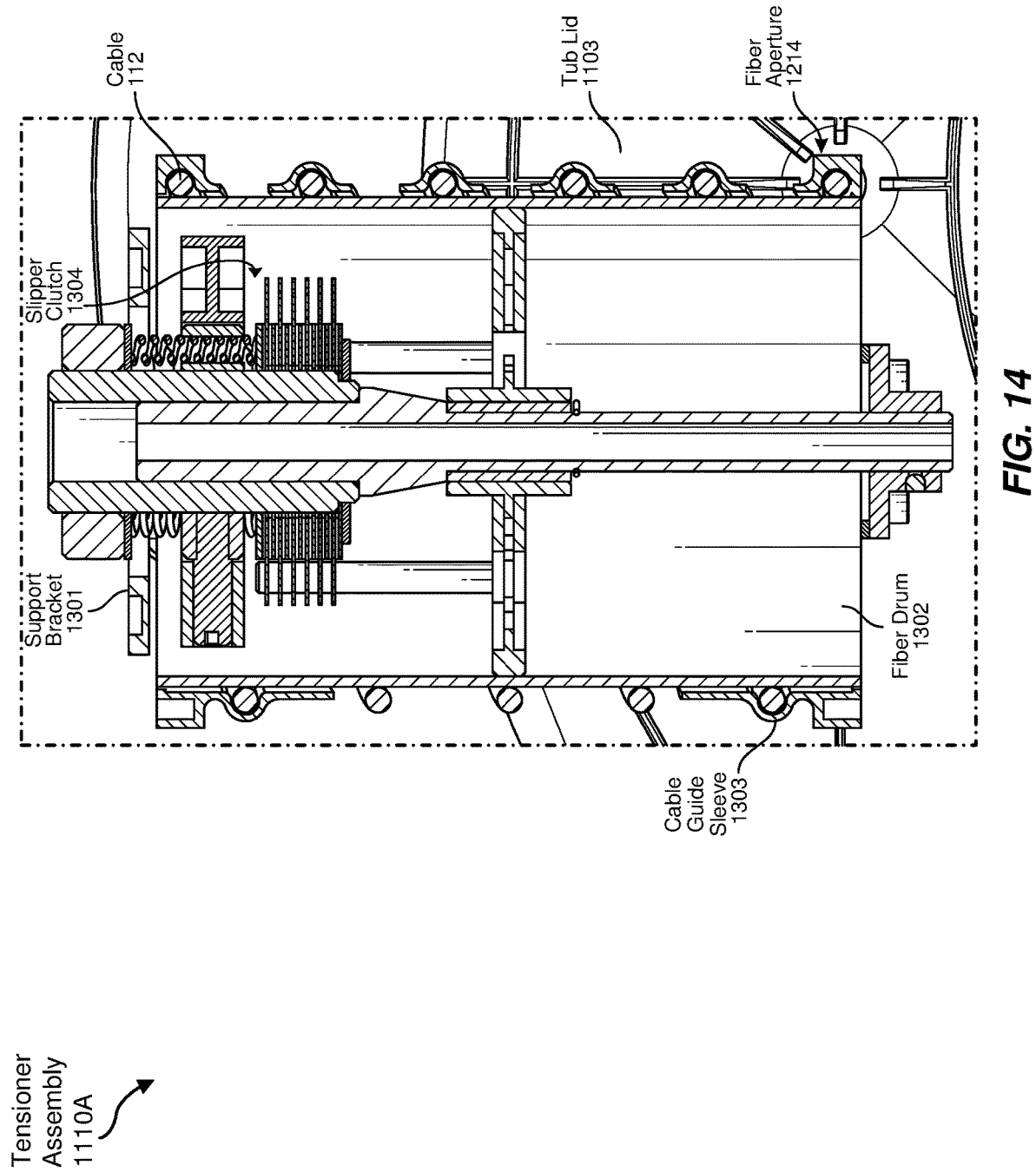
FIG. 14 is a side cross-section view of the tensioner assembly of FIG. 13.

FIG. 13 is a perspective view of another exemplary tensioner assembly 1110A employable in payload subsystem 310 of FIG. 11, while FIG. 14 provide a side cross-section view of tensioner assembly 1110A. Tensioner assembly 1110A includes a support bracket 1301 that couples a fiber drum 1302 to tub lid 1103 of fiber tub 1102 by way of a slipper clutch 1304. In some examples, fiber optic cable 112 is withdrawn from fiber tub 1102 via fiber aperture 1214 at a bottommost end of fiber drum 1302, helically winds within an interior wall of fiber drum 1302 via a helical cable guide sleeve 1303, and then exits at a topmost end of fiber drum 1302 for installation about powerline conductor 101. In some embodiments, slipper clutch 1304 may be configured to slip or rotate to facilitate withdrawal of fiber optic cable 112 from fiber drum 1302 at a desired speed and tension. Further, in some examples, fiber drum 1302 may define an access cutout 1306 that allows a human operator to load fiber optic cable 112 into fiber drum 1302 prior to installation of fiber optic cable 112 onto powerline conductor 101.

Figure 15:
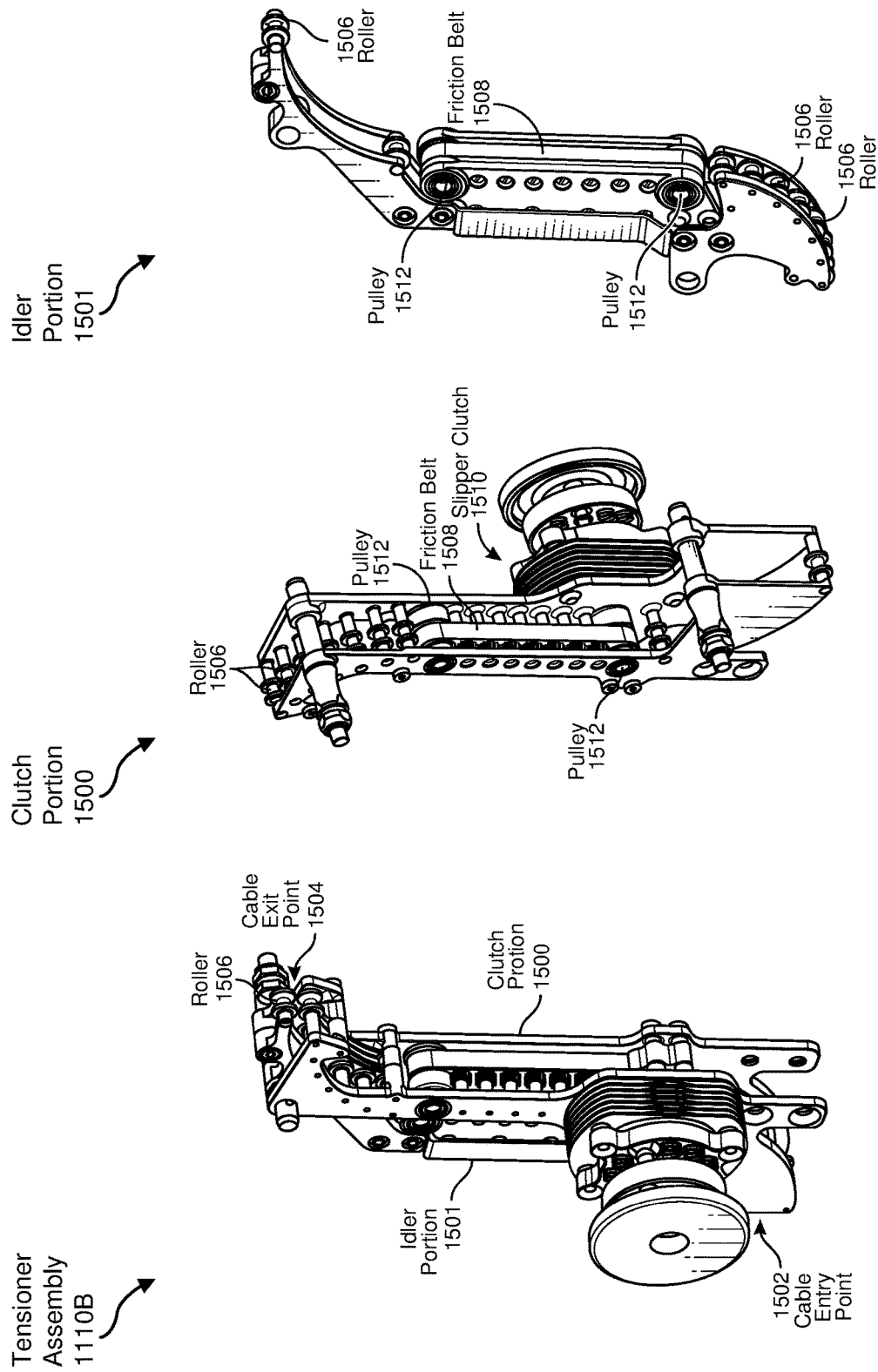
FIG. 15 includes perspective views of yet another exemplary tensioner assembly employable in the payload subsystem of FIG. 11.

FIG. 15 includes perspective views of another exemplary tensioner assembly 1110B employable in payload subsystem 310 of FIG. 11. As with tensioner assembly 1110, tensioner assembly 1110B may reside external to fiber tub 1102 and coupled to fiber payout track 1106. As illustrated in FIG. 15, in some embodiments, tensioner assembly 1110B may provide a cable entry point 1502 that accepts fiber optic cable 112 from fiber aperture 1215 of tub lid 1103, as well as a cable exit point 1504 that provides fiber optic cable 112 to fiber payout track 1106. Also, in some examples, tensioner assembly 1110B may include a clutch portion 1500 coupled to an idler portion 1501, each of which may include multiple rollers 1506 that guide fiber optic cable 112 from cable entry point 1502 to cable exit point 1504. Additionally, in some embodiments, each of clutch portion 1500 and idler portion 1501 may provide a friction belt 1508 positioned between cable entry point 1502 and cable exit point 1504 and suspended over two pulleys 1512, where friction belts 1508 engage fiber optic cable 112 at opposing sides. In some examples, friction belt 1508 of idler portion 1501 may rotate substantially freely while friction belt 1508 of clutch portion 1500 may provide a desired level of tension to fiber optic cable 112 by way of an adjustable clutch mechanism (e.g., a slipper clutch 1510 coupled to one of pulleys 1512) in a fashion similar to that of slipper clutch 1304 of tensioner assembly 1110A.

Figure 16:
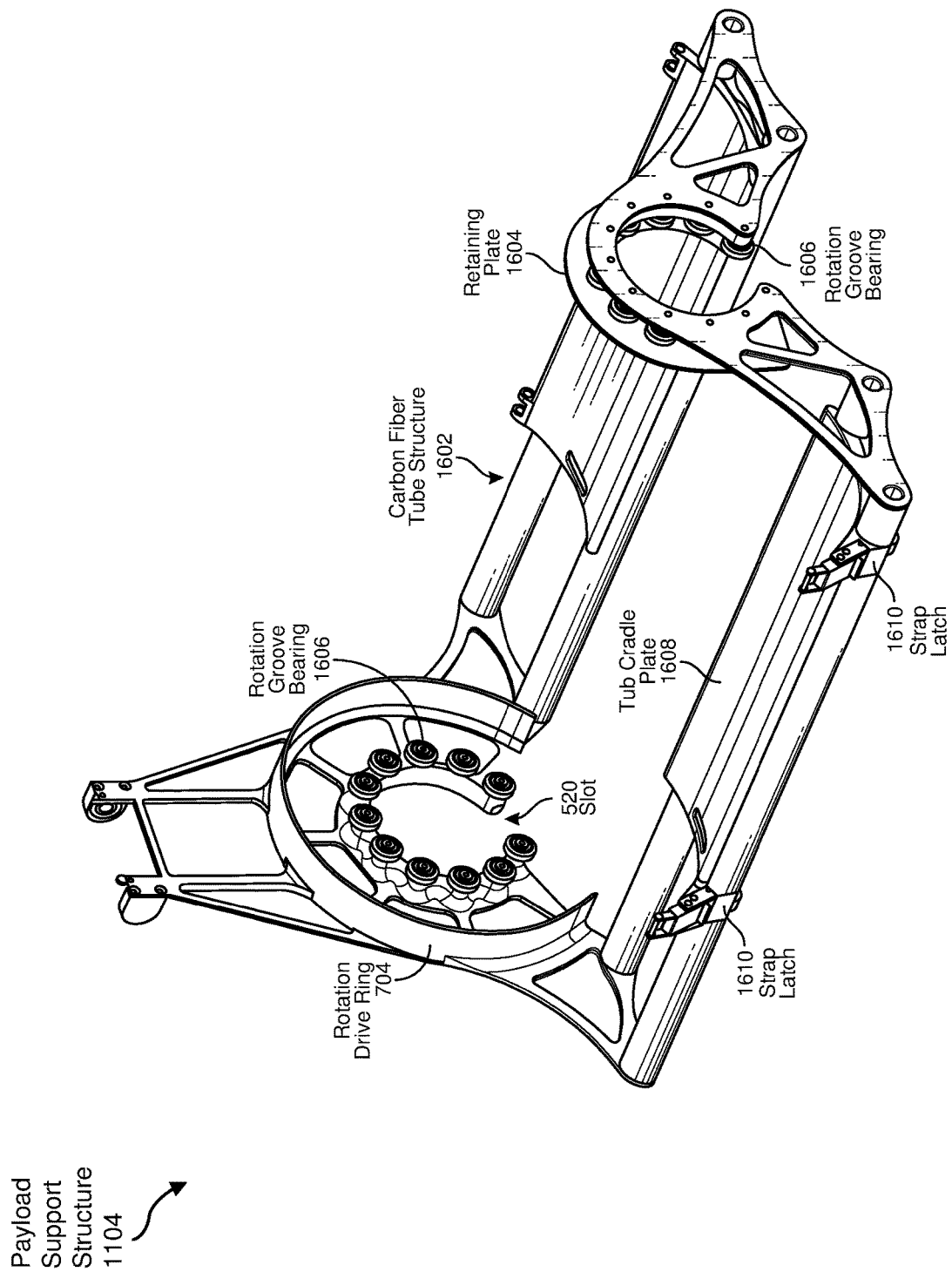
FIG. 16 is a perspective view of an exemplary payload support structure employable in the payload subsystem of FIG. 11.
Figure 17:
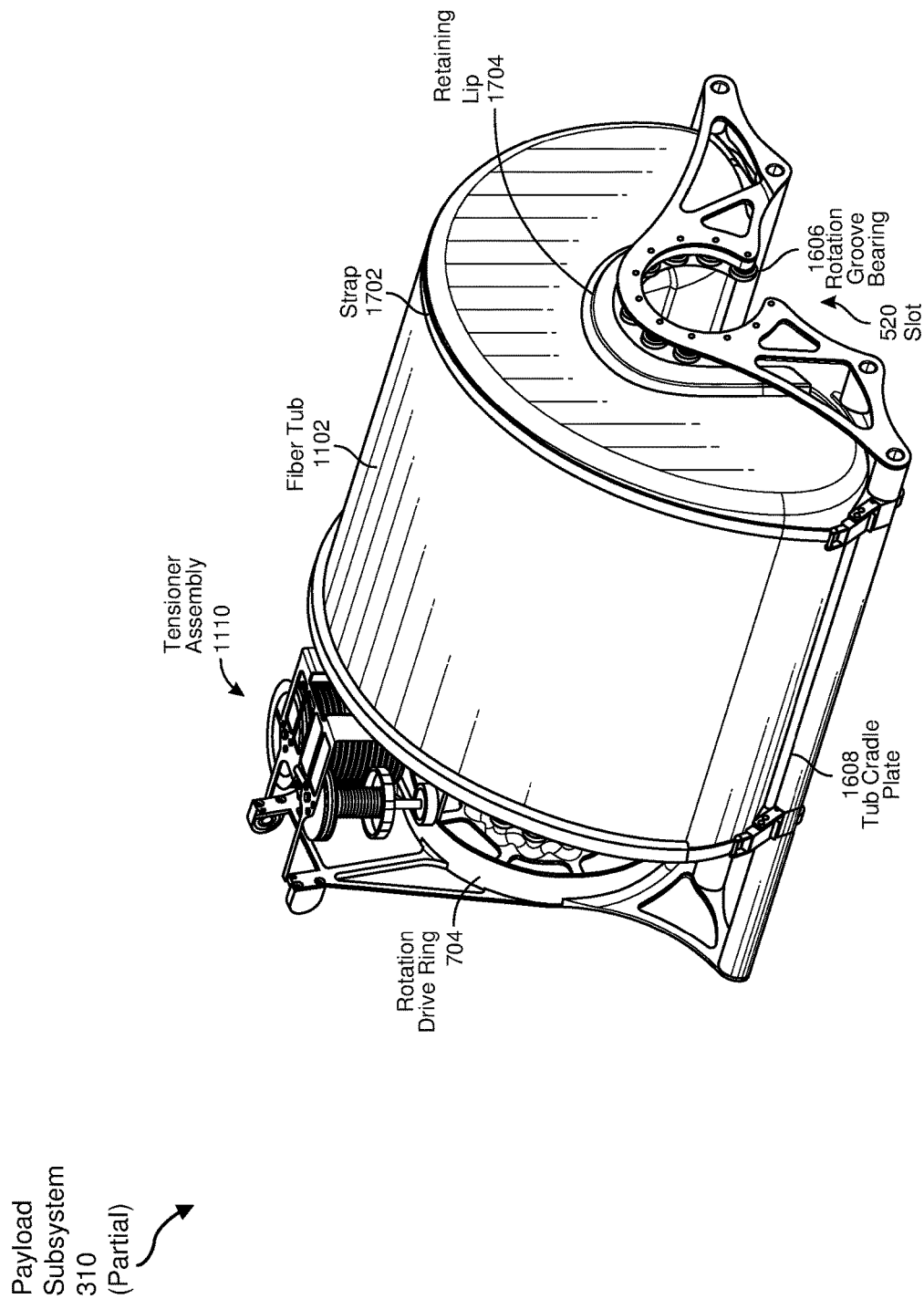
FIG. 17 is a perspective partial view of the payload system of FIG. 11.

An example of payload support structure 1104 included in payload subsystem 310 is depicted in the perspective views of FIG. 16 (without fiber tub 1102 and tensioner assembly 1110) and FIG. 17 (including fiber tub 1102 and tensioner assembly 1110). As shown, payload support structure 1104 may include a carbon fiber tube structure 1602 that includes support brackets that provide rotation groove bearings 1606 presented in a circular arrangement while defining slot 520, as well as rotation drive ring 704. As discussed above, rotation groove bearings 1606 may contact rotation features 506 of spine 504 to facilitate rotation of payload subsystem 310 about rotation subsystem 306 by rotation actuator 510.

In addition, in some embodiments, payload support structure 1104 may include tub cradle plates 1608 upon which fiber tub 1102 may be placed before being secured to payload support structure 1104 by way of straps 1702 and corresponding strap latches 1610. Also, payload support structure 1104 may include a retaining plate 1604 that contacts an interior surface of a retaining lip 1704 of fiber tub 1102 to restrict axial movement of fiber tub 1102 when secured to payload support structure 1104.

Figure 18:
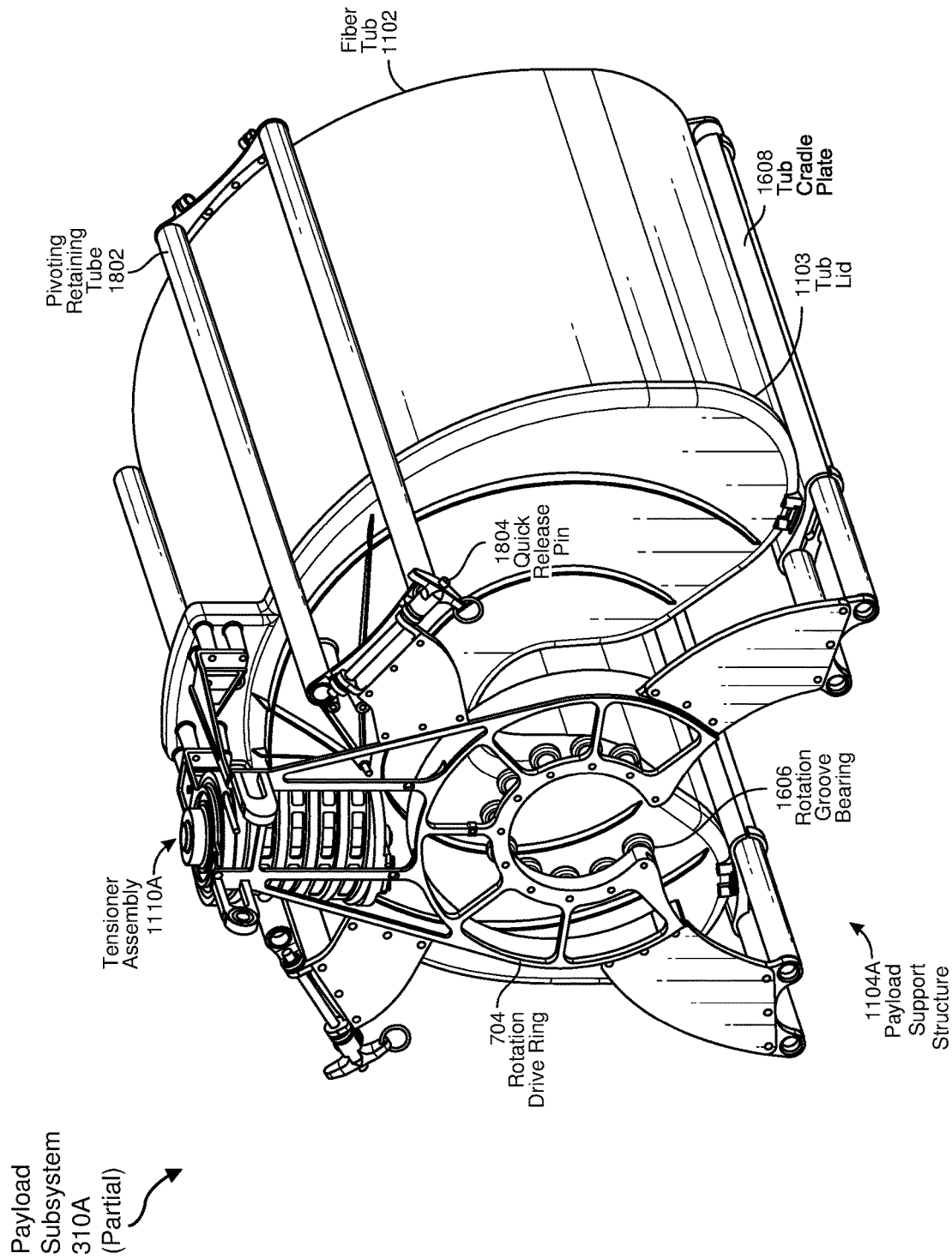
FIG. 18 is a perspective partial view of the payload system of FIG. 11 employing the tensioner assembly of FIGS. 13 and 14.

FIG. 18 is a perspective view of another exemplary payload support structure 1104A for a payload subsystem 310A, including fiber tub 1102 and tensioner assembly 1110A. In some embodiments, fiber tub 1102 and attached tensioner assembly 1110A may be secured to tub cradle plates 1608 of payload support structure 1104A by pivoting retaining tubes 1802 (e.g., carbon fiber tubes), whose free ends may be held in place via quick-release pins 1804 or other securing components.

Figure 19:
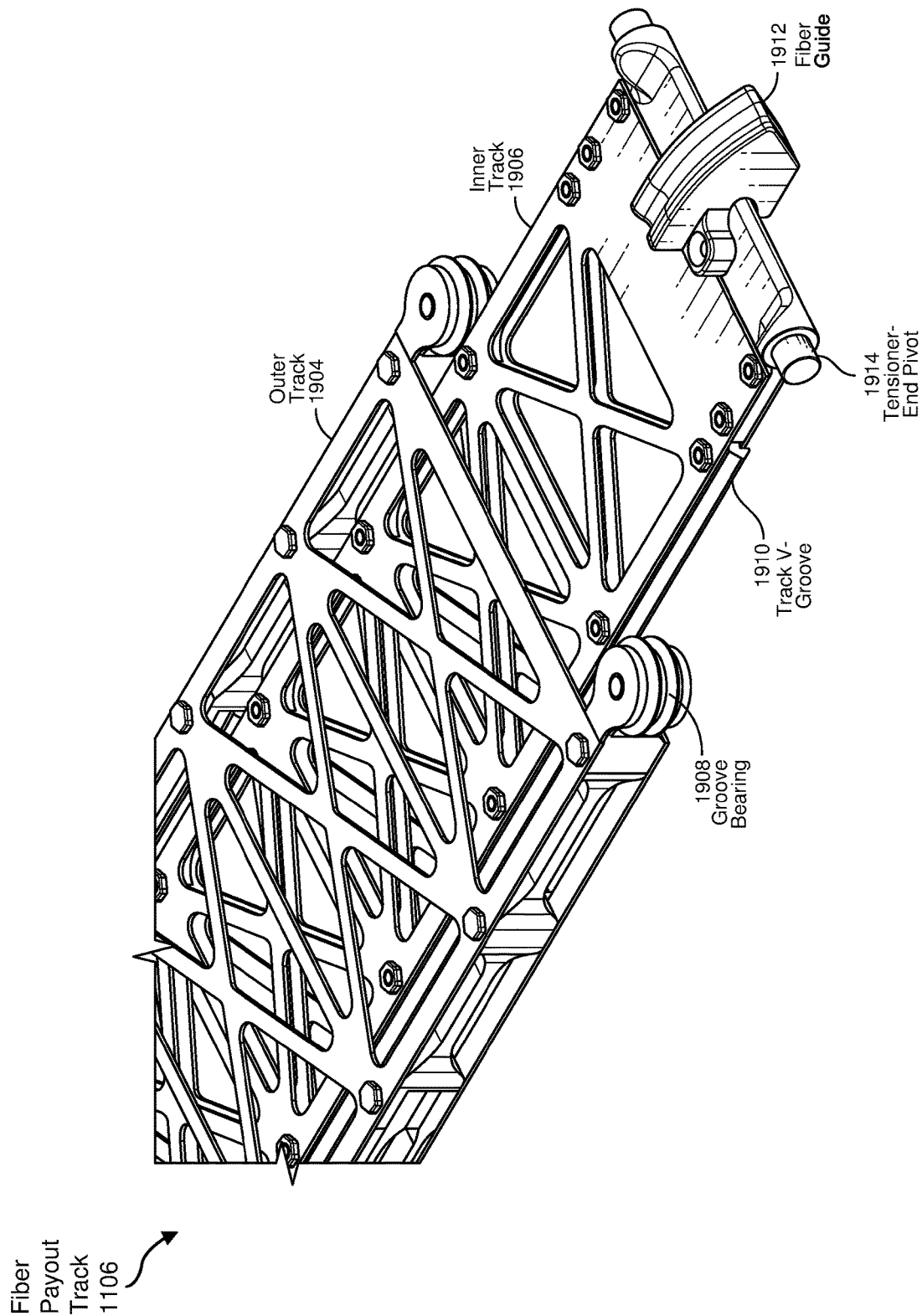
FIG. 19 is perspective view of an exemplary fiber payout track employable in the payload subsystem of FIG. 11.

FIG. 19 is a perspective partial view of an exemplary fiber payout track 1106 of payload subsystem 310, depicting a proximal end of fiber payout track 1106 coupled to tensioner assembly 1110. Fiber payout track 1106 may include an outer track 1904 that may slide along inner track 1906 in response to the movement of other portions of robotic system 300, such as the extension and/or vertical pivoting of corresponding drive subsystem end portion 302, as described more fully below. The movement of outer track 1904 relative to inner track 1906 may be facilitated in some examples by way of track V-grooves 1910 located on opposing edges of inner track 1906 mating with groove bearings 1908 of outer track 1904. Further, in some embodiments, the proximal end of inner track 1906 may include a physical component having a tensioner-end pivot 1914 and a fiber guide 1912, over which fiber optic cable 112 may pass from tensioner assembly 1110, 1110A, or 1110B toward payout straw assembly 1108, as shown in FIG. 11.

Figure 20:
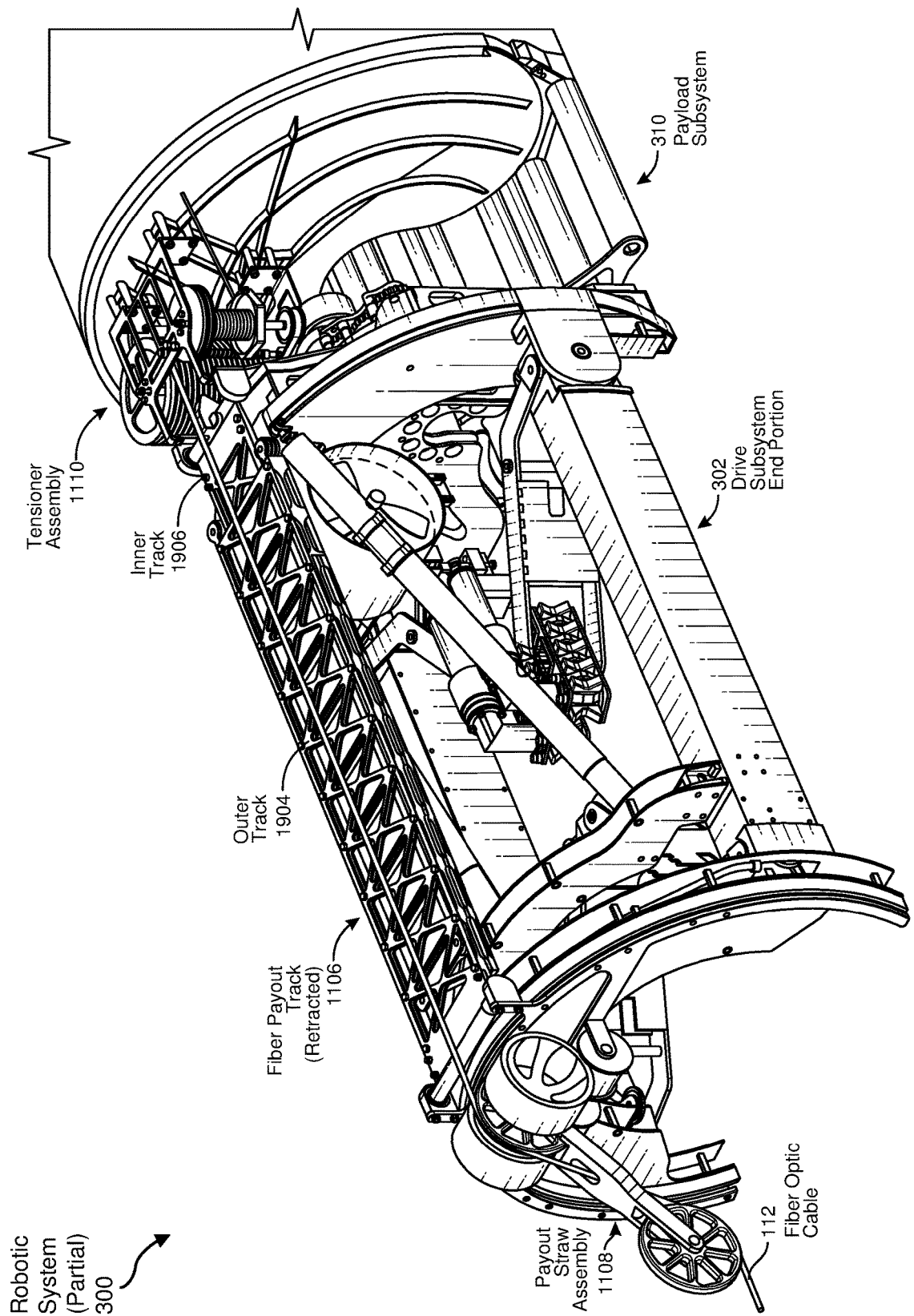
FIG. 20 is a perspective partial view of the robotic system of FIG. 3 showing the fiber payout track of FIG. 19 in a retracted state.
Figure 21:
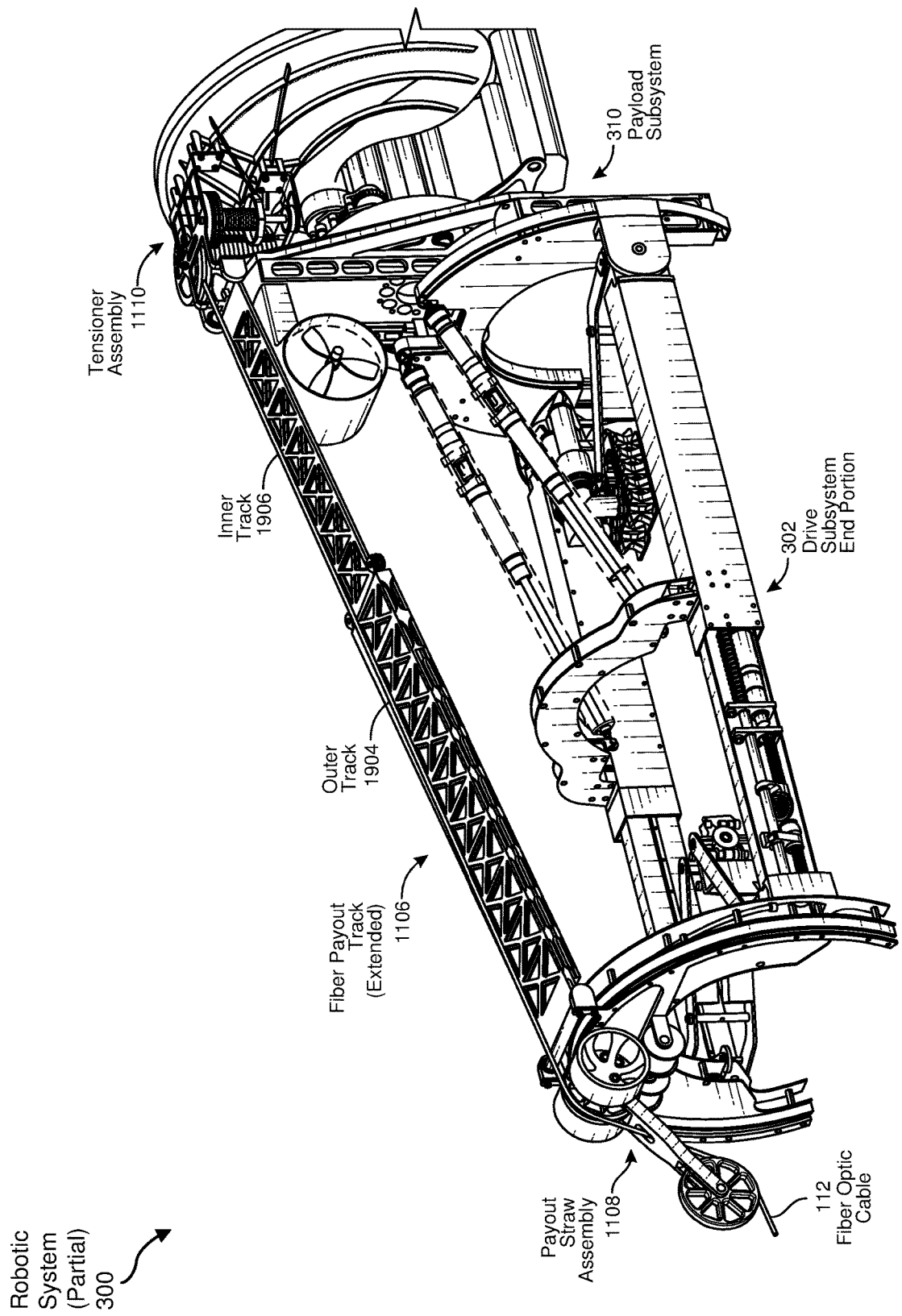
FIG. 21 is a perspective partial view of the robotic system of FIG. 3 showing the fiber payout track of FIG. 19 in an extended state.

FIG. 20 is a perspective partial view of robotic system 300 showing fiber payout track 1106 in a retracted state, and FIG. 21 is a perspective partial view of robotic system 300 showing fiber payout track 1106 in an extended state. As shown, FIG. 20 depicts robotic system 300 in a normal mode in which fiber optic cable 112 is installed onto powerline conductor 101, with drive subsystem end portion 302 being retracted as a result of drive subsystem end portion 302 being in a level, retracted state, and payload subsystem 310 being in a normal, non-extended position (e.g., as provided via extension subsystem end portions 304, discussed in greater detail below). Oppositely, FIG. 21 illustrates robotic system 300 in an obstacle avoidance mode, in which drive subsystem end portion 302 is in a level, extended state and payload subsystem 310 is in an extended position by extension subsystem end portions 304.

Figure 22:
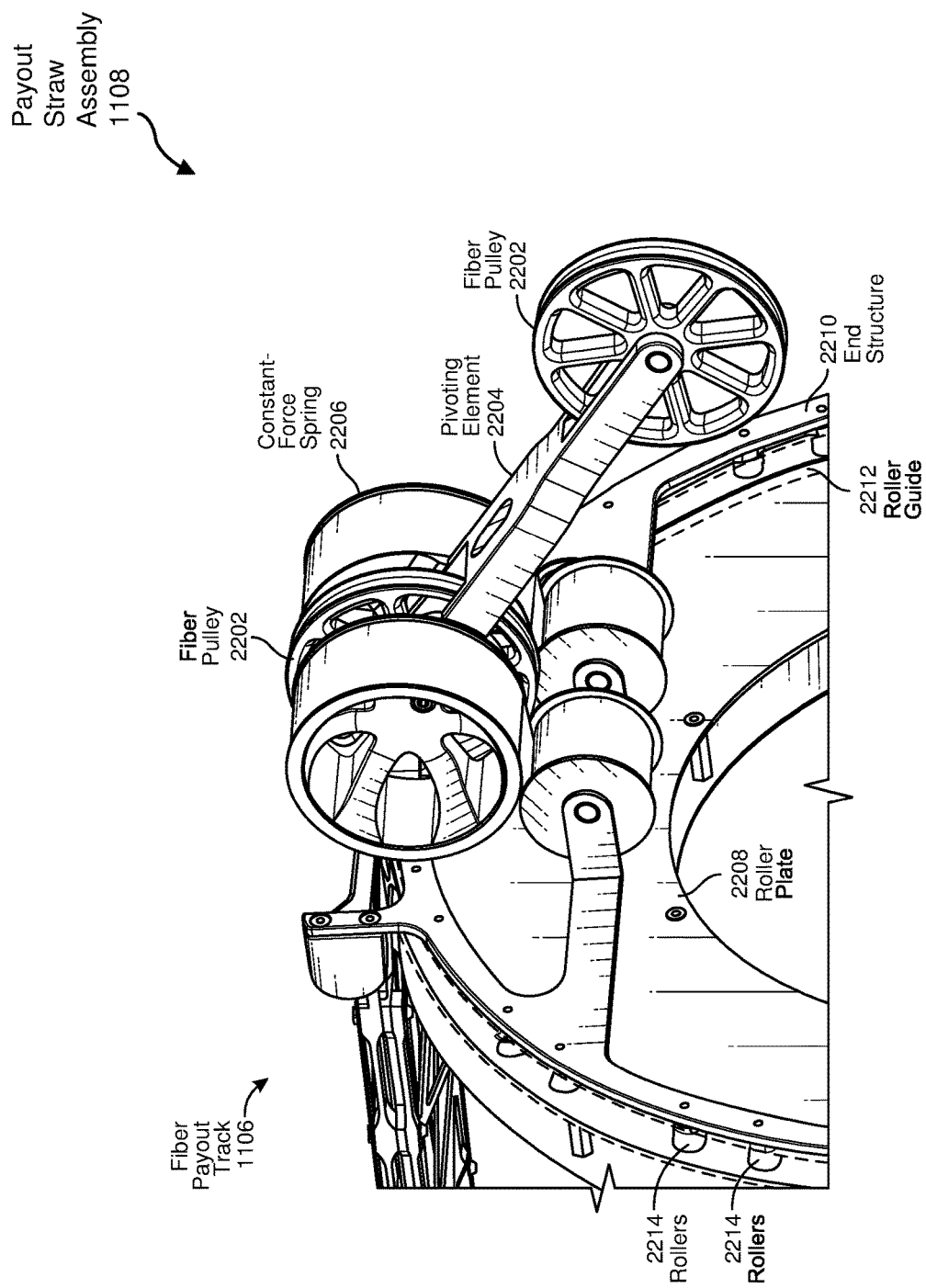
FIG. 22 is a perspective view of an exemplary payout straw assembly employable in the payload subsystem of FIG. 11.

FIG. 22 is a perspective view of an example of payout straw assembly 1108 of payload subsystem 310 of FIG. 11. In some embodiments, payout straw assembly 1108 may include an end structure 2210 or bracket that may be coupled with a distal end of fiber payout track 1106 (e.g., connected to an end of outer track 1904 opposite tensioner assembly 1110). Further, in some examples, multiple rollers 2214 may be arranged in a circular fashion and rotatably coupled to end structure 2210 to engage with a roller guide 2212 attached to a roller plate 2208 of drive subsystem end portion 302, discussed in greater detail below. Based on such a construction, rotation of payout straw assembly 1108 about powerline conductor 101 may occur in response to rotation of the remainder of payload subsystem 310 caused by rotation actuator 510.

Figure 23:
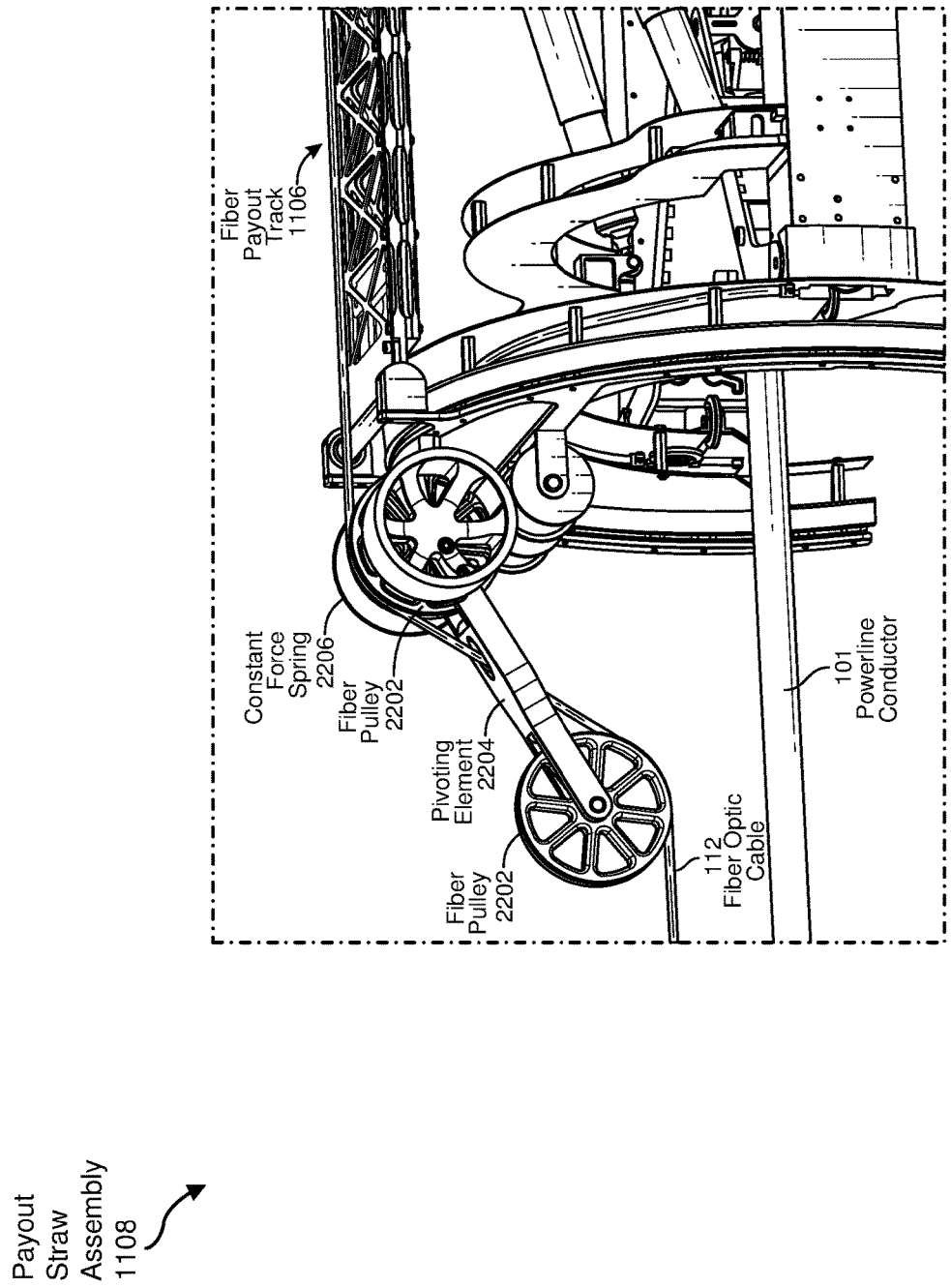
FIG. 23 is a perspective view of the payout straw assembly of FIG. 22 when in a normal payout state.
Figure 24:
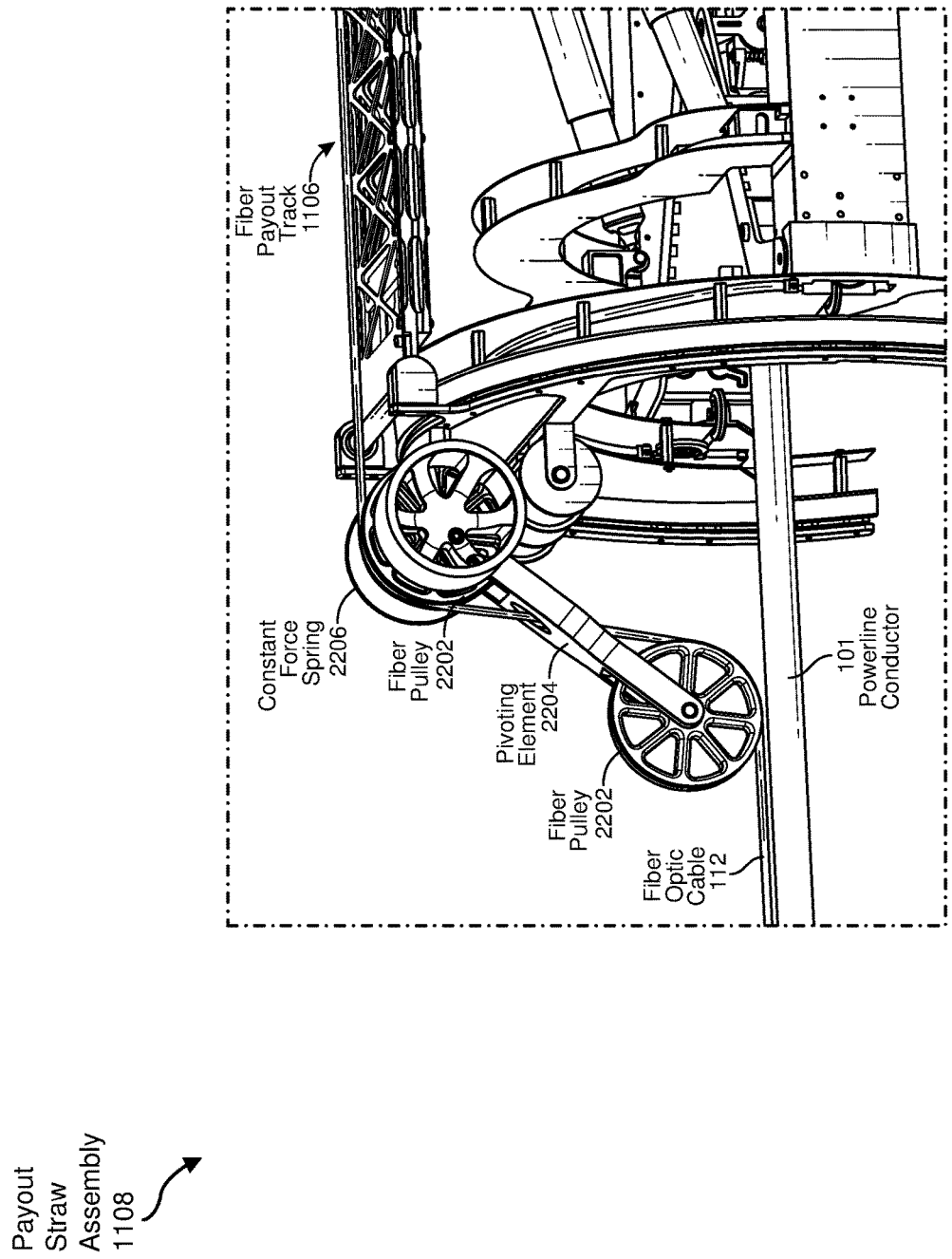
FIG. 24 is a perspective view of the payout straw assembly of FIG. 22 when in a tension-maintaining state.

Payout straw assembly 1108 may also include a pair of fiber pulleys 2202 rotatably coupled to opposing ends of a pivoting element 2204. In some examples, a radius of each fiber pulley 2202 is greater than or equal to a specified minimum recommended bend radius for fiber optic cable 112. Additionally, a distal end of pivoting element 2204 (e.g., an end furthest from fiber payout track 1106) may be configured to pivot about a proximal end of pivoting element 2204 (e.g., an end nearest fiber payout track 1106) under the control of one or more constant-force springs 2206. More specifically, in some examples, constant-force springs 2206 exert some level of force that causes the distal end of pivoting element 2204 toward powerline conductor 101. The amount of tension currently applied to fiber optic cable 112, when routed along fiber pulleys 2202, may thus determine the position of fiber pulley 2202 at the distal end of pivoting element 2204. For example, FIG. 23 is a perspective view of payout straw assembly 1108 in which the tension of fiber optic cable 112 is at or near a desired level, resulting in payout straw assembly 1108 exhibiting a normal cable payout state. Oppositely, FIG. 24 is a perspective view of payout straw assembly 1108 in which payout straw assembly 1108 takes up slack being introduced in fiber optic cable 112 to maintain the desired tension level for fiber optic cable 112.

In yet other embodiments, alternative structures for fiber payout track 1106 may be employed to direct fiber optic cable 112 from a tensioner assembly (e.g., tensioner assembly 1110, 1110A, or 1110B) to a payout straw assembly (e.g., payout straw assembly 1108). For example, a fiber payout structure may be a cantilevered structure extending from payload subsystem 310 to a payout straw assembly without being directly coupled to a leading end of drive subsystem end portion 302. In some embodiments, such a fiber payout structure may include a tube through which fiber optic cable 112 may be routed between the tensioner assembly and the payout straw. Also, in some embodiments, payout straw assembly 1108 may be configured differently from that shown in FIGS. 20-24. For example, in lieu of constant-force springs 2206, payout straw assembly 1108 may employ extension springs that provide a force against extension of the springs to reduce or eliminate slack in fiber optic cable 112, such as during the wrapping operation. Other alternative arrangements for fiber payout track 1106 and payout straw assembly 1108 are also possible in other examples.

Figure 25:
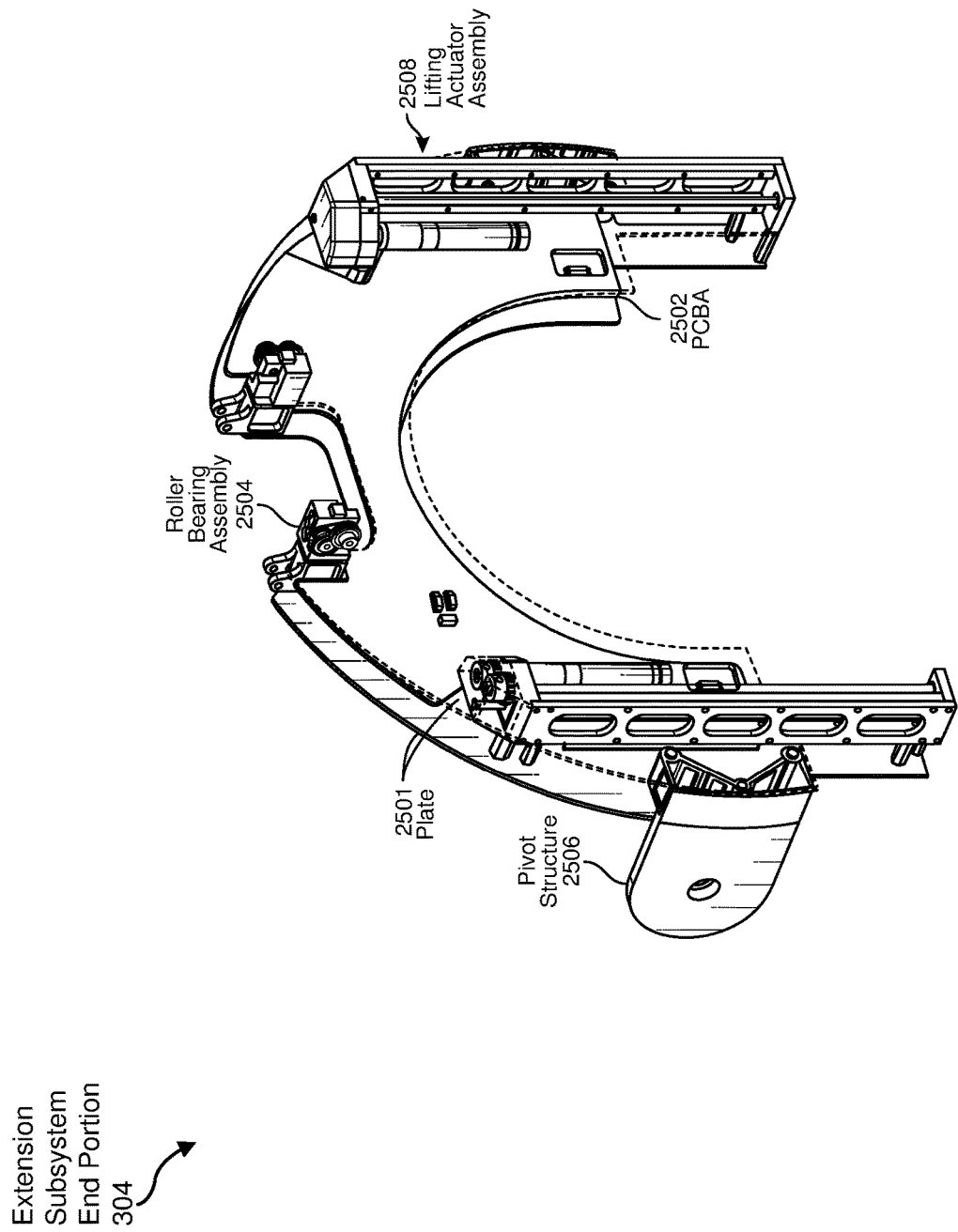
FIG. 25 is a perspective view of an exemplary extension subsystem end portion of the robotic system of FIG. 3.
Figure 26:
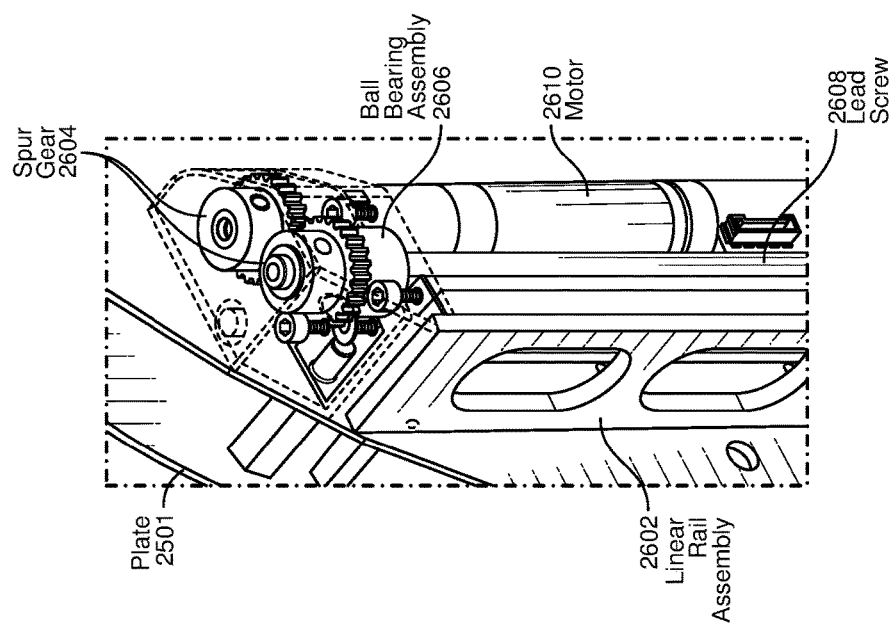
FIG. 26 is a perspective view of an exemplary lifting actuator assembly employable in the extension subsystem end portion of FIG. 25.

FIG. 25 is a perspective view of an exemplary extension subsystem end portion 304 of robotic system 300 of FIG. 3. In some embodiments, extension subsystem end portion 304 may include one or more plates 2501 that may provide a physical structure to which other components may be coupled. For example, one plate 2501 may serve as a structure to which one or more printed circuit board assemblies (PCBAs) 2502 may be affixed. PCBA 2502 may carry any type of circuitry (e.g., processors, sensors, motor driver integrated circuits (ICs), and so on) employable in robotic system 300. Also attached to plate 2501 may be one or more pivot structures 2506 to which a corresponding drive subsystem end portion 302 may be attached to facilitate pivoting of drive subsystem end portion 302 relative to extension subsystem end portion 304.

Also as shown in FIG. 25, each extension subsystem end portion 304 may also include a number of components coupled to plate 2401 for extending a corresponding end of rotation subsystem 306 (and, therefore, payload subsystem 310) upward. In some embodiments, these components may include one or more lifting actuator assemblies 2508 and one or more roller bearing assemblies 2504. More specifically, as shown in the perspective view of FIG. 26, lifting actuator assembly 2508 may include a linear rail assembly 2602, a lead screw 2608, a motor 2610, a ball bearing assembly 2606, and one or more gears (e.g., spur gears) 2604. Further, linear rail assembly 2602 and lead screw 2608 may interface with a corresponding lead nut 508 of rotation subsystem 306 such that rotation of lead screw 2608 may cause vertical translation of lead nut 508 (e.g., as guided by linear rail assembly 2602), thus causing vertical translation of rotation subsystem 306. Further, in some examples, activation of motor 2610 may cause rotation of spur gears 2604 (e.g., having a 1:1 ratio) that operate through ball bearing assembly 2606 (e.g., a double-row angular-contact ball bearing assembly) to rotate lead screw 2608. Additionally, in some examples, each roller bearing assembly 2504 may interact with a corresponding linear rail 512 of rotation subsystem 306 to allow vertical movement of rotational subsystem 306 relative to extension subsystem end portion 304 while limiting relative horizontal movement therebetween.

Figure 27:
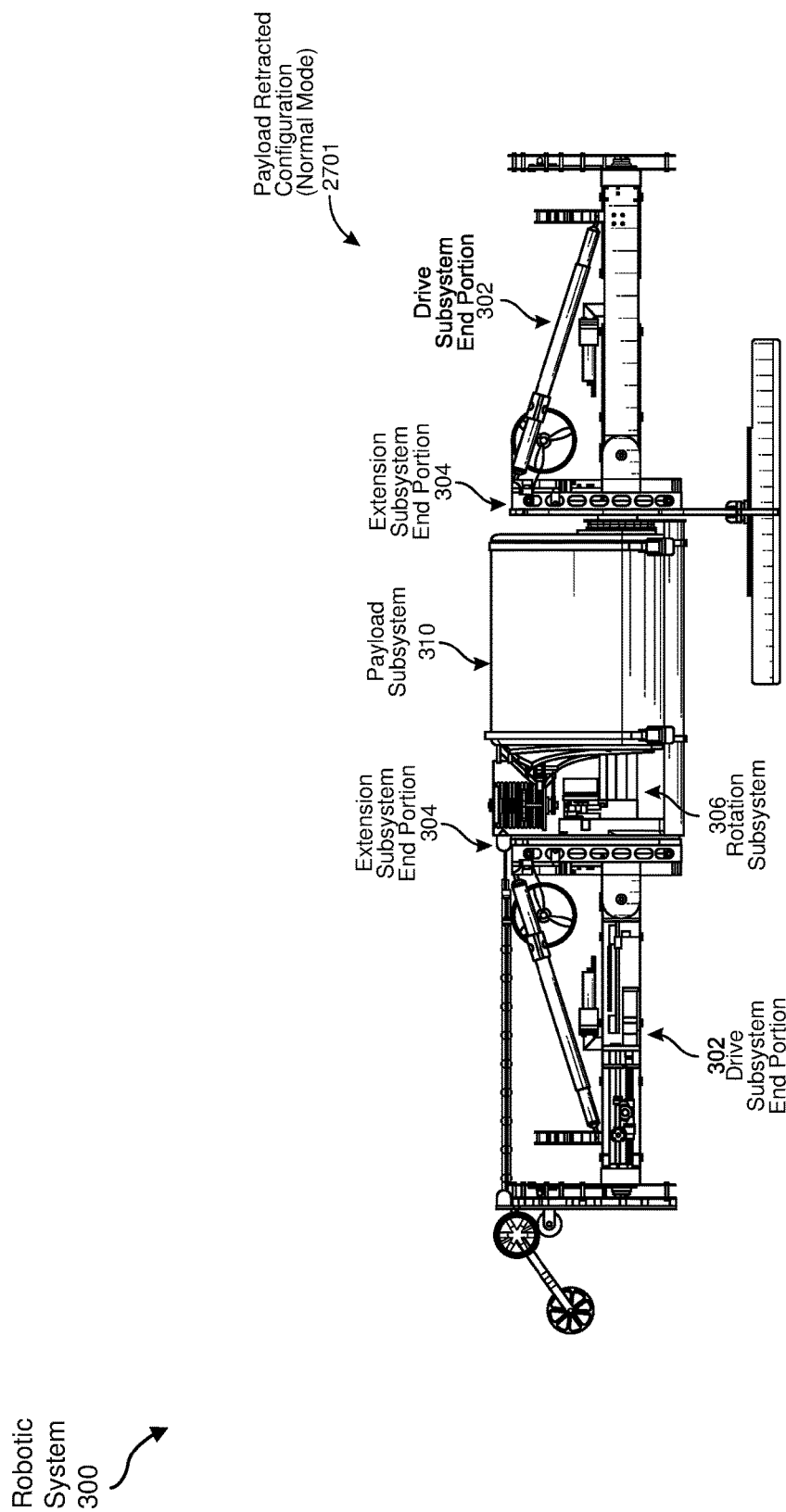
FIG. 27 is a side view of the robotic system of FIG. 3 with the payload subsystem in a normal mode.
Figure 28:
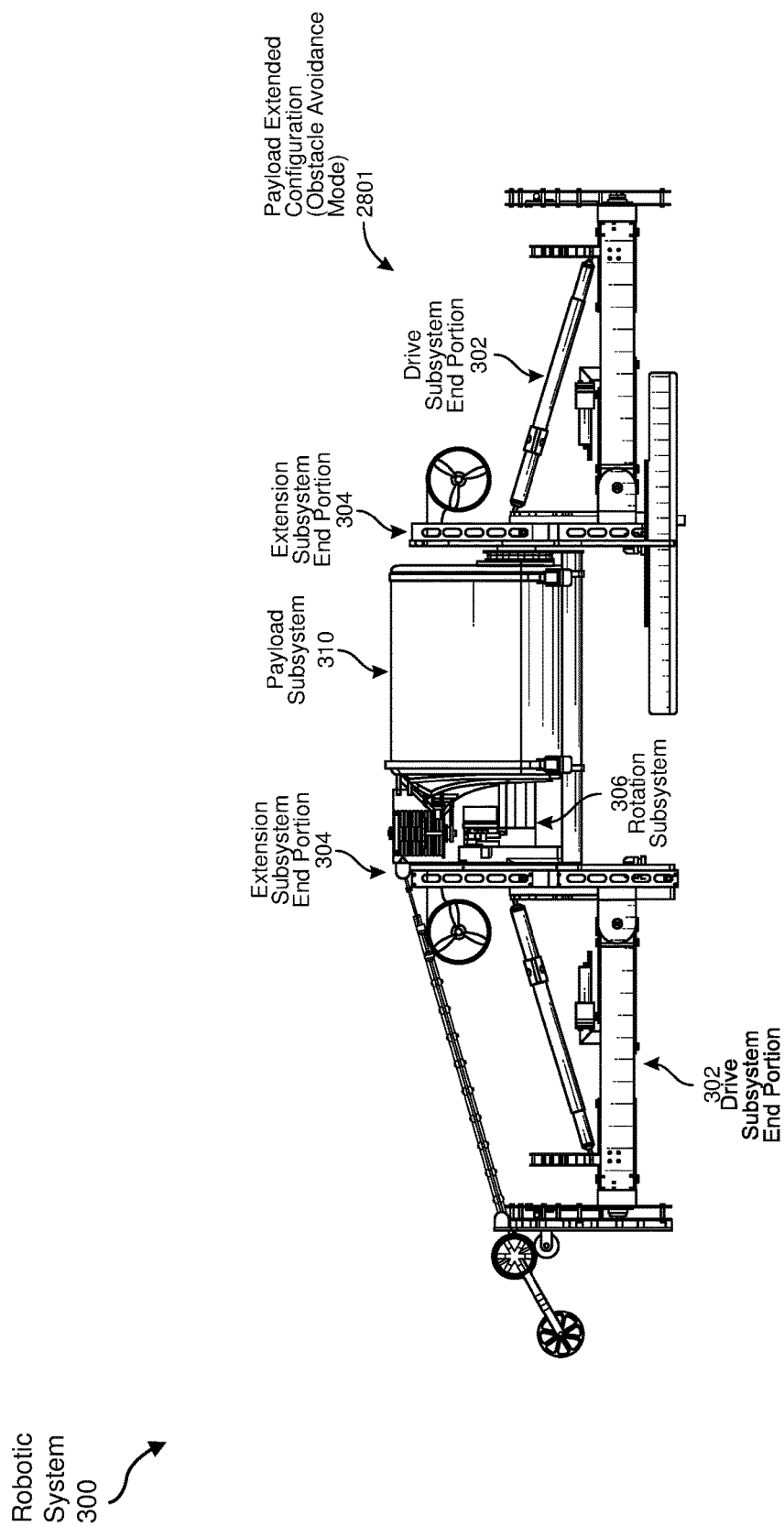
FIG. 28 is a side view of the robotic system of FIG. 3 with the payload subsystem in an obstacle avoidance mode.

In some examples, such as those described above, and as illustrated in the side views of robotic system 300 of FIGS. 27 and 28, extension subsystem end portions 304 may lift rotation subsystem 306 and payload subsystem 310 from a payload retracted configuration 2701 (as shown in FIG. 27) to a payload extended configuration 2801 (as shown in FIG. 28). In some embodiments, payload retracted configuration 2701 may be employed in normal mode during times when no obstacles along powerline conductor 101 currently interfere with rotation subsystem 306 and payload subsystem 310, thus allowing normal travel of robotic system 300 along powerline conductor 101 and rotation of payload subsystem 310 about powerline conductor 101 to facilitate helical wrapping of fiber optic cable 112 about powerline conductor 101. Oppositely, payload extended configuration 2801 may be utilized in obstacle avoidance mode in situations in which rotation subsystem 306 and payload subsystem 310 will not otherwise clear an oncoming obstacle along powerline conductor 101. In these embodiments, extension of rotation subsystem 306 between payload retracted configuration 2701 and payload extended configuration 2801 is accomplished while maintaining structural stability between extension subsystem end portions 304 and rotation subsystem 306.

Figure 29:
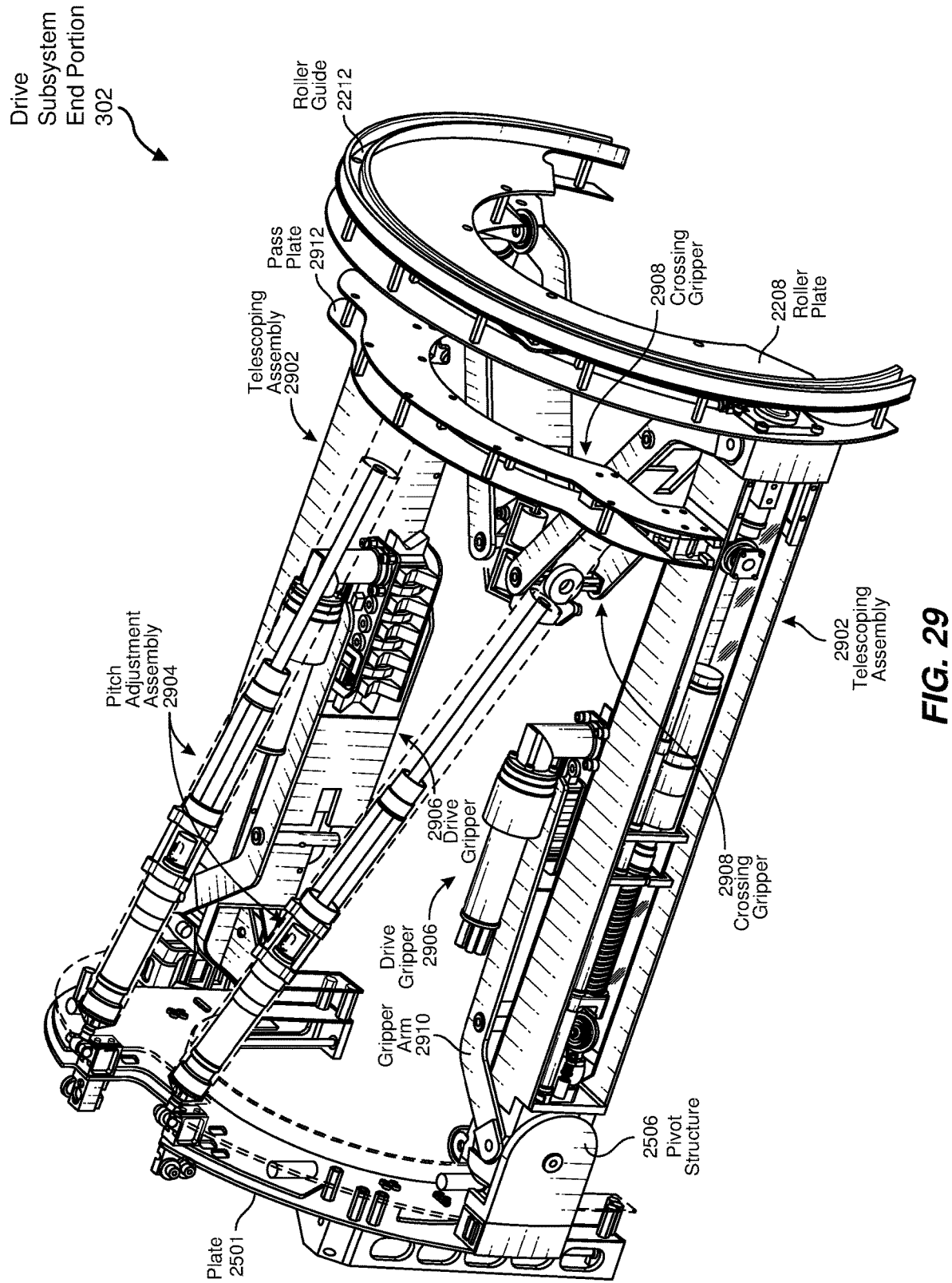
FIG. 29 is a perspective view of an exemplary drive subsystem end portion employable in the robotic system of FIG. 3.

FIGS. 29-54 depict various aspects of an exemplary drive subsystem end portion 302 employable in robotic system 300. For example, FIG. 29 is an overall perspective view of drive subsystem end portion 302 (specifically drive subsystem end portion 302 for a trailing end of robotic system 300 (e.g., as robotic system 300 translates along powerline conductor 101 to install fiber optic cable 112 thereon)) relative to plate 2501 of corresponding extension subsystem end portion 304. As illustrated, drive subsystem end portion 302 may include two telescoping assemblies 2902 (e.g., attached at proximal ends via corresponding pivot structures 2506 to plate 2501), two pitch adjustment assemblies 2904 (e.g., attached at proximal ends to plate 2501), and two drive grippers 2906 and two crossing grippers 2908, each of which is pivotably coupled to a telescoping assembly 2902 via a corresponding gripper arm 2910. Also included in drive subsystem end portion 302 attached to a distal end of each telescoping assembly 2902 is roller plate 2208 and attached roller guide 2212, described more fully above.

Generally, in at least some examples, telescoping assemblies 2902 may facilitate longitudinal extension of drive subsystem end portion 302 substantially along powerline conductor 101, while pitch adjustment assemblies 2904 may facilitate vertical changes in orientation of drive subsystem end portion 302 about pivot structures 2506 to conform to vertical changes in direction of powerline conductor 101. Further, drive grippers 2906 may operate in tandem to clamp powerline conductor 101 and translate drive subsystem end portion 302 along powerline conductor 101, while crossing grippers 2908 may operate together to clamp powerline conductor 101 at a different location along powerline conductor 101 from that of drive grippers 2906 to facilitate crossing of obstacles.

Figure 30:
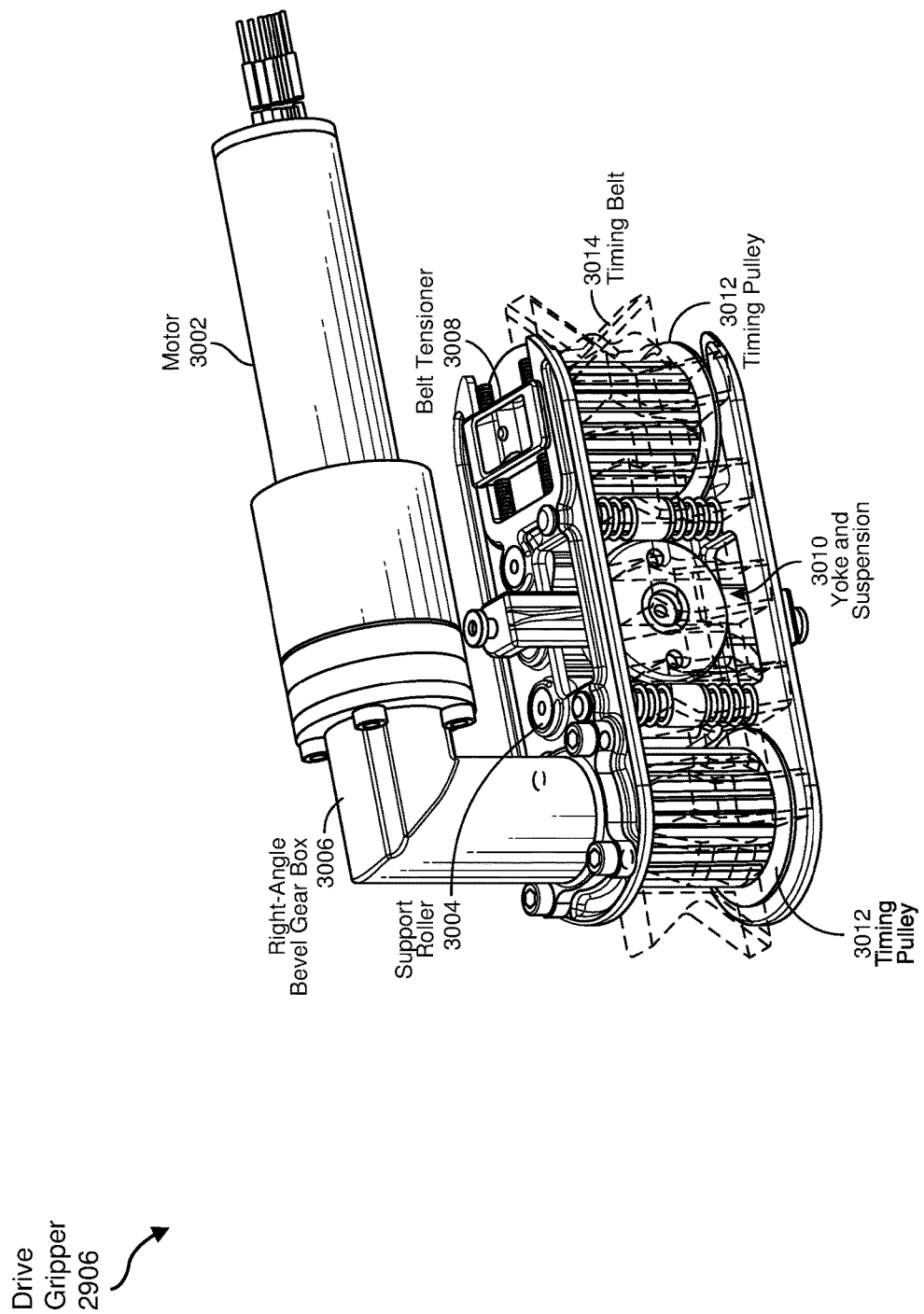
FIG. 30 is a perspective view of an exemplary drive gripper employable in the drive subsystem end portion of FIG. 29.

FIG. 30 is a perspective view of an exemplary drive gripper 2906 employable in drive subsystem end portion 302. In some embodiments, drive gripper 2906 may include a timing belt 3014 having (e.g., over-molded with) segmented treads that may provide significant grip properties with relatively moderate rolling resistance for gripping powerline conductor 101. In some examples, the segmented treads located on an external surface of timing belt 3014 may include angled outer portions joined by a recessed inner portion, as illustrated in FIG. 30, although other configurations are also possible. Further, in some examples, an internal surface of timing belt 3014 may be routed over corresponding timing pulleys 3012 so that the rotational timing of timing pulleys 3012 relative to timing belt 3014 may remain fixed. Also, in the embodiment of FIG. 30, one timing pulley 3012 may be driven by a drive motor 3002 (e.g., by way of a bevel gear box 3006 to facilitate a right-angle orientation between drive motor 3002 and timing pulley 3012).

Drive gripper 2906, in some embodiments, may further include a yoke and suspension 3010 (e.g., located between timing pulleys 3012) to provide a level of compliance to allow pitch rotation and/or vertical translation of drive gripper 2906 to facilitate proper alignment of drive gripper 2906 with powerline conductor 101 under a variety of circumstances. Also included in drive gripper 2906, in some examples, may be a belt tensioner 3008 that may allow manual adjustment of tension experienced by timing belt 3014, as well as one or more support rollers 3004 that may support timing belt 3014 between timing pulleys 3012 to enhance gripping strength.

Figure 31:
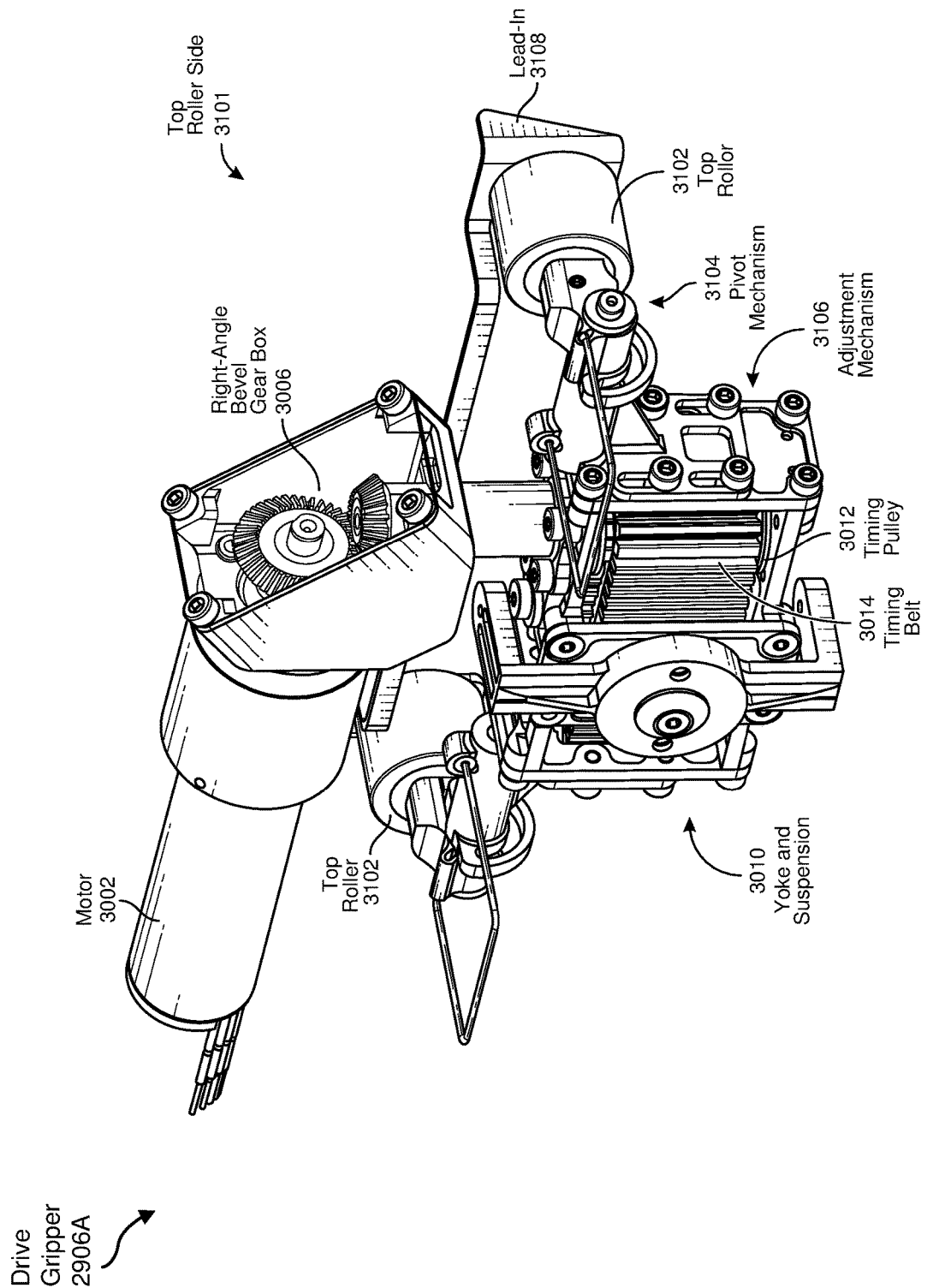
FIG. 31 is a perspective view of another exemplary drive gripper employable in the drive subsystem end portion of FIG. 29, in which the drive gripper includes a top roller.
Figure 32:
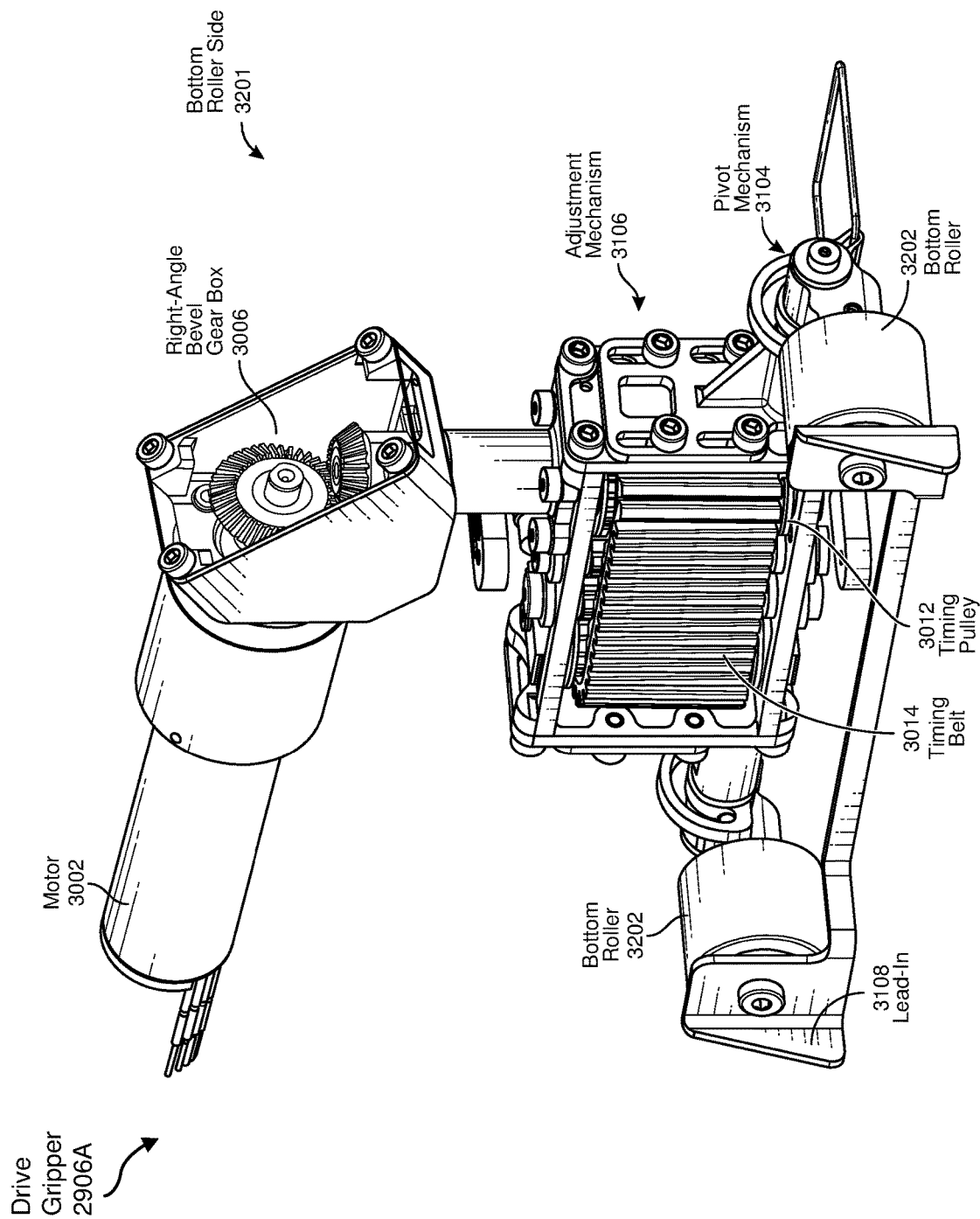
FIG. 32 is a perspective view of another exemplary drive gripper employable in the drive subsystem end portion of FIG. 29, in which the drive gripper includes a bottom roller.

FIGS. 31 and 32 are perspective views of another exemplary drive gripper 2906A employable in drive subsystem end portion 302. More specifically, FIG. 31 depicts a version of drive gripper 2906A that includes the various components of, and provides the functionality of, drive gripper 2906, but also includes one or more top rollers 3102, while FIG. 32 illustrates a version of drive gripper 2906A that incorporates one or more bottom rollers 3202. In some embodiments, each drive subsystem end portion 302 may include the version of drive gripper 2906A with top rollers 3102 and the version of drive gripper 2906A with bottom rollers 3202, working in tandem so that both top rollers 3102 and bottom rollers 3202 may engage the top and bottom sides of powerline conductor 101 during normal mode (e.g., such that vertical forces on timing belt 3014 while gripping powerline conductor 101 are minimized). In some embodiments, top rollers 3102 and bottom rollers 3202 are coupled with drive gripper 2906A by way of a pivot mechanism 3104 and adjustment mechanism 3106, the operation of which is described below.

Figure 33:
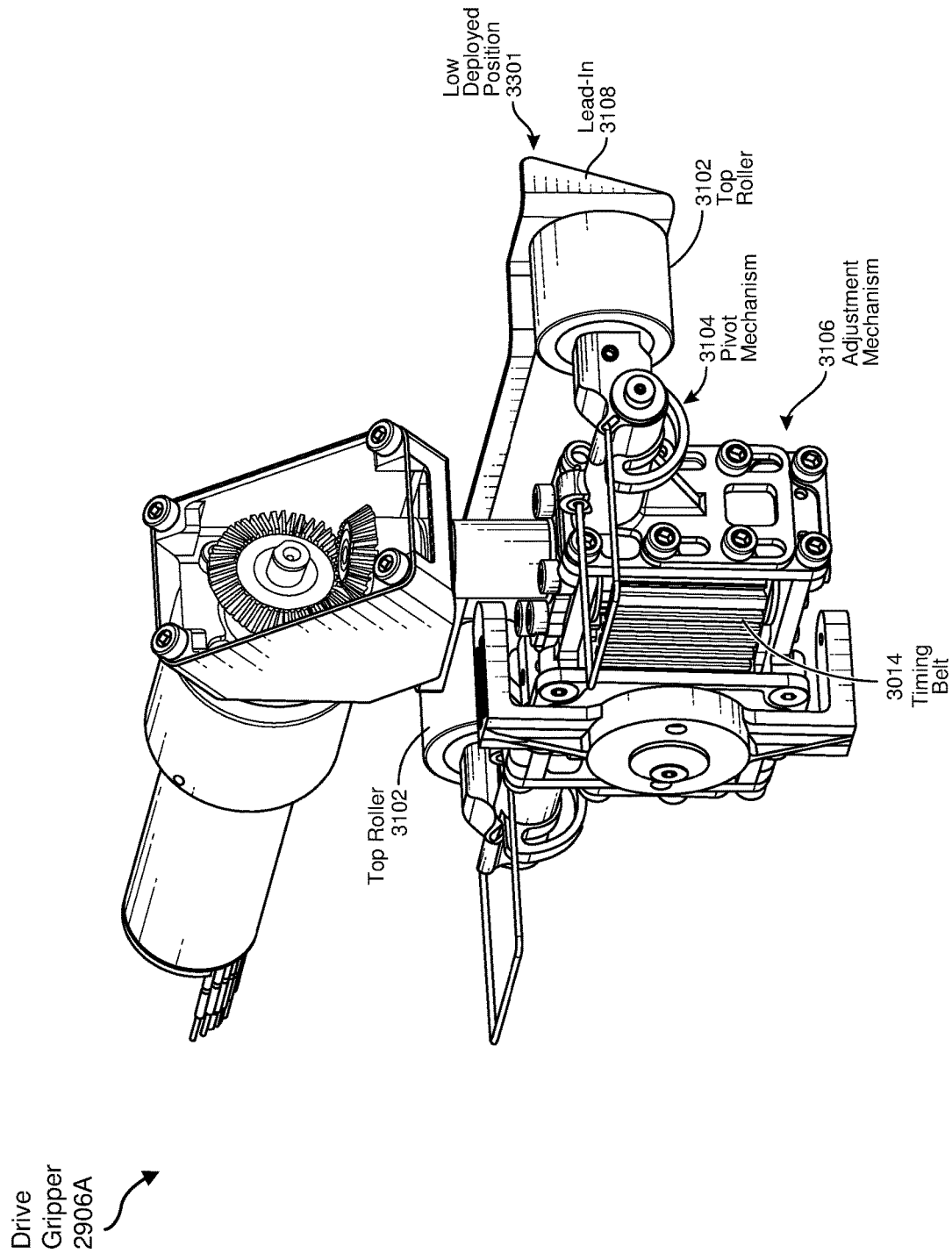
FIG. 33 is a perspective view of the drive gripper of FIG. 31 in which the top roller is in a lower deployed position.
Figure 34:
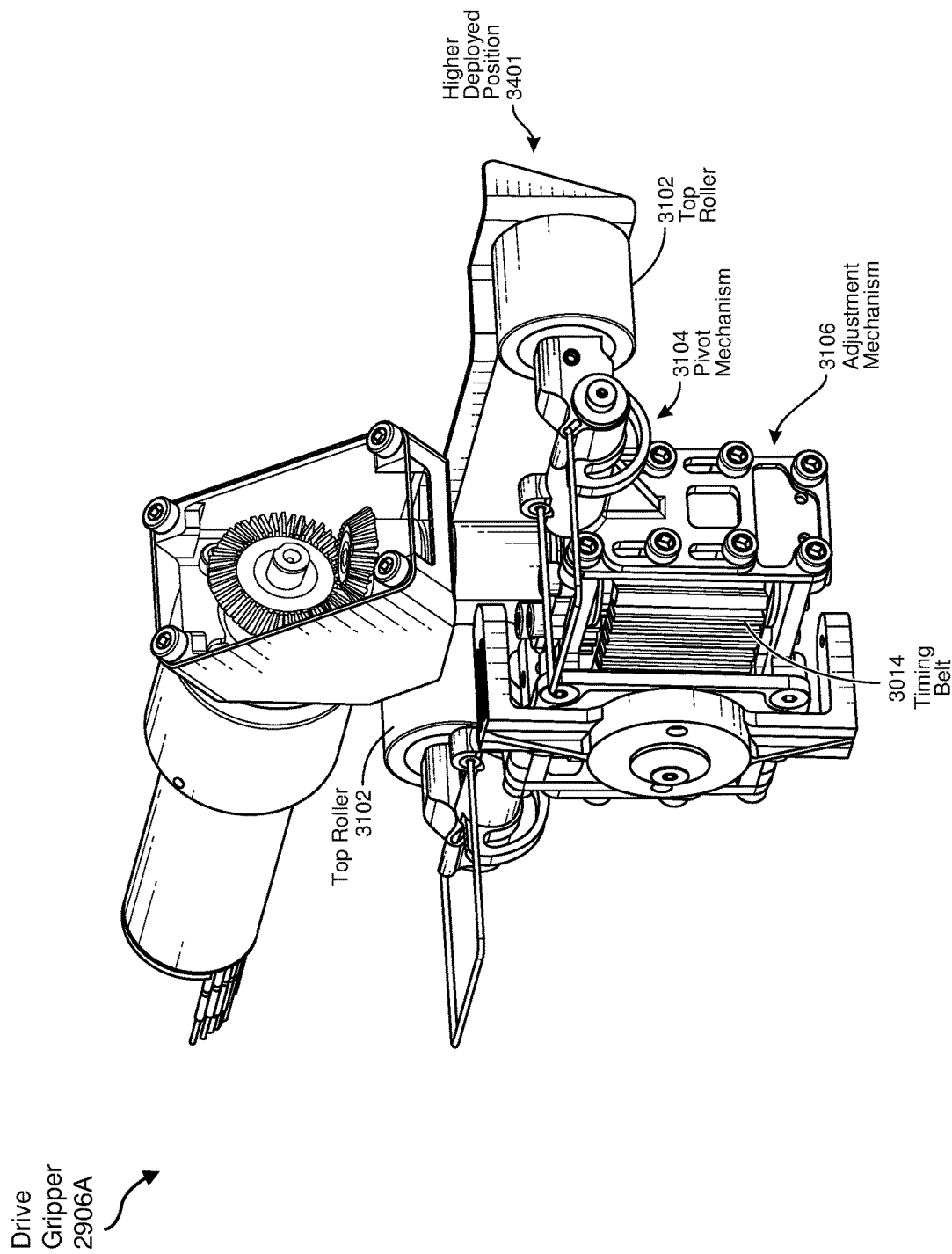
FIG. 34 is a perspective view of the drive gripper of FIG. 31 in which the top roller is in a higher deployed position.
Figure 35:
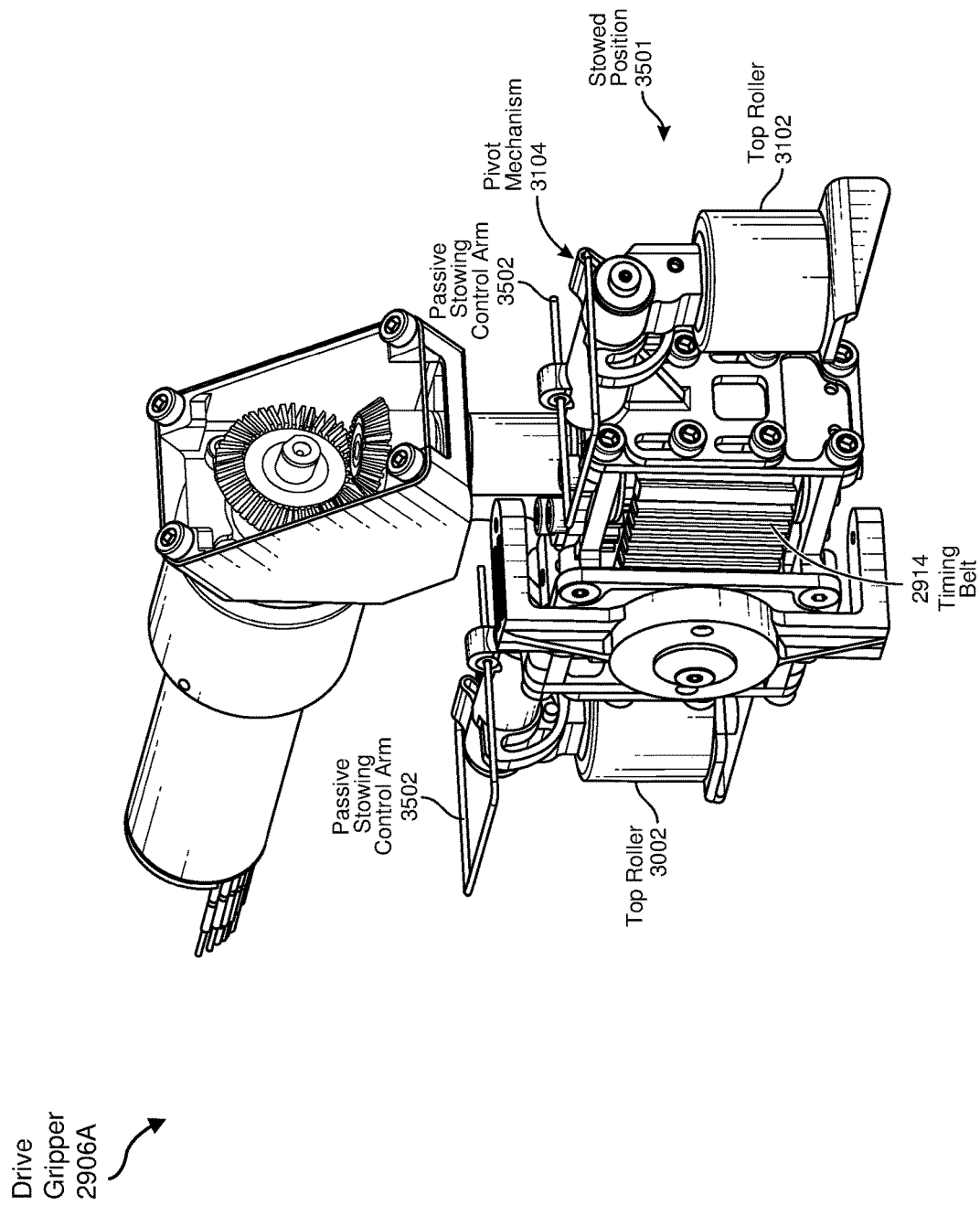
FIG. 35 is a perspective view of the drive gripper of FIG. 31 in which the top roller is in a stowed position.

FIGS. 33-35 are perspective views of various configurations of top rollers 3102 of drive gripper 2906A (e.g., as described in conjunction with FIG. 31) based on the operation of adjustment mechanism 3106 and pivot mechanism 3104. For example, FIG. 33 depicts drive gripper 2906A in which top rollers 3102 are placed in a lower deployed position 3301 by way of an operator manually configuring adjustment mechanism 3106 to carry top rollers 3102 in lower deployed position 3301 relative to timing belts 3014 (e.g., by way of adjustment screws or other fasteners). Oppositely, FIG. 34 shows top rollers 3102 in a higher deployed position 3401 relative to timing belt 3014. Also, versions of drive gripper 2906A with bottom rollers 3202 (e.g., as depicted in FIG. 32) may be similarly adjusted in at least some embodiments. In some examples, top rollers 3102 and bottom rollers 3202 may reside at other intermediate positions aside from lower deployed position 3301 and higher deployed position 3401. Such use of adjustment mechanism 3106 may allow vertical positional adjustment of top rollers 3102 and bottom rollers 3202 to engage powerline conductors 101 of different thicknesses to reduce the amount of torque applied to drive grippers 2906A (e.g., while robotic system 300 is right-side up or upside down relative to powerline conductor 101). In some examples, a lead-in 3108 incorporated with a bracket that maintains top rollers 3102 may facilitate proper vertical positioning of top rollers 3102 atop powerline conductor 101 as drive grippers 2906A engage powerline conductor 101.

FIG. 35 is a perspective view of drive gripper 2906A in which top rollers 3102 are rotated ninety degrees into a stowed position 3501, such as when drive grippers 2906A are in a retracted position away from powerline conductor 101. In some embodiments, as drive gripper 2906A is retracted and approaches corresponding telescoping assembly 2902, passive stowing control arms 3502 of drive gripper 2906A may make contact with a surface of telescoping assembly 2902, causing horizontal movement of passive stowing control arms 3502 toward pivot mechanisms 3104, thereby rotating pivot mechanisms 3104 and pushing corresponding top rollers 3102 downward and away from powerline conductor 101. This movement, in some examples, may create significant clearance between drive gripper 2906A pair for passing of obstacles therebetween, such as powerline insulators. As a further consequence, when a subsequent clamping operation of drive gripper 2906A pair commences, top rollers 3102 of each drive gripper 2906A may resume their horizontal position (e.g., based on pivot mechanisms 3104 being spring-biased toward the horizontal position) to facilitate engagement with powerline conductor 101. In addition, the version of drive gripper 2906A employing bottom rollers 3202 may incorporate a similar retraction functionality in some embodiments.

Figure 36:
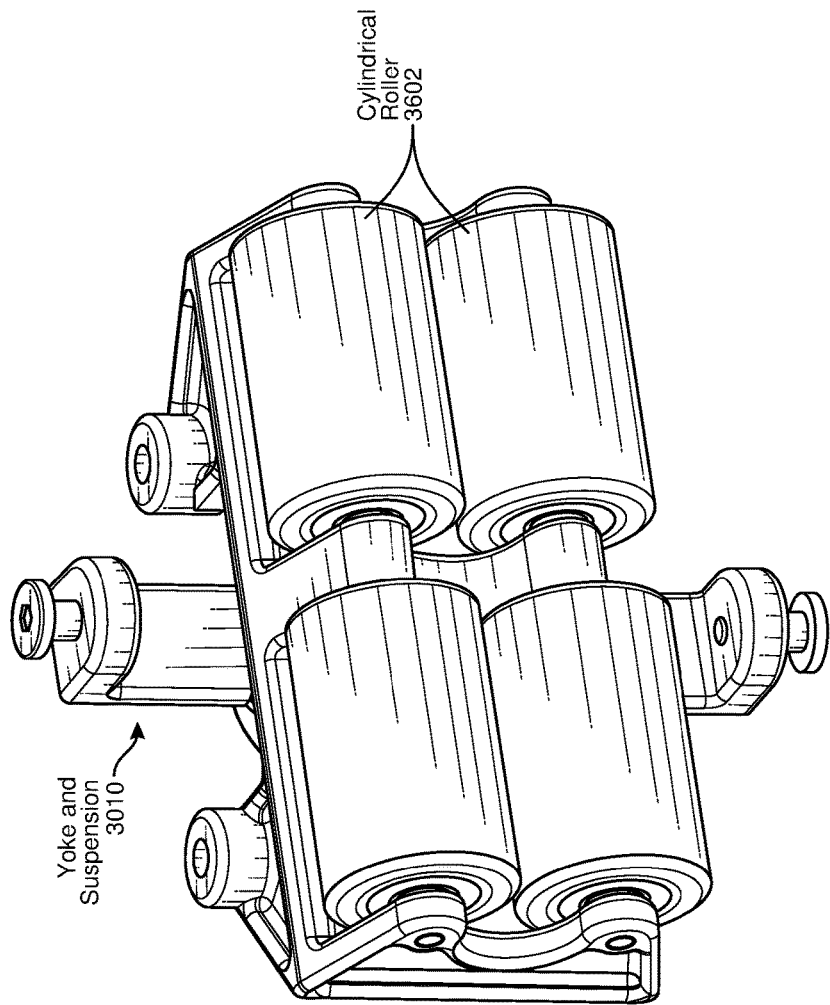
FIG. 36 is a perspective view of an exemplary crossing gripper employable in the drive subsystem end portion of FIG. 29.

FIG. 36 is a perspective view of an exemplary crossing gripper 2908 employable in drive subsystem end portion 302 of FIG. 29. In at least some embodiments, crossing gripper 2908 includes at least one pair of horizontally oriented cylindrical rollers 3602 arranged vertically so that a pair of crossing grippers 2908 may engage and firmly grip powerline conductor 101 therebetween (e.g., for obstacle crossing maneuvers). As indicated in FIG. 29, crossing gripper 2808 may be located at or near a corresponding gripper arm 2910. In some examples, each crossing gripper 2908 may also employ yoke and suspension 3010, as incorporated in drive gripper 2906, to provide compliance allowing pitch rotation and/or vertical translation of crossing gripper 2908 when engaged with powerline conductor 101 under a variety of circumstances. Further, in some embodiments, horizontally oriented cylindrical rollers 3602 facilitate rotation of robotic system 300 about powerline conductor 101, such as for obstacle crossing, as well as for loading and unloading of robotic system 300 onto and from powerline conductor 101, as is discussed in greater detail below.

Figure 37:
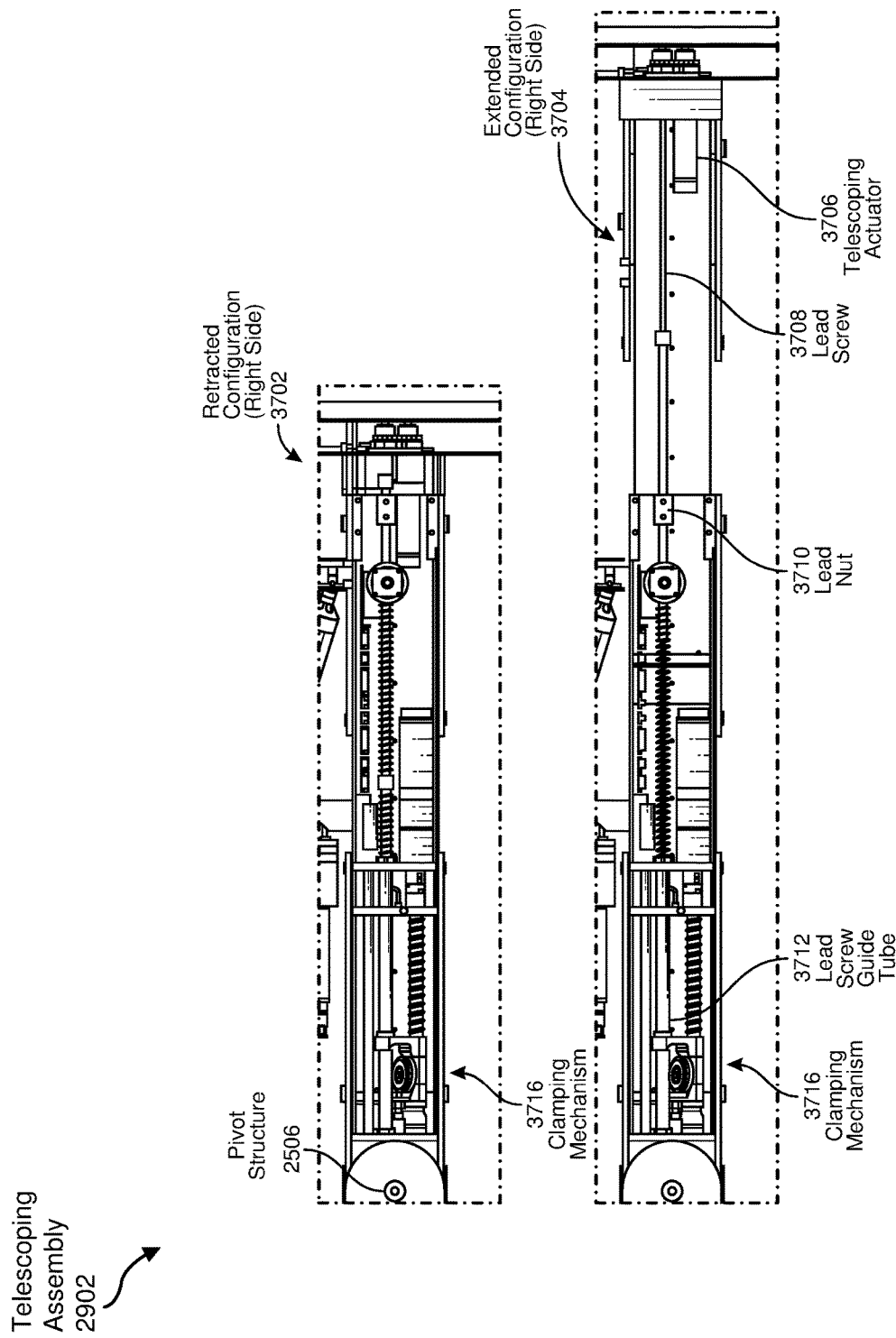
FIG. 37 includes side views of an exemplary telescoping assembly employable in the drive subsystem end portion of FIG. 29 in retracted and extended configurations.
Figure 38:
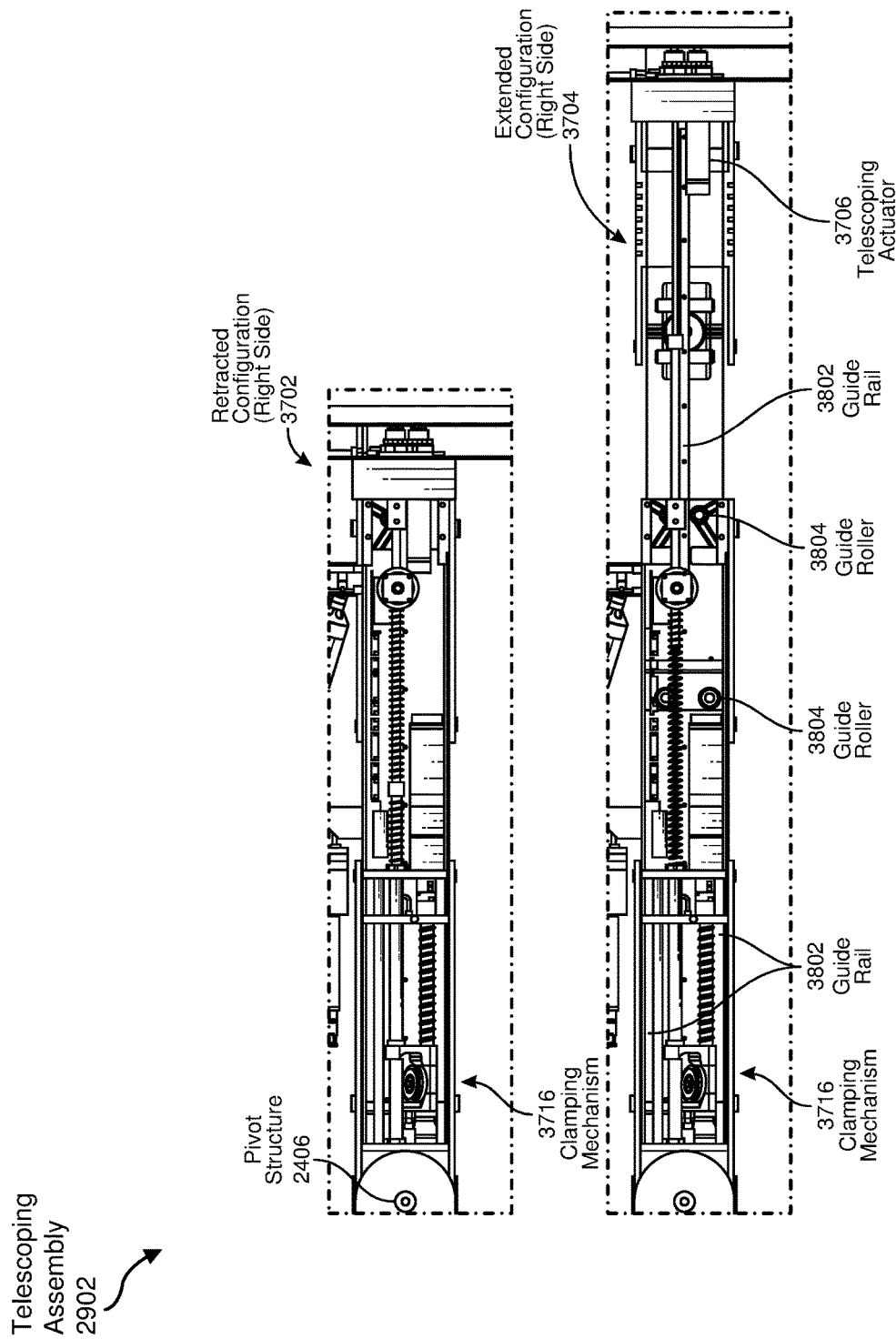
FIG. 38 includes additional side views of the telescoping assembly of FIG. 37 in retracted and extended configurations.

FIGS. 37 and 38 include side views of different cross-sections from a first (e.g., right) side of telescoping assembly 2902 (e.g., in which a clamping mechanism 3716 may reside for clamping drive grippers 2906 or crossing grippers 2908) in a retracted configuration 3702 and an extended configuration 3704 (e.g., longitudinally along powerline conductor 101). In some embodiments, as mentioned above, telescoping assembly 2902 may facilitate extension of crossing grippers 2908 further from drive grippers 2906 to accommodate obstacle avoidance. To provide the longitudinal extension, telescoping assembly 2902 may include a lead screw 3708 rotated by a telescoping actuator 3706 to cause a lead nut 3710 to travel along lead screw 3708 to facilitate the extension and retraction of telescoping assembly 2902. In some examples, telescoping assembly 2902 may include a lead screw guide tube 3712 to provide mechanical support to lead screw 3708 during the extension and retracting of crossing grippers 2908, thus possibly allowing the use of a relatively small-diameter lead screw 3708 than what may be ordinarily utilized. Additionally, in some embodiments (shown to best effect in FIG. 38), telescoping assembly 2802 may include guide rails 3802 and accompanying guide rollers 3804 that support and guide the two portions of telescoping assembly 2902 between retracted configuration 3702 and extended configuration 3704.

Figure 39:
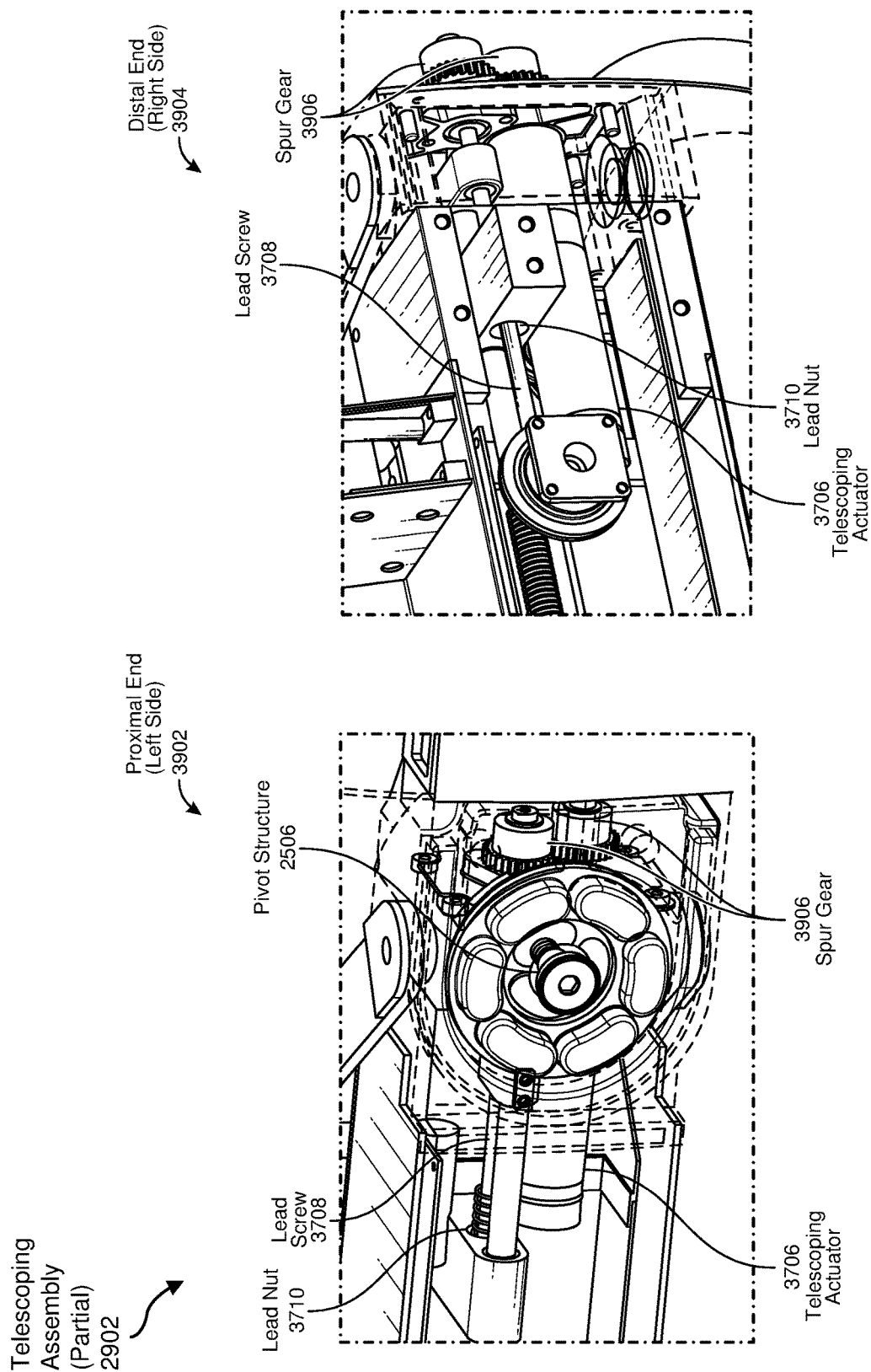
FIG. 39 includes perspective partial views of the telescoping assembly of FIG. 37 in a retracted configuration.

FIG. 39 includes perspective partial views of opposing ends (e.g., a proximal end 3902 and a distal end 3904) of opposing sides of telescoping assembly 2902. More specifically, proximal end 3902 of a left side of telescoping assembly 2902 includes pivot structure 2506 between telescoping assembly 2902 and extension subsystem 204. Additionally, pivot structure 2506 may include a pair of spur gears 3906 (e.g., 1:1 ratio spur gears) coupling telescoping actuator 3706 to lead screw 3708 so that lead screw 3708 is rotated, thus translating lead nut 3710 to extend and retract telescoping assembly 2902. A corresponding arrangement of telescoping actuator 3706, spur gears 3906, lead screw 3708, and lead nut 3710 is also shown at distal end 3904 of a right-side telescoping assembly 2902 (e.g., at the end of telescoping assembly 2902 opposite extension subsystem 204). In some examples, telescoping actuator 3706 and associated components listed above may be placed at opposing ends of telescoping assembly 2902 on different sides of telescoping assembly 2902 to enable placement of components within the two sides of telescoping assembly 2902 for the clamping and retraction of drive grippers 2906 and crossing grippers 2908, as described more fully below.

Figure 40:
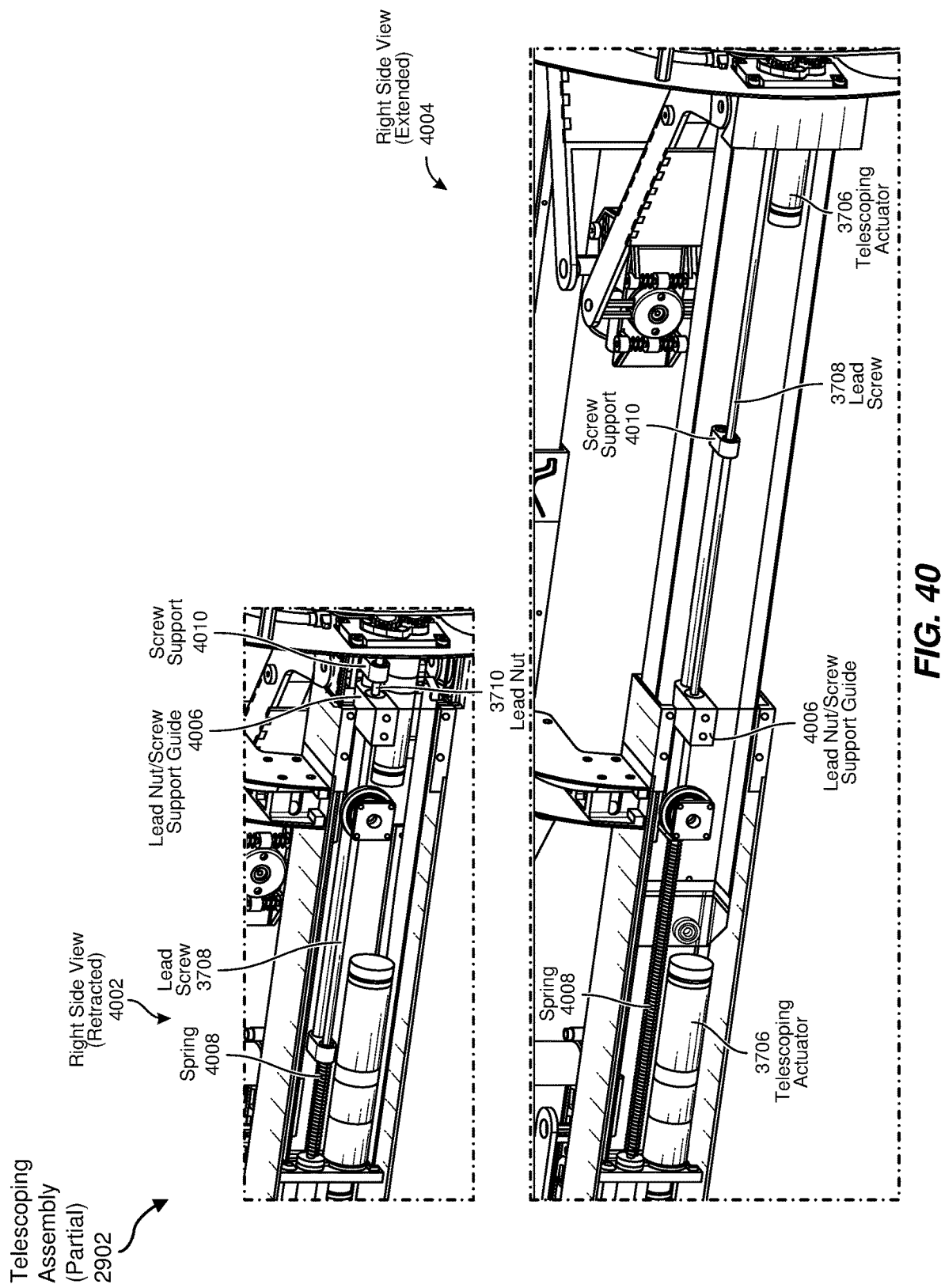
FIG. 40 includes additional perspective partial views of the telescoping assembly of FIG. 37 in retracted and extended configurations.

FIG. 40 includes additional perspective partial views of a right-side telescoping assembly 2902 in a retracted configuration 4002 and an extended configuration 4004. The views provided highlight the use of a screw support 4010 that is aligned with, and helps support, lead screw 3708. In some embodiments, screw support 4010 is guided in part by way of a lead nut/screw support guide 4006. Further, in some examples, screw support 4010 is extended in the direction of extension as telescoping assembly 2902 transitions from retracted configuration 4002 to extended configuration 4004 by way of spring 4008. In retracted configuration 4002, screw support 4010 compresses spring 4008 to allow full retraction of telescoping assembly 2902. As telescoping assembly 2902 transitions toward extended configuration 4004, spring 4008 urges screw support 4010 through lead nut/screw support guide 4006 to a point at which screw support 4010 supports lead screw 3708 beyond lead nut/screw support guide 4006 (e.g., approximately halfway between lead nut/screw support guide 4006 and a far end of lead screw 3708).

Figure 41:
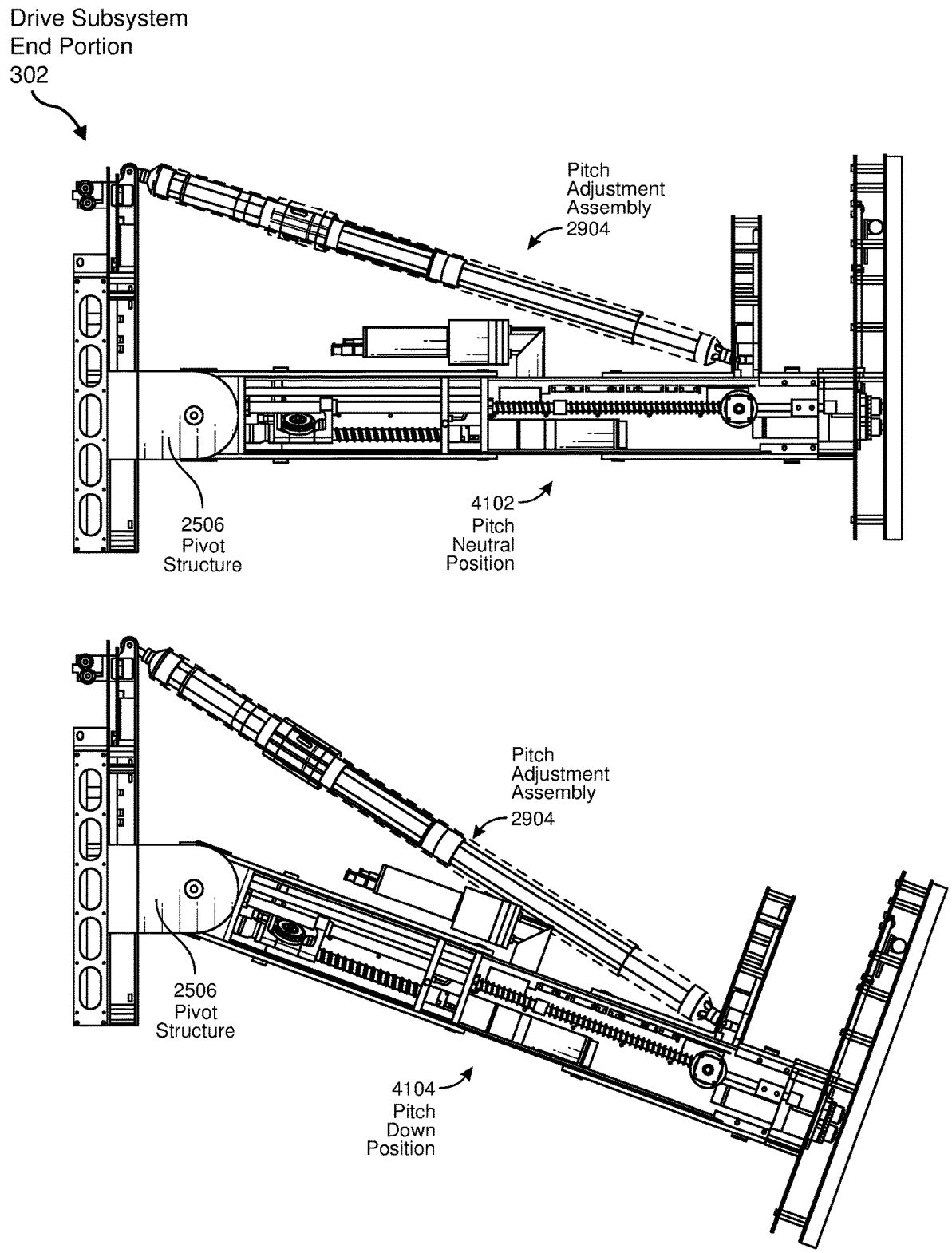
FIG. 41 includes side views of the drive subsystem end portion of FIG. 29 at pitch neutral and pitch down positions, as determined by an exemplary pitch adjustment assembly employed therein.

FIG. 41 includes side views of drive subsystem end portion 302 of FIG. 29 at a pitch neutral position 4102 and a pitch down position 4104, as determined by pitch adjustment assemblies 2904. In pitch neutral position 4102, pitch adjustment assemblies 2904 may be at least partially retracted, resulting in drive subsystem end portion 302 retaining a substantially parallel alignment relative to the remainder of robotic system 300. In pitch down position 4104, an at least partially extended pitch adjustment assembly 2904 may cause drive subsystem end portion 302 to pitch downward about pivot structure 2506 relative to the remainder of robotic system 300. In some examples, a pitch up position opposite of the pitch down position 4104 illustrated in FIG. 41 may also be possible based on a retraction of pitch adjustment assemblies 2904. Such movement may enable robotic system 300 to navigate vertical changes in powerline conductor 101, such as at insulators, taps, and other obstacles.

Figure 42:
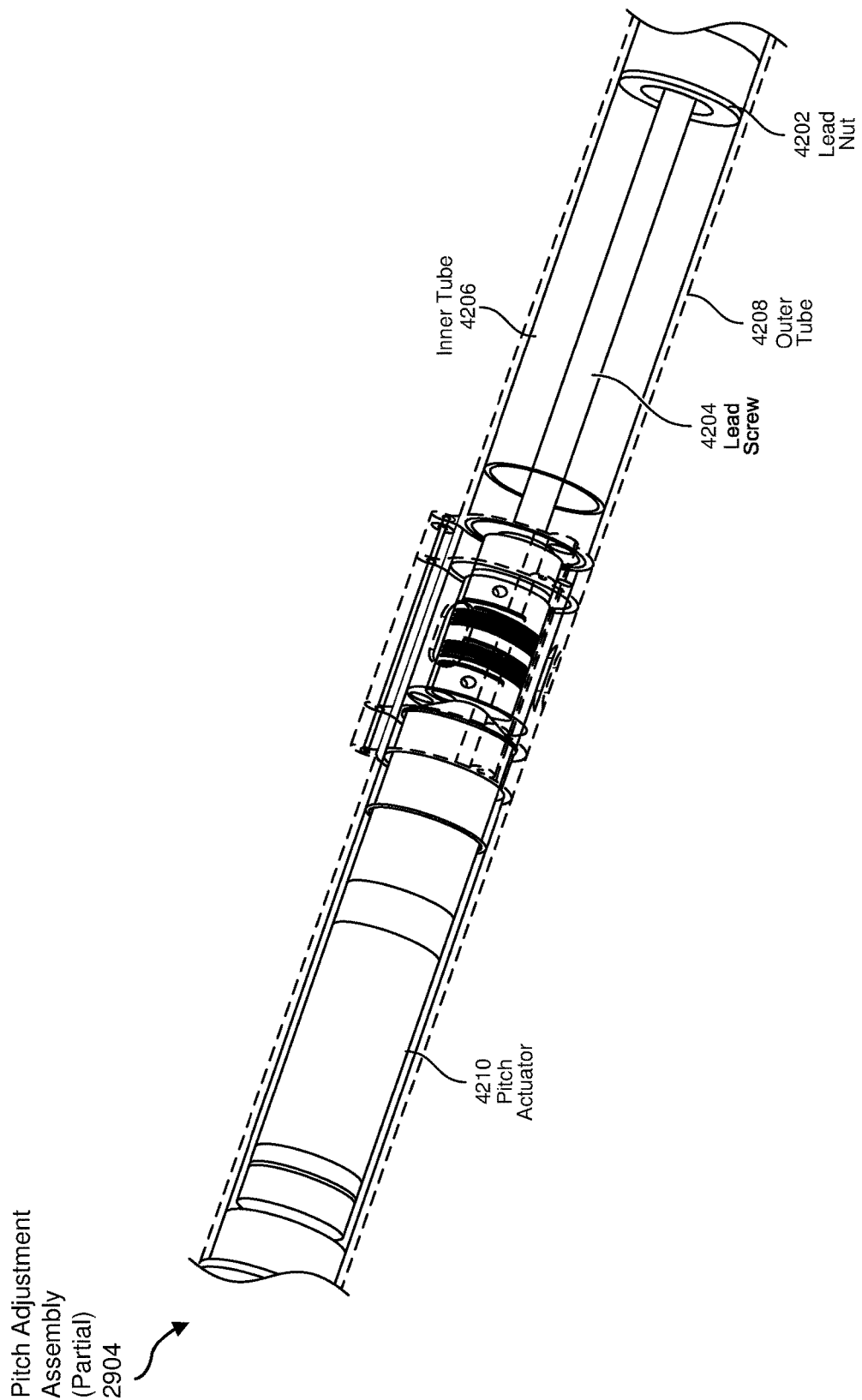
FIG. 42 is a perspective partial view of the pitch adjustment assembly of FIG. 41.

FIG. 42 is a perspective partial view of a central region of pitch adjustment assembly 2904 of drive subsystem end portion 302. In some examples, each pitch adjustment assembly 2904 may include a pitch actuator 4210 that may rotate a lead screw 4204 to cause a corresponding lead nut 4202 to travel along lead screw 4204, thereby causing an inner tube 4206 to move longitudinally within an outer tube 4208, thus causing an extension or retraction of the corresponding pitch adjustment assembly 2904. Pitch adjustment assembly 2904, in some examples, may be pivotally coupled at one end to plate 601 and pivotally coupled at a second end to a corresponding telescoping assembly 2902 or another portion of drive subsystem end portion 302.

Figure 43:
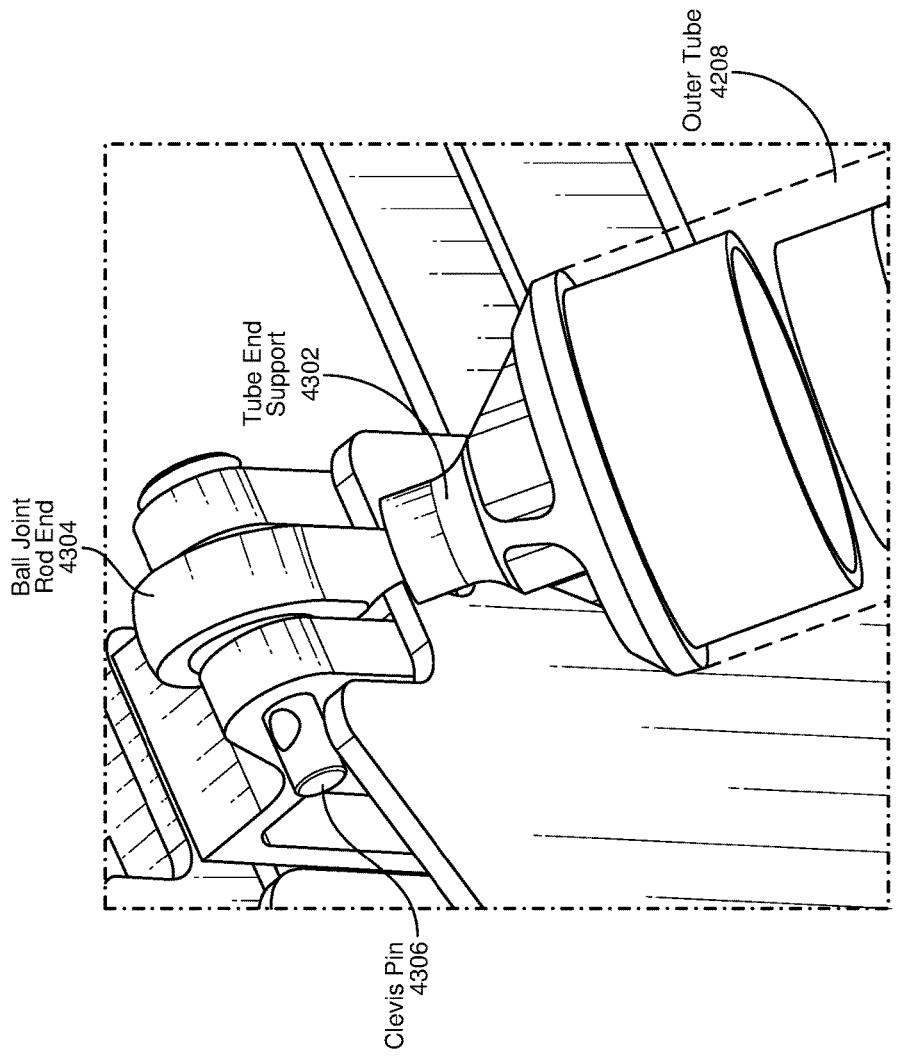
FIG. 43 is another perspective partial view of the pitch adjustment assembly of FIG. 41.

FIG. 43 is another perspective partial view, this time of a top end of pitch adjustment assembly 2904. In some embodiments, that end may incorporate a tube end support 4302 inserted into an end of outer tube 4208. Further, tube end support 4302 may include a ball joint rod end 4304 through which a clevis pin 4306 may be inserted to pivotally attach the top end of pitch adjustment assembly 2904 to extension subsystem end portion 304 (e.g., at plate 2501). In some examples, a bottom end of pitch adjustment assembly 2904 may be coupled to a plate or other structure (e.g., at or near a pass plate 2912) at a distal end of drive subsystem end portion 302.

Figure 44:
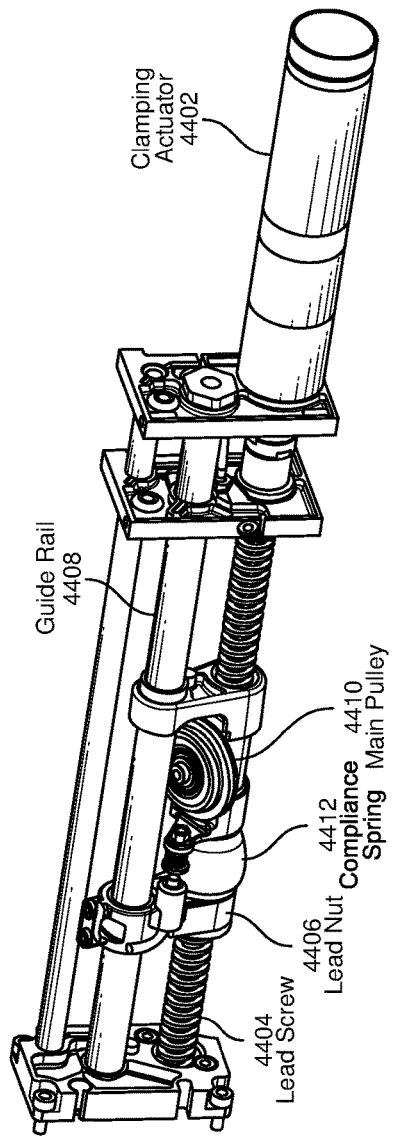
FIG. 44 is a perspective partial view of an exemplary clamping mechanism of the telescoping assembly of FIG. 37.

FIG. 44 is a perspective partial view of clamping mechanism 3716 of telescoping assembly 2902. In some embodiments, a first clamping mechanism 3716 located in one side of telescoping assembly 2902 may operate to clamp drive grippers 2906 via a first pair of gripper arms 2910, while the opposing side of telescoping assembly 2902 may include a second clamping mechanism 3716 that may operate to clamp crossing grippers 2908 via a second pair of gripper arms 2910. In addition, the two clamping mechanisms 3716 may operate from different ends of drive subsystem end portion 302, as drive grippers 2906 and crossing grippers 2908 may be actuated using different components (as described above) from opposing ends of drive subsystem end portion 302.

As depicted in FIG. 44, a clamping actuator 4402 may rotate a lead screw 4404, thereby causing a corresponding lead nut 4406 to travel along lead screw 4404. In turn, a movement of lead nut 4406 toward a component carrying a main pulley 4410 may cause a corresponding movement in main pulley 4410. The movement of main pulley 4410, in turn, may cause an increase in tension of a cable (not shown in FIG. 44) that is wrapped about main pulley 2406 as well as one or more additional pulleys (also not shown in FIG. 44) and connected at both ends to opposing gripper arms 2910 to which each drive gripper 2906 or crossing gripper 2908 is coupled. Consequently, the increase in tension of the cable may cause drive grippers 2906 or crossing grippers 2908 to clamp powerline conductor 101 therebetween. By employing the cable in such a manner, the clamping force may be substantially evenly distributed between drive grippers 2906 or crossing grippers 2908, even in circumstances in which powerline conductor 101 is not consistently aligned along robotic system 300. In some embodiments, clamping mechanism 3716 may include a compliance spring 4412 (e.g., between lead nut 4406 and the component carrying main pulley 4410) to provide some level of compliance, such as to enable drive grippers 2906 to negotiate some obstacles (e.g., tie wraps) while maintaining gripping strength.

Figure 45:
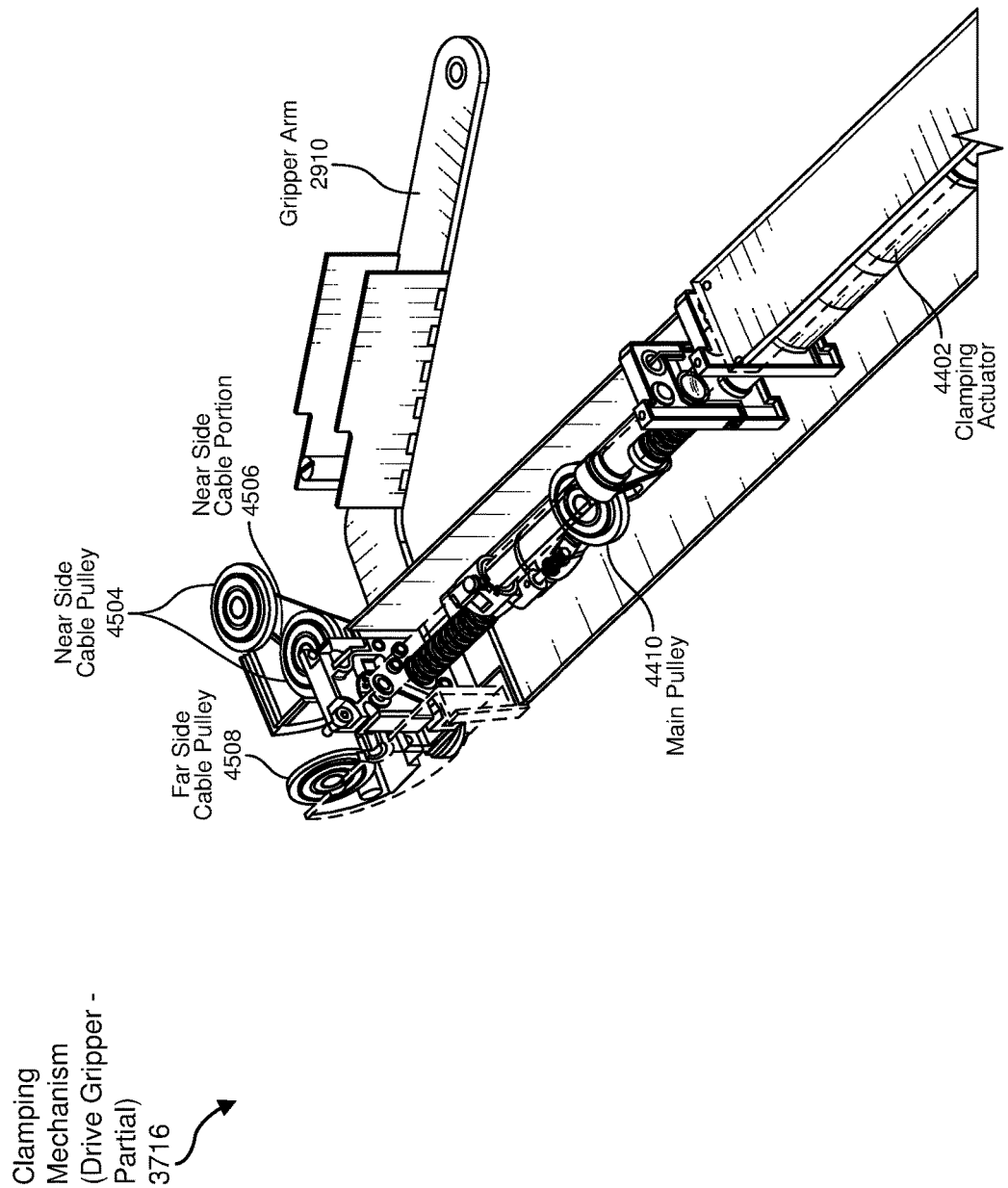
FIG. 45 is a perspective partial view of the clamping mechanism of FIG. 44 associated with a near side drive gripper.
Figure 46:
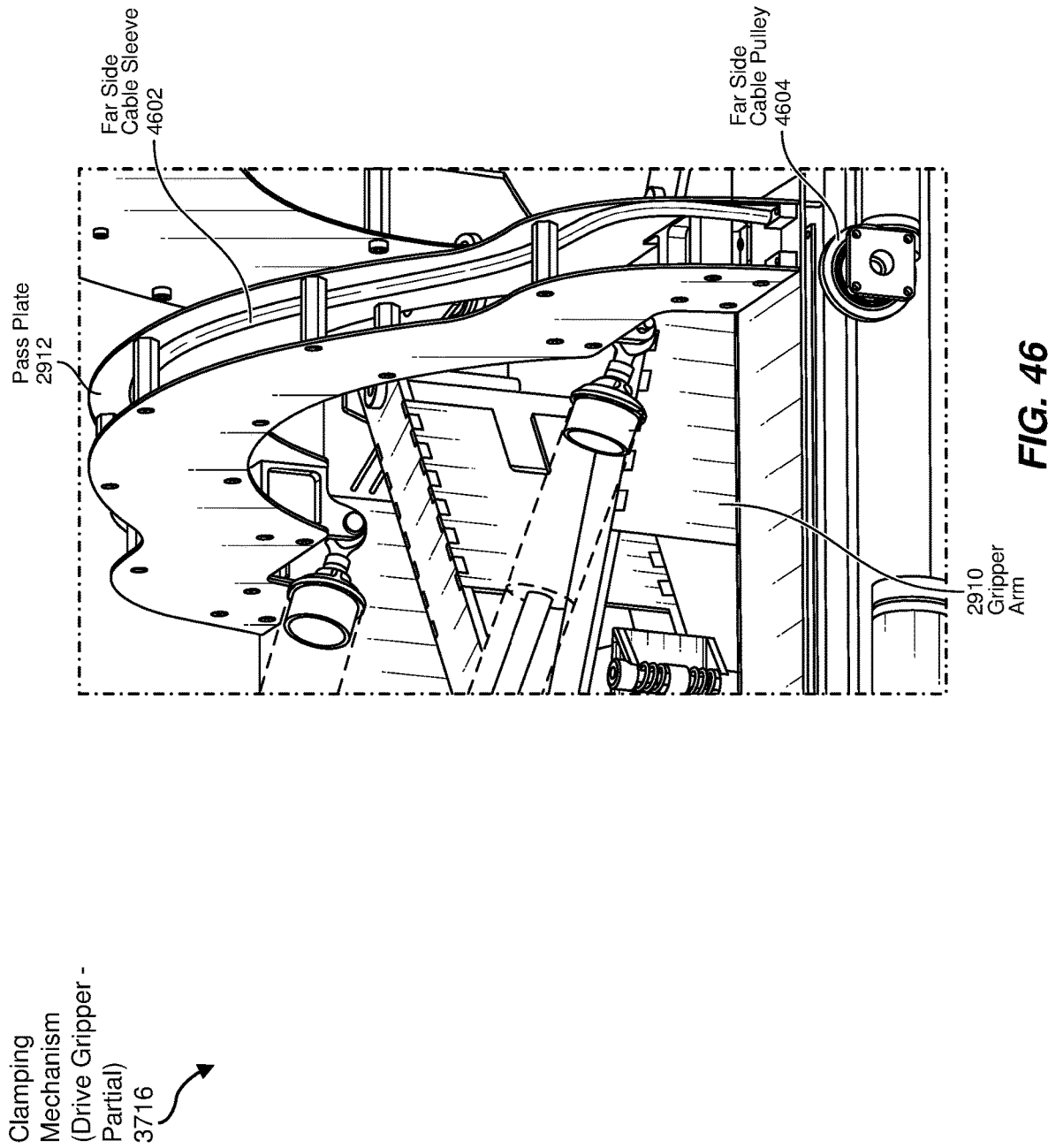
FIG. 46 is a perspective view of the clamping mechanism of FIG. 44 associated with a far side drive gripper.

FIG. 45 is a perspective partial view of clamping mechanism 3716 associated with a near side drive gripper 2906, while FIG. 46 is a perspective view of clamping mechanism 3716 associated with a far side drive gripper 2906. In some embodiments, a near side portion 4506 of the tension cable routed about main pulley 4410, as mentioned above, may further be routed about one or more near side cable pulleys 4504 before being attached to gripper arm 2910 for near side drive gripper 2906, while a far side portion of that same tension cable may be routed about a far side cable pulley 4508, through far side cable sleeve 4602 (e.g., positioned along pass plate 2912), and about one or more far side cable pulleys 4604 before being attached to a far side gripper arm 2910 for far side drive gripper 2906.

Figure 47:
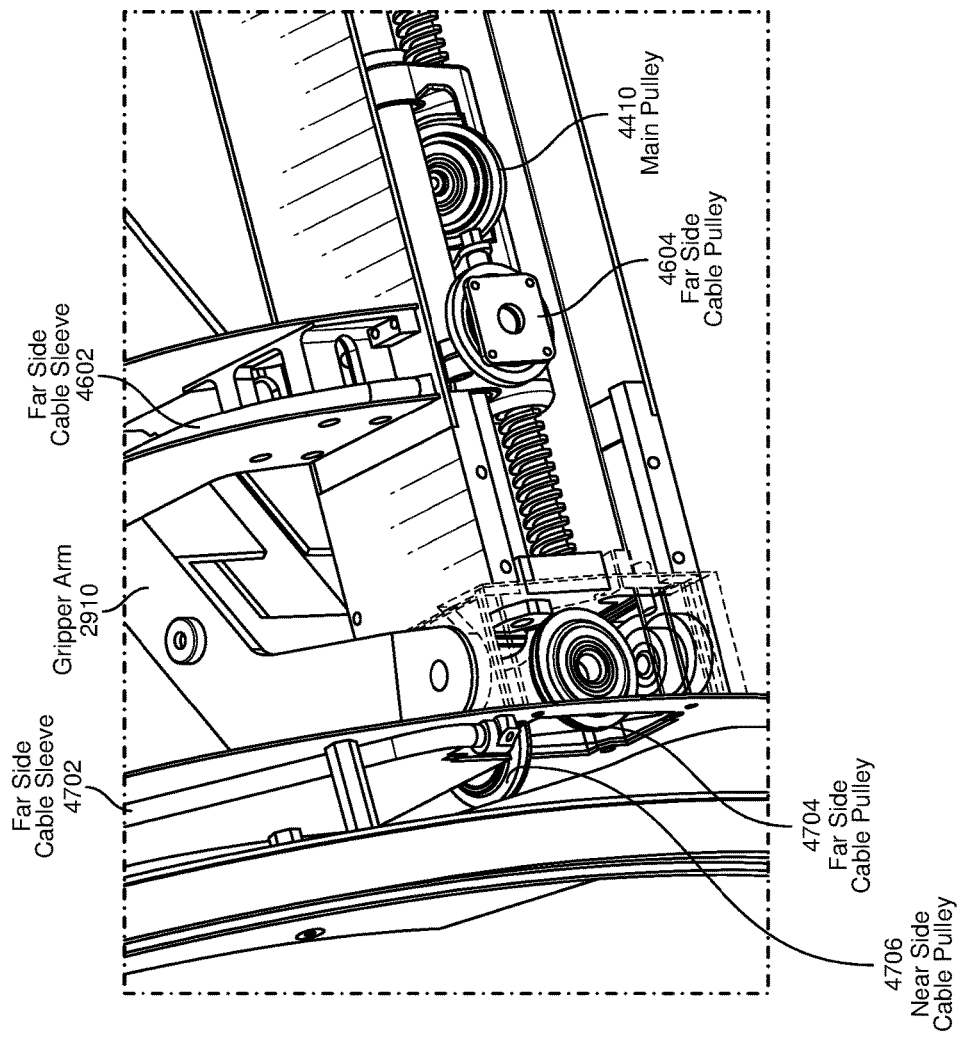
FIG. 47 is a perspective view of the clamping mechanism of FIG. 44 associated with a near side crossing gripper.

FIG. 47 is a perspective view of clamping mechanism 3716 associated with near side and far side crossing grippers 2908. In addition to far side cable sleeve 4602 and far side cable pulley 4604 for drive gripper 2906 (from FIG. 46), FIG. 47 also depicts main pulley 4410 for clamping mechanism 3716 for crossing grippers 2908, as well as a far side cable pulley 4704 and a far side cable sleeve 4702 through which a portion of a tension cable (not shown in FIG. 47) is routed on its way to a far side gripper arm 2910 (also not shown in FIG. 47) for far side crossing gripper 2908. FIG. 47 further depicts a near side cable pulley 4706 for near side gripper arm 2910 corresponding to near side crossing gripper 2908.

Figure 48:
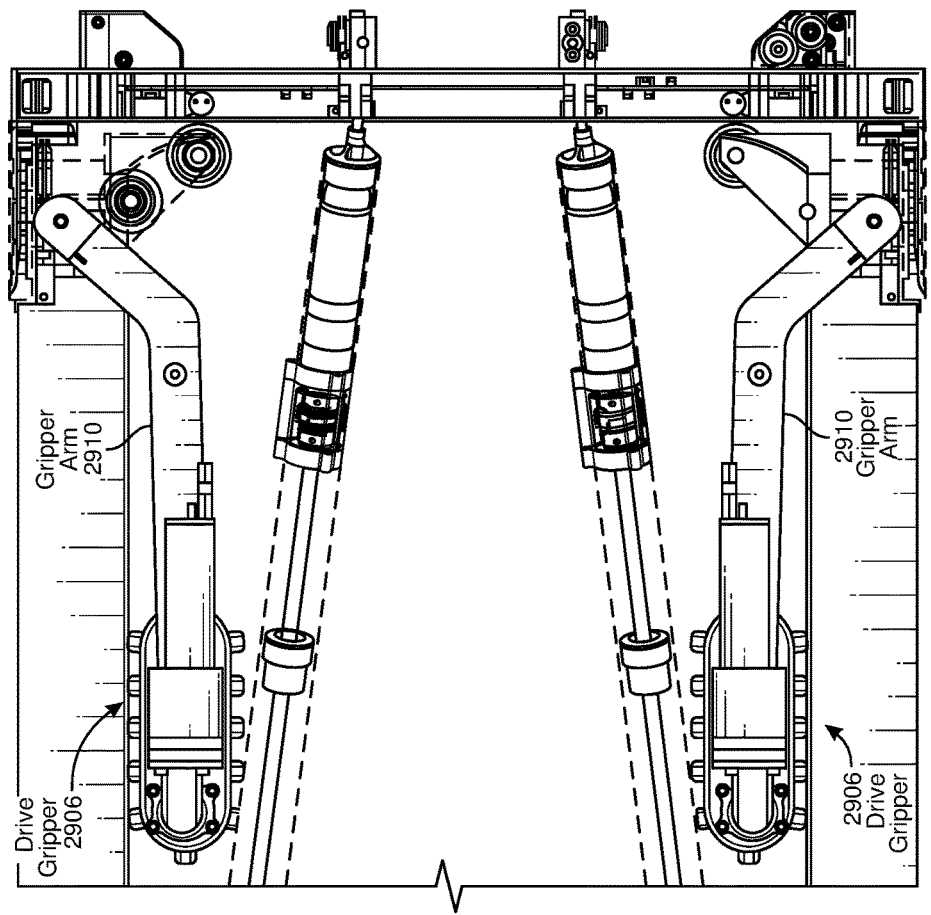
FIG. 48 is a top partial view of the drive subsystem end portion of FIG. 29 in a drive gripper open configuration.
Figure 49:
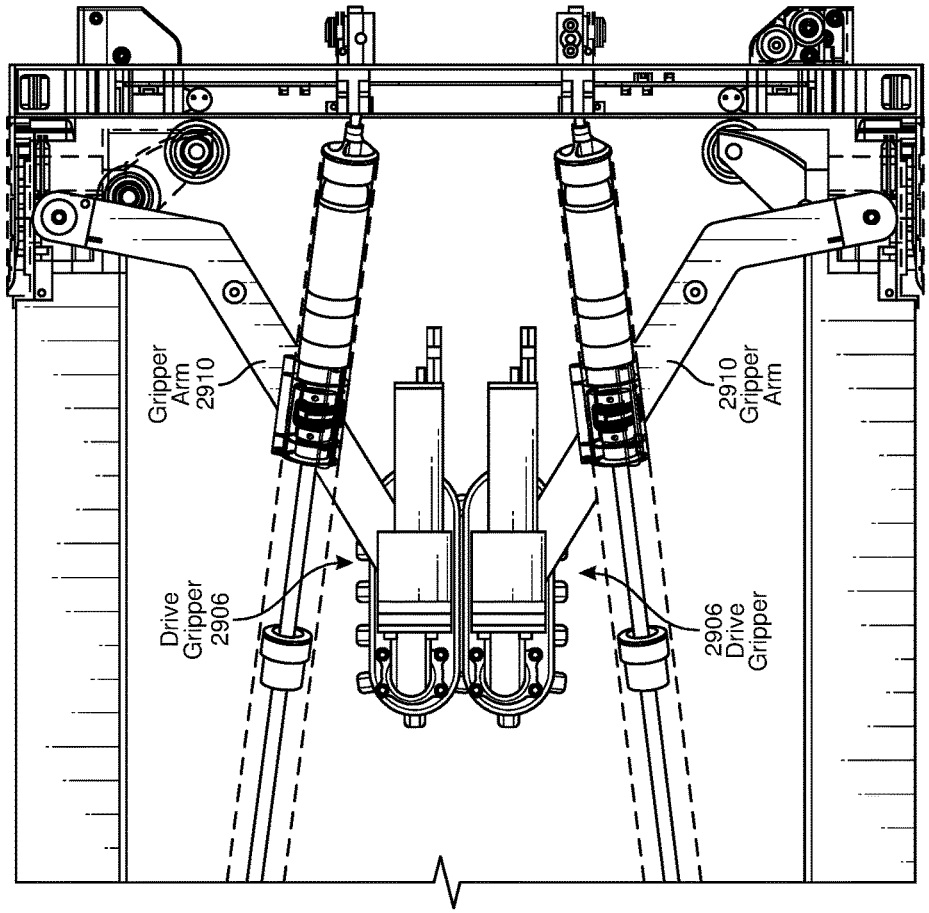
FIG. 49 is a top partial view of the drive subsystem end portion of FIG. 29 in a drive gripper closed straight configuration.
Figure 50:
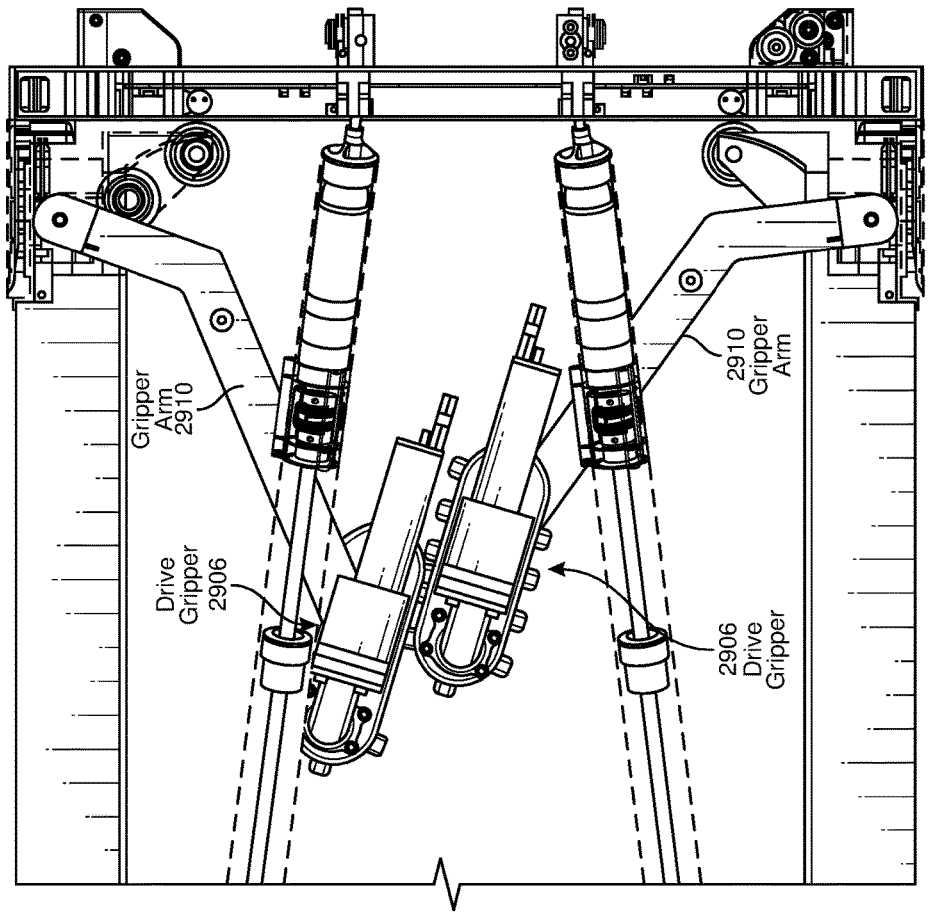
FIG. 50 is a top partial view of the drive subsystem end portion of FIG. 29 in a drive gripper closed angled configuration.

FIGS. 48-50 are top views of a portion of drive subsystem end portion 302 in various gripper configurations, as determined by clamping mechanism 3716. For example, FIG. 48 is a top view of drive subsystem end portion 302 in a drive gripper open configuration 4800 to allow an obstacle to pass therebetween, due at least in part to a lack of significant tension in the tension cable operating drive grippers 2906 and gripper arms 2910 (e.g., and thus unable counteract a spring-loaded force separating drive grippers 2906). FIG. 49 is a top view of drive subsystem end portion 302 in a drive gripper closed straight configuration 4900, in which clamping mechanism 3716 applies tension to the cable, thus forcing drive grippers 2906 together. In the example of FIG. 49, powerline conductor 101 (not shown in FIG. 49) is presumed to align substantially along a longitudinal axis of rotation subsystem 306. FIG. 50 is a top view of drive subsystem end portion 302 in a drive gripper closed angled configuration 5000. In this example, clamping mechanism 3716 applies tension to the cable in the manner shown in FIG. 49. However, in this case, powerline conductor 101 is aligned at an angle to rotation subsystem 306, thus causing drive grippers 2906 to be oriented at a similar angle to maintain gripping force on powerline conductor 101.

Figure 51:
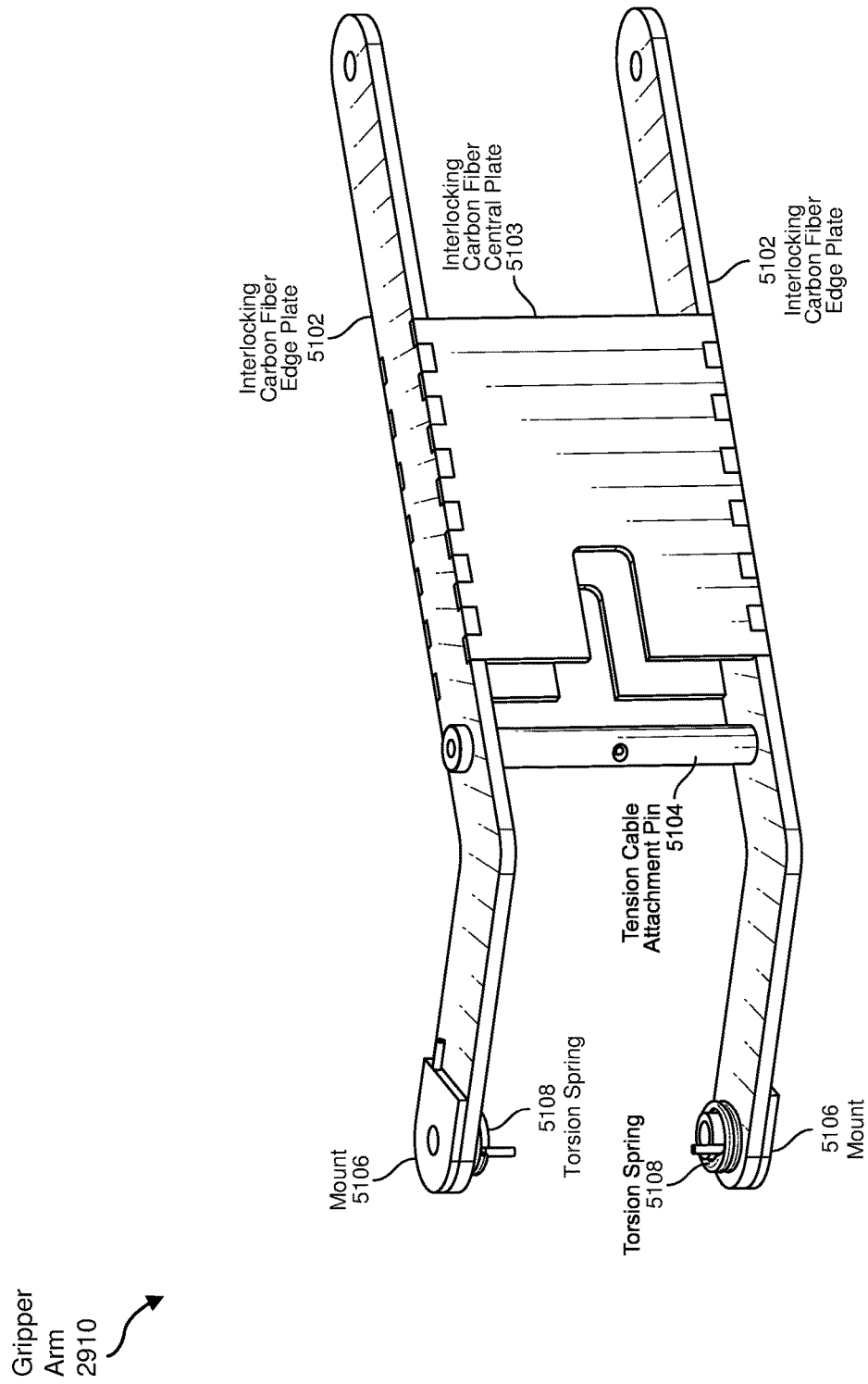
FIG. 51 is a perspective view of an exemplary gripper arm employable in the drive subsystem end portion of FIG. 29.

FIG. 51 is a perspective view of gripper arm 2910, which may include two carbon fiber edge plates 5102 joined by a carbon fiber central plate 5103 using interlocking joints for increased strength. Also, in some examples, gripper arm 2910 may include a tension cable attachment pin 5104 to which an end of the tension cable, as described above, may be attached to clamp the associated drive grippers 2906 or crossing grippers 2908 together. Further incorporated at a pivot point of each edge plate 5102 may be a mount 5106 and an associated torsion spring 5108 that may provide a counteracting force to that applied by the tension cable connected to attachment pin 5104 such that a reduction in tension in the cable results in gripper arm 2910 retracting away from powerline conductor 101.

Figure 52:
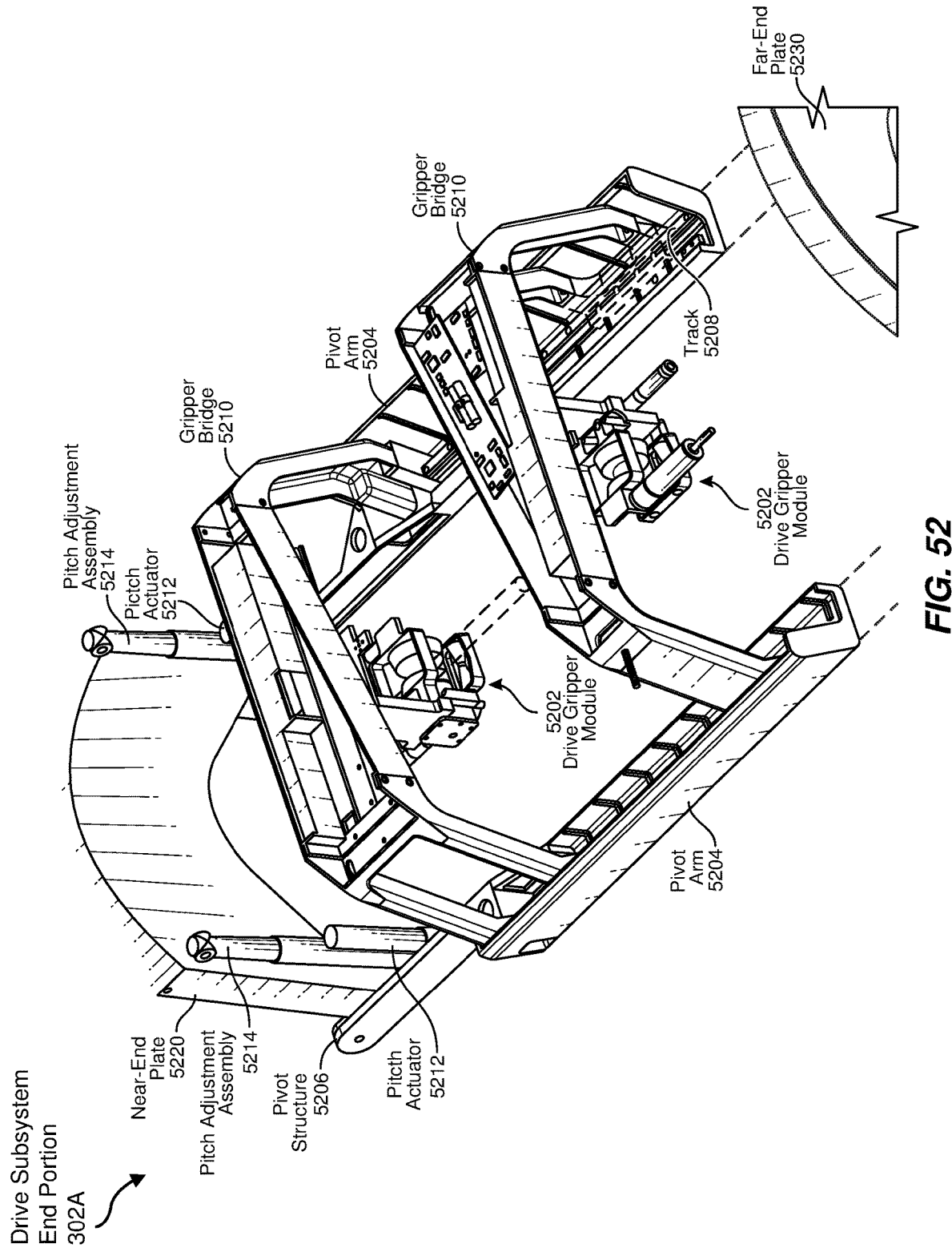
FIG. 52 is a perspective view of another exemplary drive subsystem end portion employing non-extendable pivot arms.

FIG. 52 is a perspective view of another exemplary drive subsystem end portion 302A that may employ non-extendable pivot arms 5204. In some embodiments, pivot arms 5204 may be pivoted about corresponding pivot structures 5206 by associated pitch adjustment assemblies 5214 that include pitch actuators 5212, in a fashion similar to that shown above in relation to FIG. 41. To facilitate the crossing of obstacles without the use of telescoping arms, drive subsystem end portion 302A may include two gripper bridges 5210, each of which may couple together, or bridge, pivot arms 5204 and carry a corresponding drive gripper module 5202. In some embodiments, one gripper bridge 5210 (e.g., gripper bridge 5210 located further from pivot structures 5206) may travel (e.g., in a y-direction) along tracks 5208 of pivot arms 5204 while the location of remaining gripper bridge 5210 along pivot arms 5204 may remain fixed. Further, in some embodiments, each drive gripper module 5202 may travel (e.g., in an x-direction) along its corresponding gripper bridge 5210 to adjust to varying locations of powerline conductor 101 between pivot arms 5204. In some examples, contrary to drive grippers 2906 and crossing grippers 2908 of drive subsystem end portion 302 of FIG. 29, each drive gripper module 5202, individually and/or in tandem, may actively propel the robotic system 300 along powerline conductor 101. Further, in some embodiments, each drive gripper module 5202 may be rotatably coupled to its corresponding gripper bridge 5210 (e.g., about an axis oriented along a z-direction) to facilitate changes in direction of powerline conductor 101 relative to pivot arms 5204.

Figure 53:
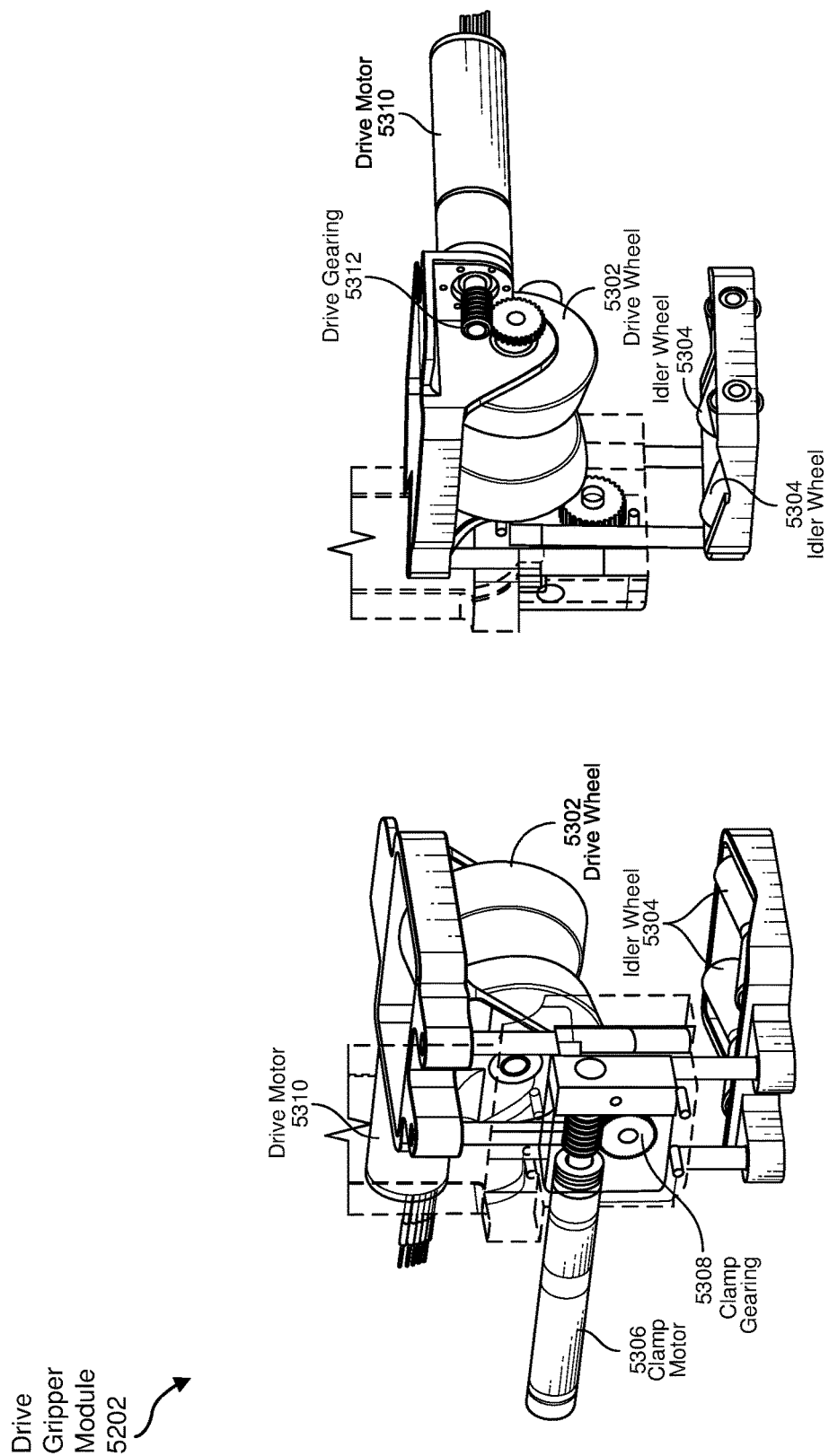
FIG. 53 includes perspective views of an exemplary drive gripper module employable in the drive system end portion of FIG. 52.

FIG. 53 includes two perspective views of drive gripper module 5202 employable in drive subsystem end portion 302A of FIG. 52. As shown, each drive gripper module 5202 may include an upper drive wheel 5302 and a pair of lower idler wheels 5304. In some embodiments, drive wheel 5302 may include a central groove and/or tapered sides to conform to powerline conductor 101 and various obstacles. Further, in some examples, idler wheels 5304 may describe a V-shaped configuration to retain powerline conductor 101. Moreover, drive wheel 5302 and idler wheels 5304 may retain powerline conductor 101 therebetween regardless of the rotational position of robotic system 300 about powerline conductor 101. In some examples, each drive gripper module 5202 may include a pair of motors to rotate drive wheel 5302 and to clamp drive wheel 5302 and idler wheels 5304 toward each other. For example, a drive motor 5310 may be coupled to drive wheel 5302 by way of drive gearing 5312 (e.g., a worm wheel engaging a worm gear attached to drive wheel 5302) to rotate drive wheel 5302. Additionally, a clamp motor 5306 may be coupled to frames or other structures carrying drive wheel 5302 and idler wheels 5304 by way of clamp gearing 5308 (e.g., a worm wheel engaged with a worm/pinion gear to drive a rack coupled to drive wheel 5302 and/or idler wheels 5304) to clamp drive wheel 5302 and idler wheels 5304 toward each other about powerline conductor 101.

Figure 54:
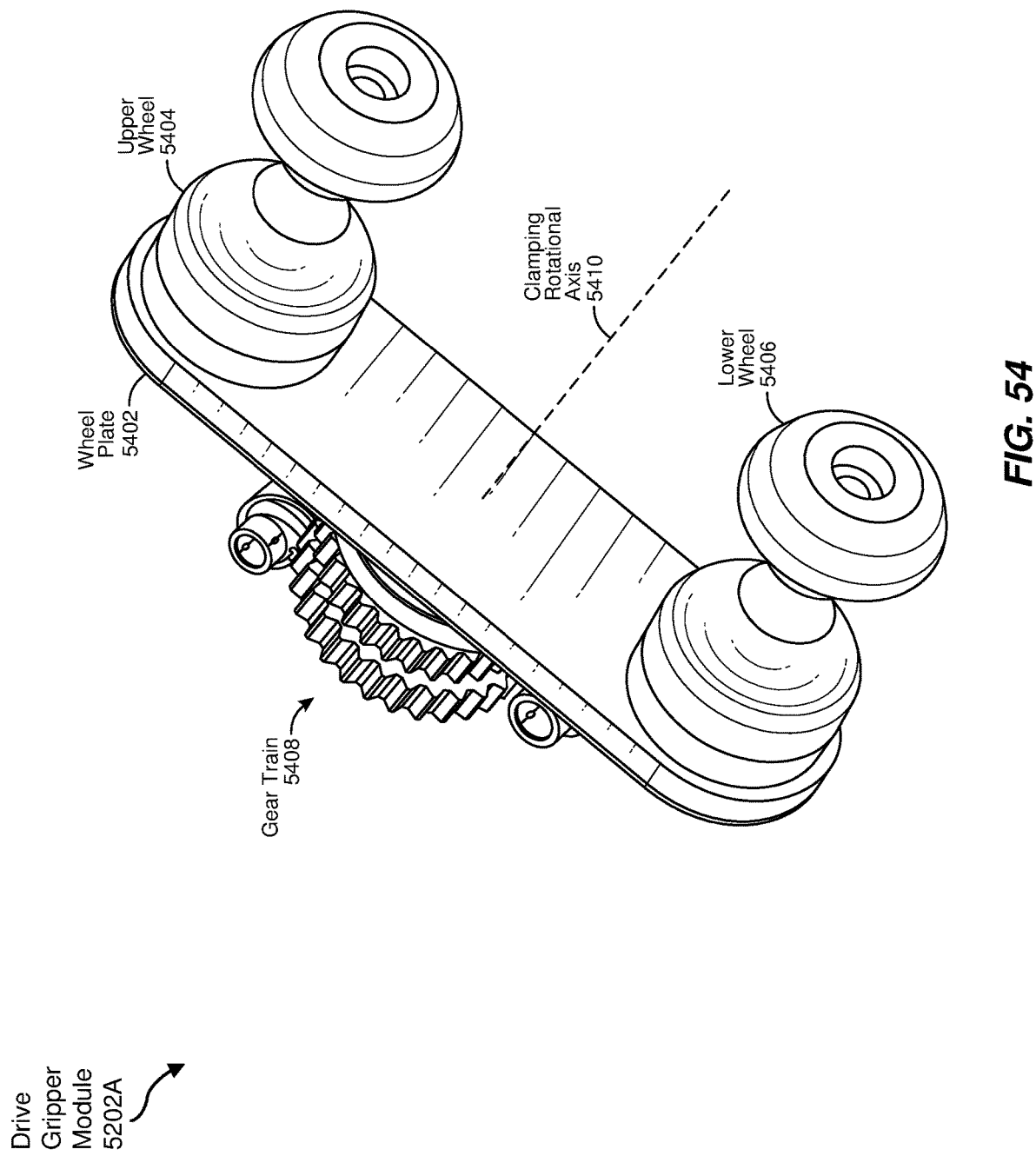
FIG. 54 is a perspective view of another exemplary drive gripper module employable in the drive system end portion of FIG. 52.

FIG. 54 is a perspective view of another exemplary drive gripper module 5202A employable in drive subsystem end portion 302A of FIG. 52. In some embodiments, drive gripper module 5202A may include an upper wheel 5404 and a lower wheel 5406 rotatably coupled to a wheel plate 5402 such that upper wheel 5404 and lower wheel 5406 are positioned at a fixed distance therebetween. Further, a gear train 5408 may couple a drive motor (not shown in FIG. 54) to both upper wheel 5404 and lower wheel 5406 to drive wheels 5404 and 5406 in opposing directions to propel robotic system 300 along powerline conductor 101. Further, a separate motor (also not shown in FIG. 54) may be coupled to wheel plate 5402 to rotate drive gripper module 5202 about an axis (e.g., clamping rotational axis 5410) to facilitate the gripping and release of powerline conductor 101, as needed. In some examples, drive gripper module 5202 may be configured to enable the system to pass over some obstacles (e.g., spiral vibration dampeners) while engaging powerline conductor 101.

Figure 55:
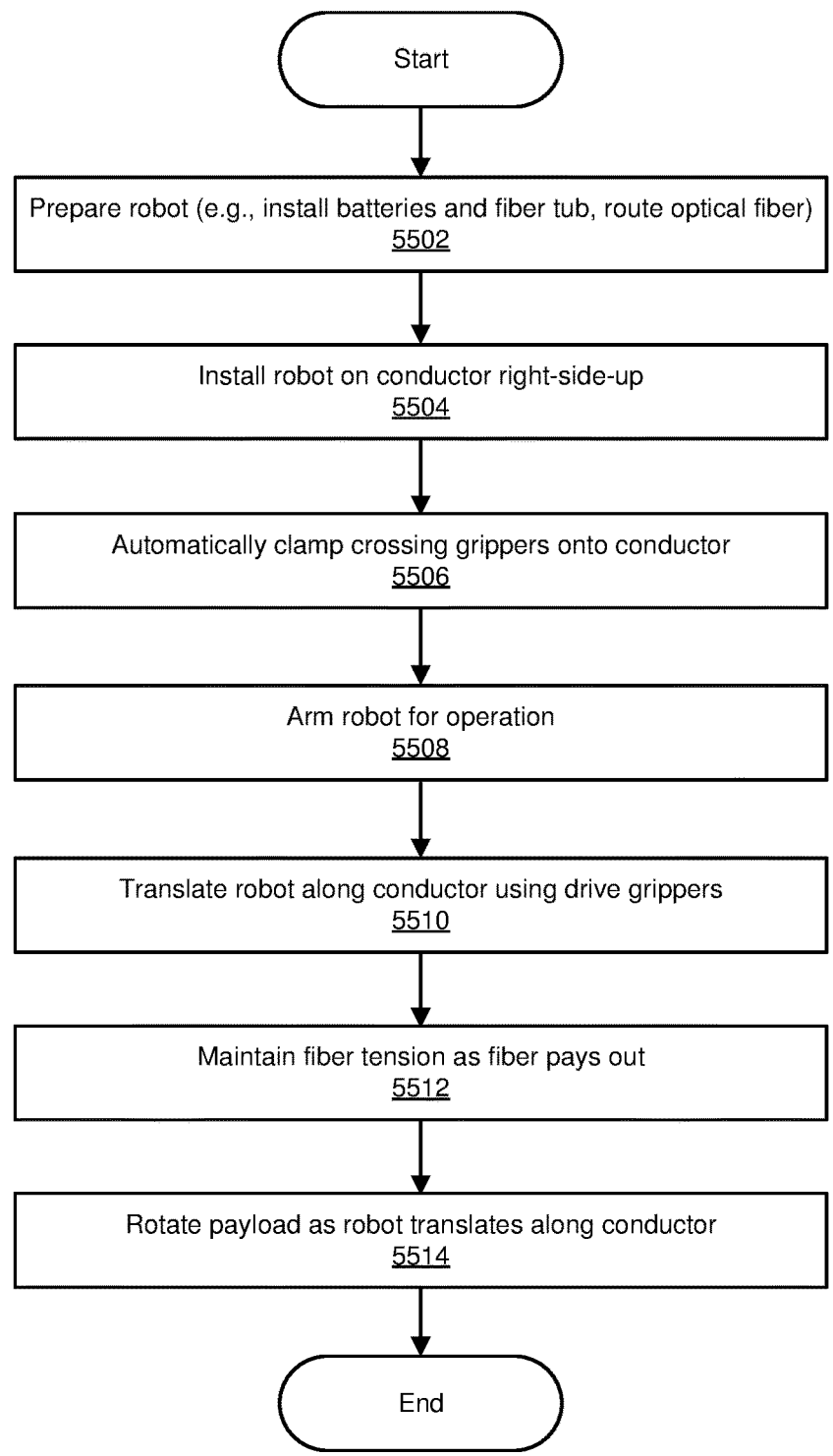
FIG. 55 is a flow diagram of an exemplary method of installing a robotic system onto a powerline conductor and installing a fiber optic cable along the powerline conductor using the robotic system.

FIG. 55 is a flow diagram of an exemplary method 5500 of installing a robotic system (e.g., robotic system 200 or 300) and then operating the robotic system to install a fiber optic cable (e.g., fiber optic cable 112) along a powerline conductor (e.g., powerline conductor 101). While the steps shown in FIG. 55, as well as those of FIGS. 56 and 57 discussed below, are described in relation to robotic system 300 and its various subsystems, the steps may also be performed by any suitable system. In one example, each of the steps shown in FIGS. 55-57 may represent an algorithm executed by a controller or processor, where that algorithm includes and/or is represented by multiple sub-steps, examples of which are described in greater detail above.

As illustrated in FIG. 55, at step 5502, a human operator, or a device controlled by such an operator, may install batteries (e.g., battery packs 516) and a fiber tub (e.g., fiber tub 1102) loaded with fiber optic cable 112 onto robotic system 300, as well as route fiber optic cable 112 from fiber tub 1102 through tension and delivery portions thereof (e.g., through fiber aperture 1214, fiber drum 1202, and payout straw assembly 1108). At step 5504, the operator may then place robotic system 300 at a right-side-up orientation (e.g., as indicated in FIG. 27) over powerline conductor 101. Thereafter, at step 5506, robotic system 300 may sense (e.g., using one or more sensors) the presence of powerline conductor 101 and, in response, automatically close crossing grippers 2908 or two or more drive gripper modules 5202, as discussed above. Afterward, at step 5508, the operator may arm or activate robotic system 300 (e.g., via one or more manual or wireless commands) to begin the fiber optic cable 112 installation process. Thereafter, robotic system 300, at step 5510, may employ drive grippers 2906 or drive gripper modules 5202 to translate robotic system 300 along powerline conductor 101 while paying out fiber optic cable 112. At step 5512, while translation occurs and as fiber optic cable 112 is paid out, payload subsystem 310 (e.g., by way of tensioner assembly 1110 or other tensioner assemblies described herein and payout straw assembly 1108) may maintain a substantially uniform tension on fiber optic cable 112. Further, at step 5514, as robotic system 300 translates along powerline conductor 101, rotation subsystem 306 may rotate payload subsystem 310 to helically wrap fiber optic cable 112 about powerline conductor 101. During this normal mode, in at least some embodiments, crossing grippers 2908, if utilized, may be retracted from powerline conductor 101.

Figure 56:
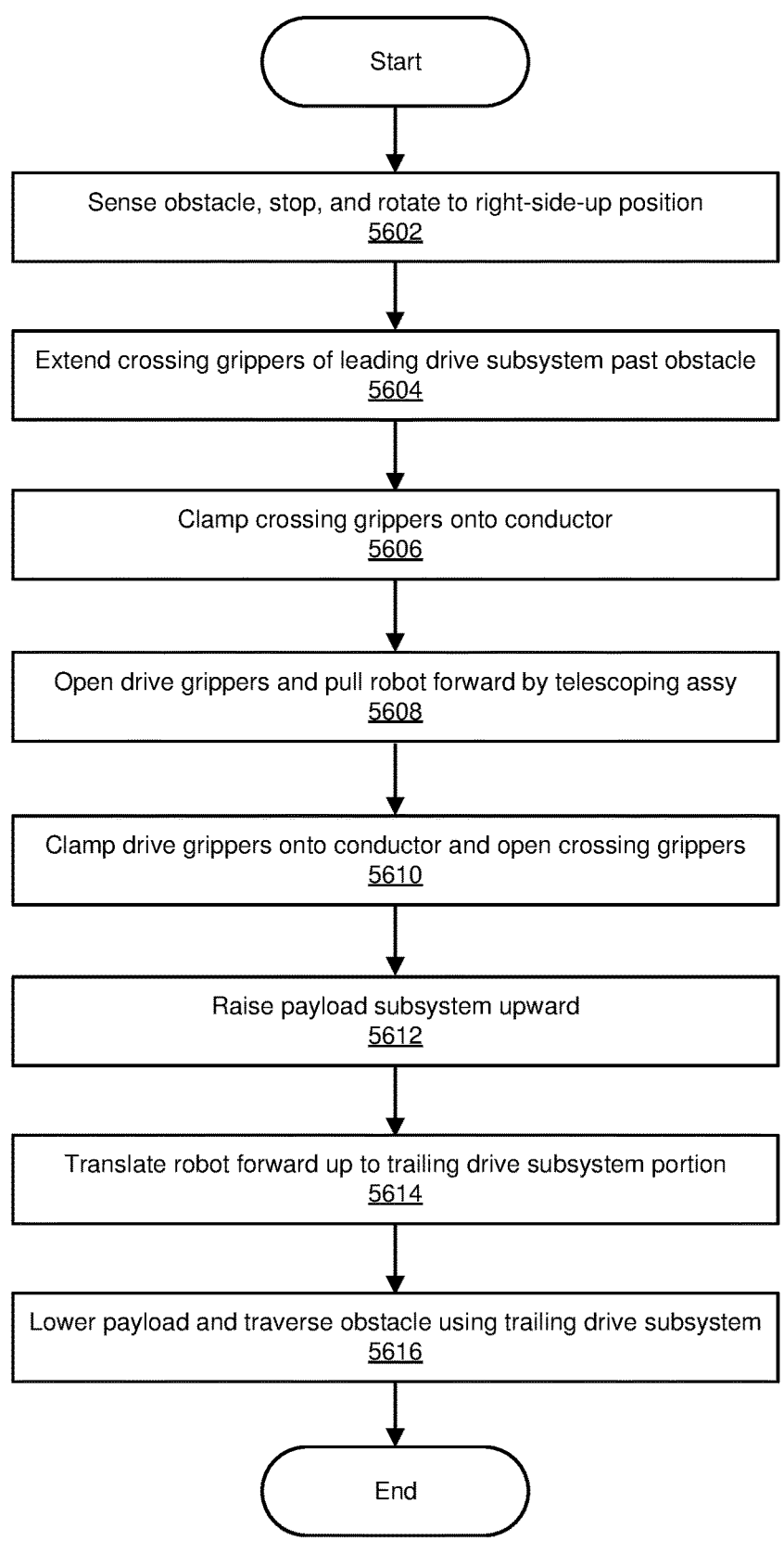
FIG. 56 is a flow diagram of an exemplary method of a robotic system avoiding an obstacle along a powerline conductor.

FIG. 56 is a flow diagram of an exemplary method 5600 of operating robotic system 200 or 300 to avoid an obstacle along a powerline conductor (e.g., powerline conductor 101). At step 5602, robotic system 300, in response to sensing an upcoming obstacle along powerline conductor 101 (e.g., using one or more sensors) during normal mode, may cause drive grippers 2906 to cease translating robotic system 300 along powerline conductor 101 prior to encountering the obstacle (presuming the use of drive subsystem end portion 302), and to cause rotation subsystem 306 to position payload subsystem 310 in an upright orientation, if not already in such a position. At step 5604, robotic system 300 may cause telescoping assemblies 2902 at the leading end of robotic system 300 to longitudinally extend crossing grippers 2908 (e.g., currently in an open or retracted state) past the encountered obstacle. At step 5606, robotic system 300 may employ pitch adjustment assemblies 2904 to vertically align crossing grippers 2908 with powerline conductor 101 and use clamping mechanism 3716 to clamp crossing grippers 2908 onto powerline conductor 101. Afterward, also at step 5608, robotic system 300 may cause drive grippers 2906 to separate or retract using their corresponding clamping mechanisms 3716 and may cause robotic system 300 to be pulled forward by retracting telescoping assemblies 2902. At step 5610, robotic system 300 may use pitch adjustment assemblies 2904 to vertically align drive grippers 2906 with powerline conductor 101 and utilize associated clamping mechanism 3716 to clamp drive grippers 2906, and thereafter open crossing grippers 2908. At step 5612, robotic system 300 may then use extension subsystem end portions 304 to extend rotation subsystem 306 and payload subsystem 310 upward to provide clearance over the obstacle. In addition, robotic system 300 may use thrusters 501 (or control moment gyroscopes (CMGs), weight-shifting arrangements, or other balance stabilizers, as mentioned above), to provide horizontal forces to balance rotation subsystem 306 and payload subsystem 310 to maintain their vertical position over powerline conductor 101. At step 5614, robotic system 300 may employ drive grippers 2906 to translate robotic system 300 forward until the second (trailing) drive subsystem end portion 302 encounters the obstacle. Thereafter, at step 5616, robotic system 300 may cause extension subsystem end portions 304 to retract rotation subsystem 306 and payload subsystem 310 to its previous position and operate trailing drive subsystem end portion 302 to employ drive grippers 2906 and crossing grippers 2908 to avoid the obstacle in a corresponding manner to that described above for leading drive subsystem end portion 302, but with drive grippers 2906 first being disengaged from powerline conductor 101 and then reengaged thereto, followed by separating crossing grippers 2908.

With respect to steps 5604 to 5610, if drive subsystem end portions 302A are employed in lieu of drive subsystem end portions 302, a first drive gripper module 5202 of a leading drive subsystem end portion 302A encountering an obstacle may be detached or unclamped from powerline conductor 101, followed by a second drive gripper module 5202 (e.g., as well as drive gripper modules 5202 of the trailing drive subsystem end portion 302A) propelling robotic system 300 along powerline conductor 101. In addition, gripper bridge 5210 of first drive gripper module 5202 may travel along pivot arms 5204 to locate first drive gripper module 5202 beyond the obstacle, if necessary. Once clearing the obstacle, first drive gripper module 5202 may clamp powerline conductor 101, after which second drive gripper module 5202 may release powerline conductor 101, followed by first drive gripper module 5202 driving robotic system 300 along powerline conductor 101, possibly in conjunction with first drive gripper module 5202 travelling along pivot arms 5204 back toward second drive gripper module 5202. As a result, after clearing the obstacle, second drive gripper module 5202 may clamp powerline conductor 101. Thereafter, as in step 5612, robotic system 300 may then use extension subsystem end portions 304 to extend rotation subsystem 306 and payload subsystem 310 upward to provide clearance over the obstacle. Subsequently, in a manner analogous to steps 5614 and 5616, robotic system 300 may employ drive gripper modules 5202 to translate robotic system 300 forward until the second (trailing) drive subsystem end portion 302A encounters the obstacle. Thereafter, robotic system 300 may cause extension subsystem end portions 304 to retract rotation subsystem 306 and payload subsystem 310 to its previous position and operate trailing drive subsystem end portion 302A to employ drive gripper modules 5202 to avoid the obstacle in a corresponding manner to that described above for leading drive subsystem end portion 302A.

FIG. 57 is a flow diagram of a method of inverting robotic system 300 under powerline conductor 101 to facilitate an obstacle crossing, as described above in conjunction with FIG. 55. At step 5702, robotic system 300 may sense an approaching obstacle (e.g., via one or more sensors), cease translation of robotic system 300 along powerline conductor 101, and ensure payload subsystem 310 assumes an upright position. At step 5704, robotic system 300 may engage or clamp crossing grippers 2908 and disengage or retract drive grippers 2906 at both drive subsystem end portions 302. At step 5706, robotic system 300 may cause extension subsystem end portions 304 to extend rotation subsystem 306 and payload subsystem 310 upward, thus raising the center of mass of robotic system 300 away from powerline conductor 101. Robotic system 300, at step 5708, may then pivot about powerline conductor 101 (e.g., initiated via thrusters 501) while maintaining a grasp of powerline conductor 101 using crossing grippers 2908. In embodiments, robotic system 300 may employ thrusters 501 to control the rotation by applying a biasing force in a direction opposite the direction of rotation to dampen the rotation. At step 5710, robotic system 300 may then perform a crossing of the obstacle (e.g., via method 5600, describe above). After avoidance of the obstacle is complete, robotic system 300, at step 5712, may rotate itself back into a right-side-up configuration (e.g., via the corresponding portion of method 5100 discussed above) before resuming normal operation of robotic system 300 to continue installation of fiber optic cable 112 onto powerline conductor 101. In embodiments in which drive subsystem end portion 302A is employed, drive gripper modules 5202 of both trailing and leading drive subsystem end portions 302A may be engaged and/or disengaged as appropriate to facilitate the rotation of robotic system 300 about powerline conductor 101 and traversal of the obstacle in an inverted orientation, as indicated above.

FIG. 58 is a block diagram of an exemplary system 5800 (e.g., serving as robotic systems 200 and 300) for installing fiber optic cable 112 onto powerline conductor 101. As depicted in FIG. 58, system 5800 may include a memory 5840 storing various modules 5802 executable by one or more physical processors 5830 for causing or controlling various operations of system 5800. In some embodiments, modules 5802 may include high-level application code modules 5804 that perform high-level tasks that may include, but are not limited to, initialization and/or calibration of various portions of system 5800; motion management for various subsystems (e.g., drive subsystem end portions 302, extension subsystem end portions 304, rotation subsystem 306, and/or payload subsystem 310) to initiate and monitor various operations (e.g., translation along powerline conductor 101, rotation of payload subsystem 310 by rotation subsystem 306 for installing fiber optic cable 112, obstacle avoidance, system 5800 loading and unloading, and so on, such as those described in connection with FIGS. 55-57); command and message logging, reception and interpretation of sensor signals (e.g., from sensors 5820); communication with an operator or an external control system (e.g., by way of a wired/wireless remote interface 5850); and the like. Further, in some examples, motion management and related motion functions may be performed by way of a motor control stack 5806 that communicates with various motors 5814 of system 5800 to perform the various motion operations noted above. In some embodiments, modules 5802 may be received (e.g., via wired/wireless remote interface 5850) and installed by way of software container technology. Also, in some examples, modules 5802 may employ a software framework and related messaging scheme tailored for robotic applications (e.g., the Robot Operating System (ROS) framework).

In some embodiments, wired/wireless remote interface 5850 may include communication circuitry (e.g., a wired or wireless transceiver) to facilitate reception of commands (e.g., from a human operator) to control various portions of system 5800, as mentioned above, as well as to enable the return of status or logging information.

Sensors 5820 may include one or more sensors (e.g., proximity sensors, IMU sensors, limit switches, etc.) for detecting obstacles; detecting a current position, orientation, or motion of system 5800 or its various components; and so on. The information provided by sensors 5820 may be employed by modules 5802 or firmware executed by microcontrollers on system 5800 (discussed below) to perform their corresponding tasks.

In some embodiments, each motor 5814 of system 5800 (e.g., motor 602, motors 2610, drive motors 3002, telescoping actuators 3706, pitch actuators 4210 and 5212, clamping actuators 4402, drive motors 5310, clamp motors 5306, thrusters 501, and so on) may each have a corresponding microcontroller 5812 and associated (e.g., integrated) memory containing firmware that, when executed by microcontroller 5812, controls the operation of that motor 5814. Further, in some examples, motor control stack 5806 may issue commands and receive status from microcontrollers 5812 by way of a microcontroller interface 5810 coupled to a microcontroller network bus 5811 to which microcontrollers 5812 are communicatively coupled. In some embodiments, microcontroller network bus 5811 may be a Controller Area Network (CAN) bus, although other types of buses or interfaces may be employed in other examples.

As discussed above in conjunction with FIGS. 1-58, systems and methods described herein may facilitate automatic or semiautomatic installation of significant lengths of fiber optic cable onto a powerline conductor (e.g., by helical wrapping) while avoiding one or more obstacles (e.g., insulators, taps, and/or the like) along the powerline conductor. Such capabilities may result in accelerated and reliable installation of fiber optic cable in underserved geographical areas by way of preexisting power transmission and/or distribution infrastructure. Consequently, such systems and methods may facilitate a substantial reduction in make ready costs for providing fiber optic cable in such a manner over conventional installation systems.

Example Embodiments

Example 1: A robotic system may include (1) a drive subsystem that translates the robotic system along a powerline conductor and (2) a rotation subsystem coupled to the drive subsystem, where (a) the rotation subsystem is coupled to a container that defines an arcuate volume about an axis such that the container partially surrounds the powerline conductor when the axis aligns with the powerline conductor, (b) the container carries a segment of fiber optic cable coupled to the powerline conductor, and (c) the rotation subsystem, while the drive subsystem translates the robotic system along the powerline conductor, rotates the container about the powerline conductor while the axis is aligned with the powerline conductor such that the segment of fiber optic cable is wrapped helically about the powerline conductor.

Example 2: The robotic system of Example 1, where the drive subsystem may include (1) a first drive subsystem end portion that leads the rotation subsystem while translating the robotic system along the powerline conductor and (2) a second drive subsystem end portion that follows the rotation subsystem while translating the robotic system along the powerline conductor.

Example 3: The robotic system of Example 2, where the robotic system may further include a payload subsystem that carries the container and is coupled to the rotation subsystem such that the rotation subsystem rotates the payload subsystem about the powerline conductor as the drive subsystem translates the robotic system along the powerline conductor.

Example 4: The robotic system of Example 3, where the payload subsystem may further include a payout straw assembly coupled to a trailing end of the second drive subsystem end portion such that the payout straw assembly rotates about the powerline conductor with the payload subsystem to helically wrap the segment of fiber optic cable about the powerline conductor while maintaining tension on a portion of the segment of fiber optic cable being wrapped.

Example 5: The robotic system of Example 4, where the robotic system may further include a fiber payout track that guides the segment of fiber optic cable past the second drive subsystem end portion between the container and the payout straw assembly.

Example 6: The robotic system of any one of Examples 3-5, where the payload subsystem may further include a tensioner assembly that maintains the tension on the portion of the segment fiber optic cable being wrapped.

Example 7: The robotic system of Example 2, where each of the first drive subsystem end portion and the second drive subsystem end portion may pivot vertically relative to the rotation subsystem.

Example 8: The robotic system of Example 2, where each of the first drive subsystem end portion and the second drive subsystem end portion may extend and retract longitudinally relative to the rotation subsystem.

Example 9: The robotic system of Example 8, where each of the first drive subsystem end portion and the second drive subsystem end portion may include (1) a driving mechanism that selectively engages the powerline conductor to translate the robotic system along the powerline conductor and (2) a grasping mechanism that selectively engages the powerline conductor while a corresponding one of the first drive subsystem end portion or the second drive subsystem end portion extends or retracts longitudinally relative to the rotation subsystem to translate the robotic system along the powerline conductor.

Example 10: The robotic system of Example 2, where each of the first drive subsystem end portion and the second drive subsystem end portion may include (1) a first driving mechanism that selectively engages the powerline conductor to translate the robotic system along the powerline conductor and (2) a second driving mechanism positioned between the rotation subsystem and the first driving mechanism that selectively engages the powerline conductor to translate the robotic system along the powerline conductor.

Example 11: The robotic system of Example 10, where each of the first driving mechanism and the second driving mechanism may translate orthogonally to the powerline conductor relative to a corresponding one of the first drive subsystem end portion or the second drive subsystem end portion.

Example 12: The robotic system of Example 10 or Example 11, where at least one of the first driving mechanism or the second driving mechanism may translate along the powerline conductor relative to a corresponding one of the first drive subsystem end portion or the second drive subsystem end portion.

Example 13: The robotic system of Example 1, where the robotic system may further include an extension subsystem that (1) mechanically couples the rotation subsystem to the drive subsystem and (2) selectively extends the rotation subsystem away from the powerline conductor to avoid an obstacle along the powerline conductor.

Example 14: The robotic system of Example 1 or Example 13, where the rotation subsystem may further include at least one stabilization component that maintains a desired rotational position of rotation subsystem relative to the powerline conductor.

Example 15: The robotic system of Example 14, where the at least one stabilization component may include one or more thrusters.

Example 16: A method may include (1) translating a robotic system along a powerline conductor and (2) rotating, about the powerline conductor, while translating the robotic system along the powerline conductor, a container coupled to the robotic system to helically wrap about the powerline conductor a segment of fiber optic cable that is carried in the container and is coupled to the powerline conductor, where (a) the container defines an arcuate volume about an axis such that the container partially surrounds the powerline conductor when the axis aligns with the powerline conductor and (b) the container is rotated about the powerline conductor while the axis is aligned with the powerline conductor.

Example 17: The method of Example 16, where the method may further include maintaining a range of tension on a portion of the segment of fiber optic cable while the container is rotated about the powerline conductor.

Example 18: The method of Example 16 or Example 17, where the method may further include selectively extending the container away from the powerline conductor while translating the robotic system along the powerline conductor to avoid an obstacle along the powerline conductor.

Example 19: A container for carrying a segment of fiber optic cable, where the container may include (1) an arcuate volume about an axis such that the container partially surrounds the axis without intersecting the axis and (2) an aperture through which the segment of fiber optic cable is drawn.

Example 20: The container of Example 19, where the container further comprises an attachment structure by which the container is removably attached to a robotic system that rotates the container about a powerline conductor while the robotic system translates along the powerline conductor and while the axis aligns with the powerline conductor to helically wrap the segment of fiber optic cable via the aperture to the powerline conductor.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more modules recited herein may receive data (e.g., data from one or more sensors detecting obstacles, system orientation, and so on) and control the operations of various portions of the system (e.g., the drive, rotation, and/or extension subsystems) based on that data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

What is claimed is:

1. A robotic system for translating along a powerline conductor, the robotic system comprising:
    a drive subsystem of the robotic system; and
    a rotation subsystem coupled to the drive subsystem by an extension subsystem end portion, wherein:
        the rotation subsystem is coupled to a container that defines an arcuate volume about an axis such that the container partially surrounds the powerline conductor when the axis aligns with the powerline conductor;
        the container is configured to carry a segment of fiber optic cable coupled to the powerline conductor; and
        the rotation subsystem, while the drive subsystem translates the robotic system along the powerline conductor, rotates the container about the powerline conductor while the axis is aligned with the powerline conductor such that the segment of fiber optic cable is wrapped helically about the powerline conductor.

2. The robotic system of claim 1, wherein the drive subsystem comprises:
    a first drive subsystem end portion that leads the rotation subsystem while the robotic system translates along the powerline conductor; and
    a second drive subsystem end portion that follows the rotation subsystem while the robotic system translates along the powerline conductor.

3. The robotic system of claim 2, further comprising a payload subsystem that is configured to carry the container and that is coupled to the rotation subsystem such that the rotation subsystem rotates the payload subsystem about the powerline conductor as the drive subsystem translates the robotic system along the powerline conductor.

4. The robotic system of claim 3, wherein the payload subsystem further comprises a payout straw assembly coupled to a trailing end of the second drive subsystem end portion such that the payout straw assembly rotates about the powerline conductor with the payload subsystem to helically wrap the segment of fiber optic cable about the powerline conductor while maintaining tension on a portion of the segment of fiber optic cable being wrapped.

5. The robotic system of claim 4, further comprising a fiber payout track that guides the segment of fiber optic cable past the second drive subsystem end portion between the container and the payout straw assembly.

6. The robotic system of claim 3, wherein the payload subsystem further comprises a tensioner assembly that maintains tension on a portion of the segment of fiber optic cable being wrapped.

7. The robotic system of claim 2, wherein each of the first drive subsystem end portion and the second drive subsystem end portion pivots vertically relative to the rotation subsystem.

8. The robotic system of claim 2, wherein each of the first drive subsystem end portion and the second drive subsystem end portion extends and retracts longitudinally relative to the rotation subsystem.

9. The robotic system of claim 8, wherein each of the first drive subsystem end portion and the second drive subsystem end portion comprises:
  a driving mechanism that selectively engages the powerline conductor to translate the robotic system along the powerline conductor; and
  a grasping mechanism that selectively engages the powerline conductor while a corresponding one of the first drive subsystem end portion or the second drive subsystem end portion extends and retracts longitudinally relative to the rotation subsystem to translate the robotic system along the powerline conductor.

10. The robotic system of claim 2, wherein each of the first drive subsystem end portion and the second drive subsystem end portion comprises:
  a first driving mechanism that selectively engages the powerline conductor to translate the robotic system along the powerline conductor; and
  a second driving mechanism positioned between the rotation subsystem and the first driving mechanism that selectively engages the powerline conductor to translate the robotic system along the powerline conductor.

11. The robotic system of claim 10, wherein each of the first driving mechanism and the second driving mechanism translates orthogonally to the powerline conductor relative to a corresponding one of the first drive subsystem end portion or the second drive subsystem end portion.

12. The robotic system of claim 10, wherein at least one of the first driving mechanism or the second driving mechanism translates along the powerline conductor relative to a corresponding one of the first drive subsystem end portion or the second drive subsystem end portion.

13. The robotic system of claim 1, further comprising:
  an extension subsystem that:
    mechanically couples the rotation subsystem to the drive subsystem; and
    selectively extends the rotation subsystem away from the powerline conductor to avoid an obstacle along the powerline conductor.

14. The robotic system of claim 13, wherein the rotation subsystem further comprises at least one stabilization component that maintains a desired rotational position of rotation subsystem relative to the powerline conductor.

15. The robotic system of claim 14, wherein the at least one stabilization component comprises one or more thrusters.

* * * * *